(12) United States Patent
Katsuta

(10) Patent No.: US 10,474,284 B2
(45) Date of Patent: Nov. 12, 2019

(54) INPUT DETECTION DEVICE AND ELECTRONIC DEVICE

(71) Applicant: Japan Display Inc., Tokyo (JP)

(72) Inventor: Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/618,828

(22) Filed: Jun. 9, 2017

(65) Prior Publication Data
US 2017/0357367 A1 Dec. 14, 2017

(30) Foreign Application Priority Data

Jun. 10, 2016 (JP) .................................. 2016-116230

(51) Int. Cl.
| | |
|---|---|
| *G06F 3/041* | (2006.01) |
| *G06F 3/044* | (2006.01) |
| *G02F 1/1343* | (2006.01) |
| *G06F 3/046* | (2006.01) |
| *G09G 3/36* | (2006.01) |
| *G02F 1/1333* | (2006.01) |
| *G02F 1/1368* | (2006.01) |
| *G02F 1/1335* | (2006.01) |

(52) U.S. Cl.
CPC ...... *G06F 3/0416* (2013.01); *G02F 1/134336* (2013.01); *G06F 3/044* (2013.01); *G06F 3/046* (2013.01); *G06F 3/0412* (2013.01); *G09G 3/3677* (2013.01); *G09G 3/3696* (2013.01); *G02F 1/1368* (2013.01); *G02F 1/13338* (2013.01); *G02F 1/133514* (2013.01); *G02F 1/133528* (2013.01); *G02F 2001/133302* (2013.01); *G06F 2203/04106* (2013.01); *G09G 2300/0426* (2013.01); *G09G 2310/08* (2013.01)

(58) Field of Classification Search
CPC ...... G06F 3/0416; G06F 3/0412; G06F 3/044; G06F 3/046; G02F 1/134336; G09G 3/3677; G09G 3/3696
See application file for complete search history.

(56) References Cited

U.S. PATENT DOCUMENTS

| | | | | |
|---|---|---|---|---|
| 5,864,328 | A * | 1/1999 | Kajimoto | ............... G09G 3/367 345/210 |
| 7,046,223 | B2 * | 5/2006 | Hashimoto | .......... G09G 3/3611 345/211 |

(Continued)

FOREIGN PATENT DOCUMENTS

JP     H10-049301 A     2/1998

*Primary Examiner* — Sejoon Ahn
(74) *Attorney, Agent, or Firm* — K&L Gates LLP

(57) ABSTRACT

An input detection device includes: a plurality of drive electrodes each of which includes a first end and a second end; a first scanner circuit and a second scanner circuit which select the first ends of the plurality of drive electrodes; a third scanner circuit and a fourth scanner circuit which select the second ends of the plurality of drive electrodes; and a controller which supplies a first drive voltage to the first end of a first drive electrode and to the second end of a second drive electrode and supplies a second drive voltage different from the first drive voltage to the second end of the first drive electrode and to the first end of the second drive electrode via the first scanner circuit, the second scanner circuit, the third scanner circuit, and the fourth scanner circuit.

20 Claims, 26 Drawing Sheets

(56) References Cited

U.S. PATENT DOCUMENTS

| | | | |
|---|---|---|---|
| 8,456,460 B2* | 6/2013 | Tanaka | H01L 27/1446 345/102 |
| 8,466,903 B2* | 6/2013 | Tateuchi | G06F 3/0421 178/18.09 |
| 8,482,538 B2* | 7/2013 | Tsuzaki | G06F 3/044 345/173 |
| 8,487,886 B2* | 7/2013 | Tsuzaki | G06F 3/0412 345/156 |
| 2003/0085864 A1* | 5/2003 | Takahashi | G09G 3/3629 345/97 |
| 2009/0315858 A1* | 12/2009 | Sato | G06F 3/0416 345/174 |
| 2011/0134076 A1* | 6/2011 | Kida | G06F 3/0412 345/174 |
| 2011/0267293 A1* | 11/2011 | Noguchi | G06F 3/0416 345/173 |
| 2011/0267295 A1* | 11/2011 | Noguchi | G06F 3/0416 345/173 |
| 2012/0206154 A1* | 8/2012 | Pant | G06F 3/0416 324/613 |
| 2012/0330590 A1* | 12/2012 | Bulea | G06F 3/044 702/65 |
| 2013/0009905 A1* | 1/2013 | Castillo | G06F 3/044 345/174 |
| 2013/0030740 A1* | 1/2013 | Bulea | G06F 3/0416 702/65 |
| 2013/0082954 A1* | 4/2013 | Azumi | G06F 3/041 345/173 |
| 2013/0321341 A1* | 12/2013 | Takahama | G06F 3/0416 345/174 |
| 2014/0152617 A1* | 6/2014 | Kida | G06F 3/044 345/174 |
| 2014/0192019 A1* | 7/2014 | Fukushima | G06F 3/0412 345/174 |
| 2014/0313138 A1* | 10/2014 | Jeong | G09G 3/3258 345/173 |
| 2016/0139701 A1* | 5/2016 | Wang | G06F 3/044 345/174 |
| 2017/0168620 A1* | 6/2017 | Gim | G09G 3/3655 |

* cited by examiner

INPUT DETECTION DEVICE AND ELECTRONIC DEVICE

CROSS-REFERENCE TO RELATED APPLICATION

The present application claims priority from Japanese Patent Application No. 2016-116230 filed on Jun. 10, 2016, the content of which is hereby incorporated by reference into this application.

TECHNICAL FIELD OF THE INVENTION

The present invention relates to an input detection device and an electronic device, and particularly relates to an input detection device and an electronic device with a touch detection function capable of detecting proximity of an external object.

BACKGROUND OF THE INVENTION

In recent years, an input detection device with a touch detection function, so-called a touch panel, capable of detecting proximity (hereinafter including contact) of an external object has drawn attention as an input detection device. The touch panel is mounted on a display device such as a liquid crystal display device or is integrated with the liquid crystal display device, and thus, the display device with a touch detection function is provided.

There is a touch panel on which a pen can be used as an example of the external object. By using the pen, for example, a small region can be designated or a handwritten character can be input. There are various techniques for detecting touch with a pen. An example of the various techniques is an electromagnetic induction method. The electromagnetic induction method is a dominant technique as a technique for detecting touch with a pen, since the electromagnetic induction method can achieve high accuracy and high pen-pressure detection accuracy and can also achieve a hovering detection function where the external object is separated from a front surface of the touch panel.

In addition, there is a touch detection device capable of detecting a finger or the like as the external object. In this case, since a detection target is not a pen, a method other than the electromagnetic induction method is adopted as the technique for detecting touch. For example, there are methods of detecting an optical change, a change in resistance value, or a change in electric field generated by touch with a finger or the like. Among these methods, an example of the methods of detecting a change in electric field is a capacitive sensing method using electrostatic capacitance. Since a relatively simple structure is used and power consumption is low in the capacitive sensing method, the capacitive sensing method is used for a personal digital assistant and the like.

A technique related to an electromagnetic induction touch panel is described, for example, in Japanese Patent Application Laid-Open Publication No. H10-49301 (Patent Document 1).

SUMMARY OF THE INVENTION

Conventionally, in a case in which both a finger and a pen are desired to be detected, it is necessary to use a capacitive sensing touch panel and an electromagnetic induction touch panel in such a manner that one of them is overlapped with the other. As a result, this causes an increase in size of an input device, thereby also increasing manufacturing costs. In addition, it is necessary to additionally mount a display device on the touch panel in an overlapping manner in order to display an image on the touch panel.

Patent Document 1 describes a technique related to an electromagnetic induction coordinate input device in which a detection circuit for a position-specifying pen is incorporated in a display device. However, a capacitive sensing touch panel is neither described nor recognized in Patent Document 1. In addition, in the coordinate input device described in Patent Document 1, since an electromagnetic wave is generated inside the pen, a battery is required for the pen, and as a result, a size of the pen may be increased.

In view of the above problem, the present inventor has reached the present invention as a result of repeating intensive studies on realization of an input detection device obtained by integrating the electromagnetic induction method and the capacitive sensing method and also capable of being incorporated in a display device.

An object of the present invention is to provide an input detection device capable of being driven by both the electromagnetic induction method and the capacitive sensing method.

An input detection device according to one aspect of the present invention includes: a plurality of drive electrodes each of which includes a first end and a second end; a first scanner circuit and a second scanner circuit which select the first ends of the plurality of drive electrodes; a third scanner circuit and a fourth scanner circuit which select the second ends of the plurality of drive electrodes; and a controller which supplies a first drive voltage to the first end of a first drive electrode among the plurality of drive electrodes and to the second end of a second drive electrode among the plurality of drive electrodes, and supplies a second drive voltage different from the first drive voltage to the second end of the first drive electrode and to the first end of the second drive electrode via the first scanner circuit, the second scanner circuit, the third scanner circuit, and the fourth scanner circuit.

Also, according to another aspect of the present invention, the input detection device further includes: a first selection drive circuit which is connected between the first end of each of the drive electrodes, and each of the first scanner circuit and the second scanner circuit; and a second selection drive circuit which is connected between the second end of each of the drive electrodes, and each of the third scanner circuit and the fourth scanner circuit.

Also, according to still another aspect of the present invention, when one of the first scanner circuit and the second scanner circuit selects supply of the first drive voltage to the first end of the first drive electrode, the controller supplies the first drive voltage to the first end of the first drive electrode via one of the first scanner circuit and the second scanner circuit, supplies the second drive voltage to the second end of the first drive electrode via one of the third scanner circuit and the fourth scanner circuit, supplies the second drive voltage to the first end of the second drive electrode via the other of the first scanner circuit and the second scanner circuit, and supplies the first drive voltage to the second end of the second drive electrode via the other of the third scanner circuit and the fourth scanner circuit.

BRIEF DESCRIPTIONS OF THE DRAWINGS

DESCRIPTIONS OF THE PREFERRED EMBODIMENTS

Figure 1A:
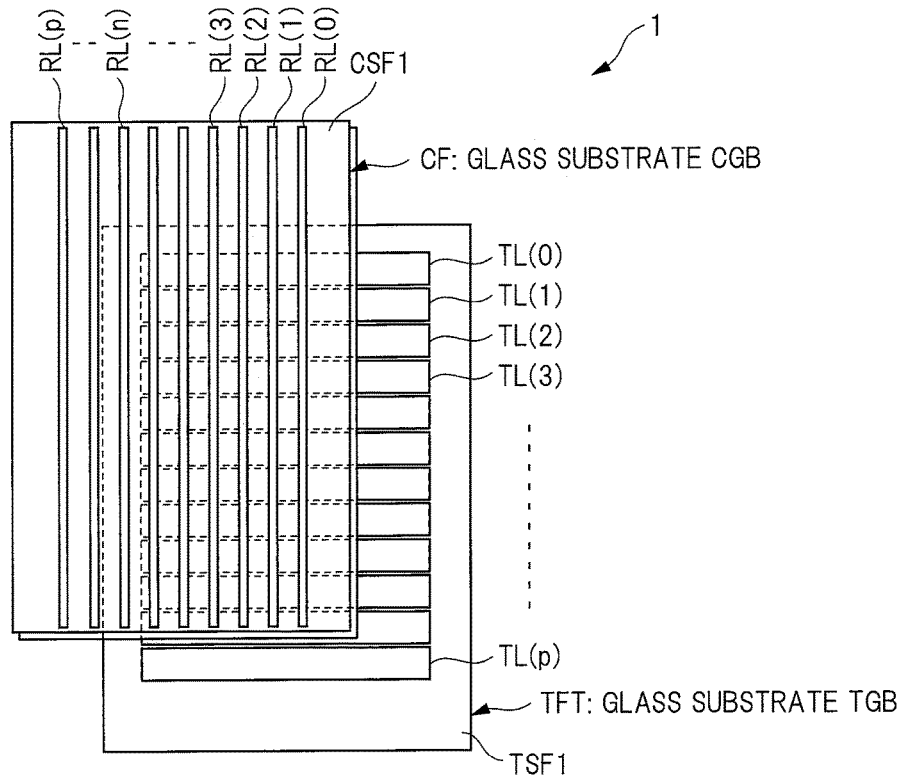
FIG. 1A is a plan view illustrating a configuration of a display device.

Hereinafter, embodiments of the present invention will be described with reference to the accompanying drawings. Note that this disclosure is an example only and suitable modifications which can be easily conceived by those skilled in the art without departing from the gist of the present invention are included within the scope of the present invention as a matter of course. In addition, in order to further clarify the description, a width, a thickness, a shape, and the like of respective portions may be more schematically illustrated in the drawings than those in an actual state, but they are examples only and do not limit the interpretation of the present invention.

In addition, in this specification and the respective drawings, the same components described in the drawings which have been described before are denoted by the same reference characters, and detailed description thereof may be omitted as needed. Hereinafter, a liquid crystal display device with a touch detection function will be described as an example of an input detection device; however, the input detection device is not limited to this. For example, the input detection device may be a device which includes a device for displaying an image and a device for touch detection. Also, the input detection device may be the device for touch detection without the device for displaying an image. The device for touch detection may be a device which includes an electromagnetic induction touch panel and a capacitive sensing touch panel. Also, the device for touch detection may be a device which includes an electromagnetic induction touch panel without a capacitive sensing touch panel. The device for displaying an image may be a liquid crystal display device, an OLED display device, or the like. Also, in this specification, touch means direct contact or approach to a front surface of the input detection device.

First Embodiment

A first embodiment provides a liquid crystal display device with a touch detection function (hereinafter also referred to as a display device). The display device is capable of detecting both touch with a pen and touch with a finger. The display device is a so-called in-cell type display device obtained by integrating an detection device for detecting touch with a displaying device for displaying image. In other words, the display device of the first embodiment includes at least one of a substrate or an electrode that serves for both as a component of the liquid crystal display device and as a component of the touch panel. First, the basic configuration of the display device will be described. Next, principles of magnetic field detection (hereinafter also referred to as magnetic field touch detection or magnetic field touch detection by an electromagnetic induction method) detecting touch with a pen and electric field detection (hereinafter also referred to as electric field touch detection or electric field touch detection by a capacitive sensing method) detecting touch with a finger will be described based on this basic configuration.

Basic Configuration of Display Device

Figure 1B:
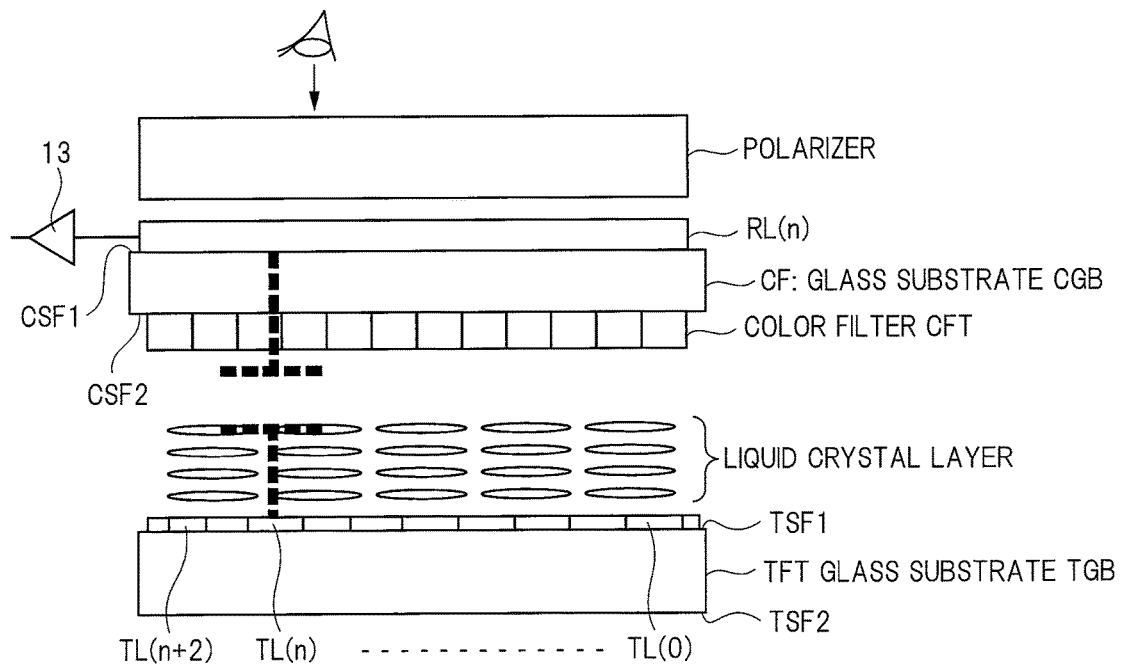
FIG. 1B is a cross-sectional view illustrating the configuration of the display device.

FIGS. 1A and 1B are views schematically illustrating the configuration of the display device. In FIGS. 1A and 1B, reference numeral 1 denotes the display device. FIG. 1A is a plan view illustrating a plane of the display device 1, and FIG. 1B is a cross-sectional view illustrating a cross section of the display device 1. The display device 1 includes a TFT (Thin Film Transistor) glass substrate (hereinafter also referred to as an insulating first substrate or simply referred to as a first substrate) TGB, a layer layered over the first substrate TGB, a color filter CFT, a CF (Color Filter) glass substrate (hereinafter also referred to as an insulating second substrate or simply referred to as a second substrate) CGB, and a layer layered over the second substrate CGB.

In FIG. 1A, reference characters TL(0) to TL(p) denote drive electrodes configured of the layer formed over a first main surface TSF1 of the first substrate TGB. Also, reference characters RL(0) to RL(p) denote detection electrodes configured of the layer formed over a first main surface CSF1 of the second substrate CGB. In order to facilitate understanding, in FIG. 1A, the first substrate TGB and the second substrate CGB are illustrated such that the substrates are separated from each other. However, in reality, as illustrated in FIG. 1B, the first substrate TGB and the second substrate CGB are arranged such that the first main surface TSF1 of the first substrate TGB and a second main surface CSF2 of the second substrate CGB face each other across a liquid crystal layer. Also, the first substrate TGB and the second substrate CGB are not limited to glass substrates. For example, at least one of the first substrate TGB and the second substrate CGB may be a resin substrate.

Even though a plurality of layers, the liquid crystal layer, and the like are interposed between the first main surface TSF1 of the first substrate TGB and the second main surface CSF2 of the second substrate CGB, only the drive electrodes TL(0) to TL(n+2), the liquid crystal layer and the color filter CFT interposed between the first main surface TSF1 and the second main surface CSF2 are illustrated in FIG. 1B. In addition, as illustrated in FIG. 1A, the plurality of detection electrodes RL(0) to RL(p) and a polarizer are arranged over the first main surface CSF1 of the second substrate CGB. In addition, in FIG. 1B, reference numeral 13 denotes a unit detection circuit connected to the detection electrode RL(n).

In the present specification, a description will be given assuming that, as illustrated in FIG. 1B, a state of the display device 1 viewed from a side of the first main surface CSF1 of the second substrate CGB and the first main surface TSF1 of the first substrate TGB is a plan view. In plan view from the side of the first main surfaces CSF1 and TSF1, as illustrated in FIG. 1A, the drive electrodes TL(0) to TL(p) extend in a row direction (lateral direction) and are arranged in parallel to each other in a column direction (longitudinal direction) on the first main surface TSF1 of the first substrate TGB. In addition, as illustrated in FIG. 1A, the detection electrodes RL(0) to RL(p) extend in the column direction (longitudinal direction) and are arranged in parallel to each other in the row direction (lateral direction) on the first main surface CSF1 of the second substrate CGB.

The second substrate CGB, the liquid crystal layer, and the like are interposed between the drive electrodes TL(0) to TL(p) and the detection electrodes RL(0) to RL(p). Therefore, the drive electrodes TL(0) to TL(p) and the detection electrodes RL(0) to RL(p) cross each other in plan view; however, the drive electrodes and the detection electrodes are electrically separated from each other. There is a capacitance between the drive electrode and the detection electrode. In FIG. 1B, the capacitance is illustrated as a capacitive element by dashed lines.

The drive electrodes TL(0) to TL(p) and the detection electrodes RL(0) to RL(p) are desirably perpendicular to each other in plan view; however, the drive electrode and the detection electrode may cross with each other at an angle other than the right angle in plan view. Therefore, it should be understood that "perpendicular" used in the following description includes "crossing."

Principles of Magnetic Field Detection

Figure 2A:
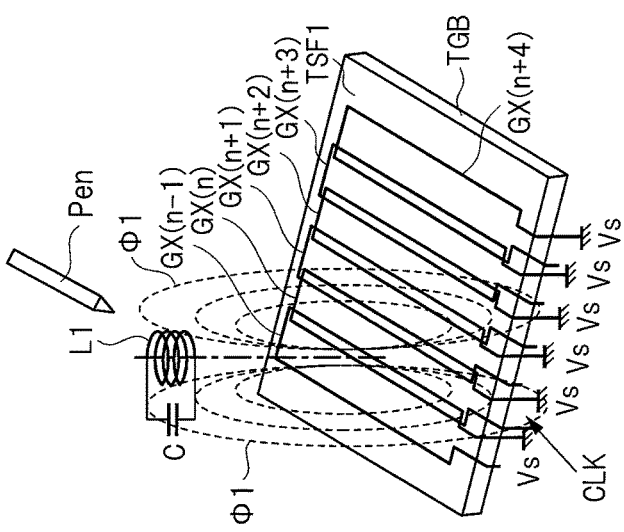
FIG. 2A is an explanatory diagram illustrating a principle of an electromagnetic induction method.
Figure 2B:
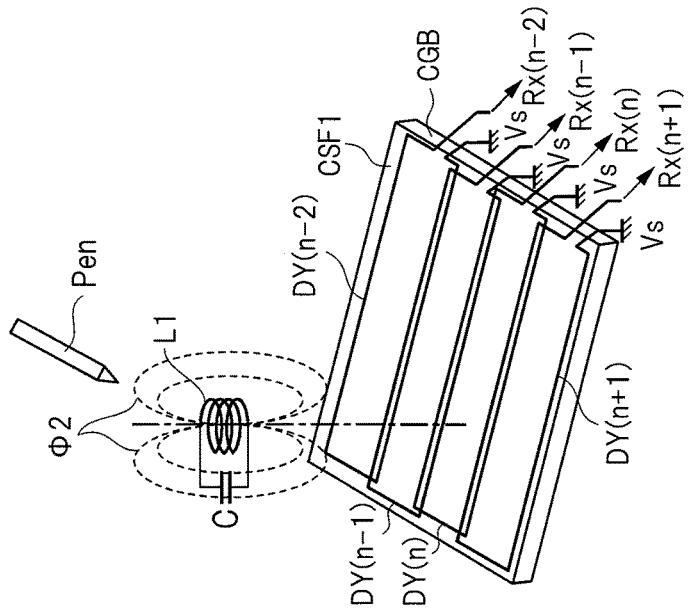
FIG. 2B is an explanatory diagram illustrating the principle of the electromagnetic induction method.
Figure 2C:
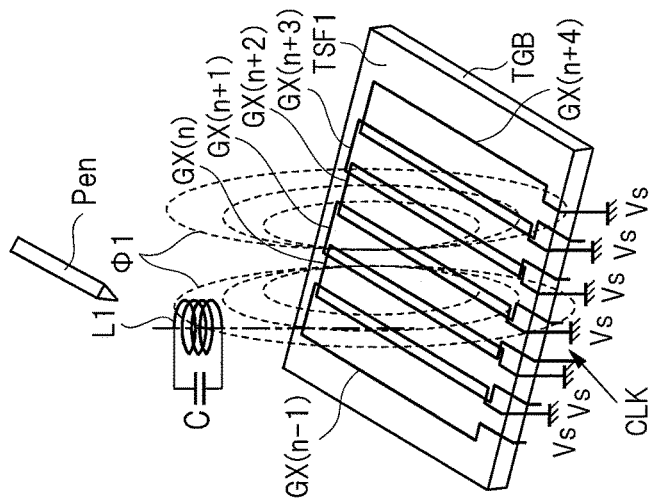
FIG. 2C is an explanatory diagram illustrating the principle of the electromagnetic induction method.

FIGS. 2A to 2C are explanatory diagrams illustrating a principle of magnetic field detection. A period of magnetic field detection is configured of a magnetic field generation period in which a magnetic field is generated and a magnetic field detection period in which a magnetic field is detected. FIGS. 2A and 2C illustrate an operation during the magnetic field generation period, and FIG. 2B illustrates an operation during the magnetic field detection period. For the sake of description, FIGS. 2A to 2C illustrate states obtained by rotating FIG. 1A by 90 degrees.

During the magnetic field generation period, ends of predetermined drive electrodes among the drive electrodes TL(0) to TL(p) are electrically connected, and a first voltage and a magnetic field drive signal CLK are supplied to the drive electrodes whose ends are connected. The first voltage is DC voltage, for example, a ground voltage Vs. For example, among one end and the other end of each of the drive electrodes TL(0) and TL(2) illustrated in FIG. 1A, the other end of each of the drive electrodes TL(0) and TL(2) on the right side in FIG. 1A is electrically connected. Thus, the drive electrodes TL(0) and TL(2) arranged in parallel to each other are connected in series. The ground voltage Vs is supplied to the one end of the drive electrode TL(0) on the left side in FIG. 1A, and the magnetic field drive signal is supplied to the one end of the drive electrode TL(2) on the left side in FIG. 1A. Here, the magnetic field drive signal is a signal whose voltage periodically changes. The drive electrodes TL(0) and TL(2) constitute a magnetic field generation coil where a region sandwiched (a region formed) by the drive electrodes is located inside the coil. The magnetic field generation coil generates a magnetic field corresponding to a change in voltage of the magnetic field drive signal inside the coil.

In FIG. 2A, reference character GX(n–1) denotes the magnetic field generation coil constituted by the drive electrodes TL(0) and TL(2). Similarly to the magnetic field generation coil GX(n–1), reference characters GX(n) to GX(n+4) denote magnetic field generation coils constituted by the drive electrodes TL(1) and TL(3) to TL(p).

In FIG. 2A, reference characters C and L1 denote a capacitive element and a coil incorporated in a pen, respectively. The capacitive element C and the coil L1 are connected in parallel such that the capacitive element and the coil constitute a resonance circuit. In the magnetic field generation period, the ground voltage Vs is supplied to one end of each of the magnetic field generation coils GX(n–1) to GX(n+3). The magnetic field drive signal CLK is supplied to the other end of the magnetic field generation coil GX(n). Therefore, the magnetic field generation coil GX(n) generates a magnetic field φ1 corresponding to a change in voltage of the magnetic field drive signal CLK. When the pen is in proximity to the magnetic field generation coil GX(n), the magnetic field generation coil GX(n) and the coil L1 are electromagnetically coupled, the magnetic field φ1 causes an induced voltage due to mutual induction to be generated in the coil L1, and the capacitive element C is charged.

Next, the magnetic field generation period transitions to the magnetic field detection period illustrated in FIG. 2B. In the magnetic field detection period, a magnetic field is detected by using the detection electrodes RL(0) to RL(p). Each of the detection electrodes RL(0) to RL(p) includes a pair of ends. Among one ends and the other ends of the detection electrodes RL(0) to RL(p), the other ends of predetermined detection electrodes are electrically connected to each other. For example, the other ends of the detection electrodes RL(0) and RL(3) illustrated in FIG. 1A are electrically connected to each other on the upper side in FIG. 1A. Therefore, the detection electrodes RL(0) and RL(3) arranged in parallel to each other are connected in series. In the magnetic field detection period, a second voltage is supplied to the one end of the detection electrode RL(3), and the one end of the detection electrode RL(0) is connected to the unit detection circuit. The second voltage is DC voltage, for example, a ground voltage Vs. Thus, a magnetic field detection coil is formed, and a region sandwiched (a region formed) by the detection electrodes RL(0) and RL(3) is located inside the coil. The magnetic field detection coil detects a magnetic field generated by the pen.

In FIG. 2B, reference character DY(n–2) denotes a magnetic field detection coil constituted by the detection electrodes RL(0) and RL(3). Similarly, reference characters DY(n–1) to DY(n+1) denote magnetic field detection coils constituted by the detection electrodes RL(2) to RL(p). In the magnetic field detection period, the ground voltage Vs is supplied to one end of each of the magnetic field detection coils DY(n–1) to DY(n+1). Signals Rx(n–2) to Rx(n+1) from the respective other ends of the magnetic field detection coils DY(n–2) to DY(n+1) are supplied to the unit detection circuits.

If the capacitive element C is charged in the magnetic field generation period, the coil L1 generates a magnetic field φ2 which changes according to a resonance frequency of the resonance circuit depending on electric charges charged in the capacitive element C in the magnetic field detection period. In FIG. 2B, the center (alternate long and short dash line) of the coil L1 is present inside the magnetic field detection coil DY(n). Therefore, the magnetic field detection coil DY(n) and the coil L1 are electromagnetically coupled to each other, and an induced voltage is generated in the magnetic field detection coil DY(n) due to mutual induction. As a result, the signal Rx(n) from the other end of the magnetic field detection coil DY(n) changes according to a charge quantity charged in the capacitive element C. The unit detection circuit connected to the magnetic field detection coil DY(n) outputs the change in the signal Rx(n) as a detection signal. Accordingly, it is possible to detect whether the pen is in proximity (touches) and to extract the coordinates of the pen. In addition, since the detection signal changes according to the charge quantity, it is possible to determine a distance to the pen.

FIG. 2C illustrates the magnetic field generation period subsequent to the state illustrated in FIG. 2B. FIG. 2C is different from FIG. 2A in that the magnetic field drive signal CLK is supplied to the magnetic field generation coil GX(n+1). Since the position of the pen is not changed, an induced voltage is not generated in the coil L1 and the capacitive element C is not charged in the magnetic field generation period illustrated in FIG. 2C. Therefore, in the magnetic field detection period subsequent to the state illustrated in FIG. 2C, it is detected that the pen is not in proximity. Subsequently, the pen is detected in the same manner.

Principle of Electric Field Detection

Figure 3A:
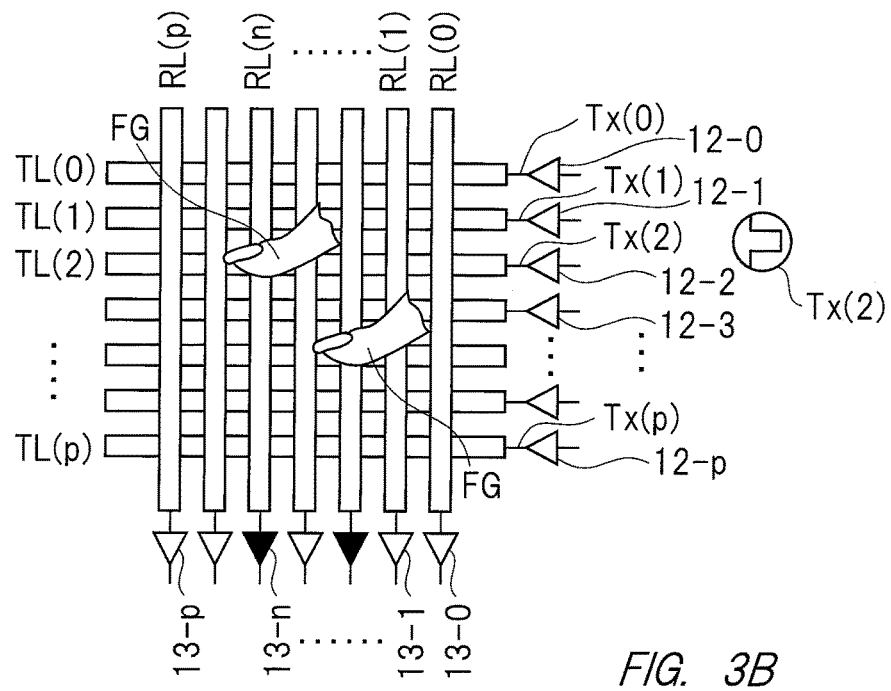
FIG. 3A is an explanatory diagram illustrating a principle of a capacitive sensing method.
Figure 3B:
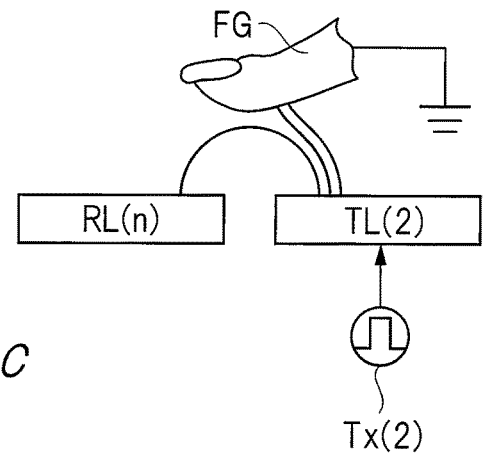
FIG. 3B is an explanatory diagram illustrating the principle of the capacitive sensing method.
Figure 3C:
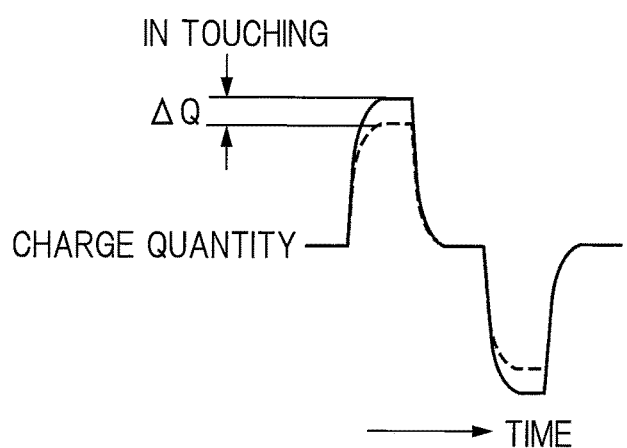
FIG. 3C is a graph illustrating the principle of the capacitive sensing method.

FIG. 3A is an explanatory diagram illustrating a principle of electric field detection, FIG. 3B is an explanatory diagram illustrating the principle of the electric field detection, and FIG. 3C is a graph illustrating the principle of the electric field detection. In FIG. 3A, each of reference characters 12-0 to 12-*p* denotes a unit drive circuit outputting an electric field drive signal, and each of reference characters 13-0 to 13-*p* denotes the unit detection circuit. In addition, in FIG. 3A, a pulse signal encircled by a solid line represents a waveform of an electric field drive signal Tx(2) supplied to the drive electrode TL(2). Reference character FG denotes a finger as an external object.

When the electric field drive signal Tx(2) is supplied to the drive electrode TL(2), an electric field is generated between the drive electrode TL(2) and the detection electrode RL(n) perpendicular to the drive electrode TL(2) as illustrated in FIG. 3B. At this time, when the finger FG touches the vicinity of the drive electrode TL(2), an electric field is also generated between the finger FG and the drive electrode TL(2), and the electric field generated between the drive electrode TL(2) and the detection electrode RL(n) reduces. Accordingly, a charge quantity between the drive electrode TL(2) and the detection electrode RL(n) reduces. As a result, as illustrated in FIG. 3C, the charge quantity generated in response to supply of the drive signal Tx(2) when the finger FG touches the vicinity is smaller by ΔQ than that when the finger FG does not touch the vicinity. The difference in charge quantity leads to a difference in voltage, and the difference in voltage is supplied to the unit detection circuit 13-*n* and is output as a detection signal.

Similarly, by supplying an electric field drive signal to each of the other drive electrodes, a change in voltage of the signal depending on whether or not the finger FG touches the vicinity of the drive electrode is generated in one of the detection electrodes RL(0) to RL(p), and the change in voltage is output as a detection signal. Thus, it is possible to detect whether or not the finger FG touches and to extract the coordinates of the finger.

As described above, in magnetic field detection, a magnetic field drive signal is supplied to a drive electrode selected from among the drive electrodes TL(0) to TL(p), and in electric field detection, an electric field drive signal is supplied to the selected drive electrode. Meanwhile, in displaying, a display drive signal is supplied to each of the drive electrodes TL(0) to TL(p). Since the display drive signal causes the drive electrodes TL(0) to TL(p) to have the same voltage, the drive electrodes TL(0) to TL(p) can be considered as one common electrode.

Entire Configuration of Display Device

Figure 4:
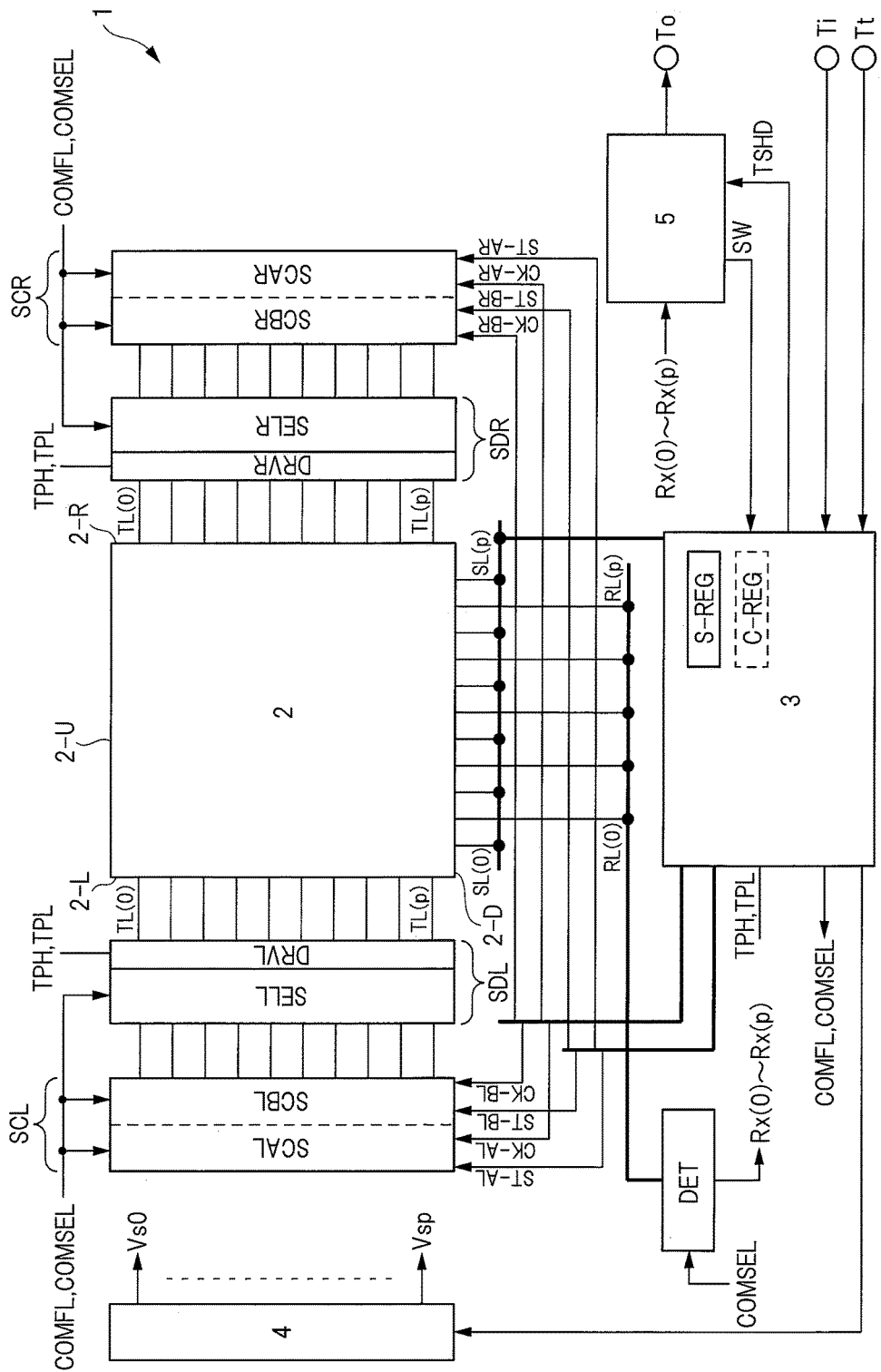
FIG. 4 is a block diagram illustrating a configuration of a display device according to a first embodiment.

FIG. 4 is a block diagram illustrating the configuration of the display device 1 according to the first embodiment. In FIG. 4, the display device 1 includes a display panel (liquid crystal panel), a control device 3, a gate driver 4, and a touch control device 5. In addition, the display device 1 further includes a first scanner circuit pair SCL, a second scanner circuit pair SCR, a first selection drive circuit SDL, a second selection drive circuit SDR, and a detection circuit DET. The display panel includes a display region where display is performed, and a frame region in the periphery of the display region. In terms of display, the display region is an active region, and the frame region surrounding the display region is a non-active region. In FIG. 4, reference numeral 2 denotes the display region.

The display region 2 includes a pixel array where a plurality of pixels are arranged in a matrix. In the pixel array, a plurality of signal lines, the plurality of drive electrodes, a plurality of scan lines, and the plurality of detection electrodes are arranged. With reference to FIG. 4, in the pixel array, the signal lines SL(0) to SL(p) extend in the longitudinal direction (column direction) and are arranged in parallel to one another in the lateral direction (row direction). In addition, the drive electrodes TL(0) to TL(p) extend in the lateral direction and are arranged in parallel to one another in the longitudinal direction. Further, the scan lines extend in the lateral direction and are arranged in parallel to one another in the longitudinal direction. The detection electrodes RL(0) to RL(p) extend in the longitudinal direction and are arranged in parallel to one another in the lateral direction. In this case, the pixels are arranged in spaces formed by the plurality of signal lines and the plurality of scan lines crossing each other. In a period for display (display period), a pixel is selected by the signal line and the scan line, a voltage of the signal line and a voltage of the drive electrode at this time are applied to the selected pixel, and display according to the difference in voltage between the signal line and the drive electrode is performed.

The control device 3 receives a timing signal supplied to an external terminal Tt and image information supplied to an input terminal Ti, generates an image signal according to the image information in the display period, and supplies the image signal to the plurality of signal lines SL(0) to SL(p). In addition, the control device 3 receives the timing signal supplied to the external terminal Tt and a control signal SW supplied from the touch control device 5, and generates various signals. In FIG. 4, only signals necessary for the description are depicted as representatives among the signals generated by the control device 3. That is, the control device 3 generates a synchronization signal TSHD, drive signals TPH and TPL, a control signal COMFL, and a detection timing signal COMSEL. In addition, the control device 3 generates shift clock signals CK-AR, CK-BR, CK-AL, and CK-BL, and start signals ST-AR, ST-BR, ST-AL, and ST-BL.

Here, the control device 3 is one example of a controller according to the present invention.

In the first embodiment, the control device 3 includes a separation quantity register S-REG, although there is no particular limitation. Based on information stored in the separation quantity register S-REG, the control device 3 generates the start signals ST-AR, ST-BR, ST-AL, and ST-BL, and the shift clock signals. In addition, the control device 3 includes a bundle register C-REG depicted by a dashed line. Based on information stored in the bundle register C-REG, the control device 3 generates the start signals ST-AR, ST-BR, ST-AL, and ST-BL, and the shift clock signals.

The synchronization signal TSHD is a synchronization signal for discriminating the display period in which display is performed in the display region 2 and a touch detection period in which touch detection is performed in the display region 2. The control device 3 controls such that the touch control device 5 operates in the touch detection period by using the synchronization signal TSHD.

In displaying, the gate driver 4 generates scan line signals Vs0 to Vsp according to a timing signal from the control device 3 and supplies the scan line signals Vs0 to Vsp to the scan lines in the display region 2. In the display period, pixels connected to a scan line to which a high-level scan line signal is supplied are selected, and the selected pixels perform display according to image signals supplied to the signal lines SL(0) to SL(p) at this time.

Note that, in FIG. 4, the gate driver 4 is arranged only in the frame region along a side 2-L of the display region 2; however, the gate driver 4 with the same configuration may also be arranged in the frame region along a side 2-R.

In magnetic field touch detection or electric field touch detection, the detection circuit DET detects changes in signal in the detection electrodes RL(0) to RL(p) and outputs detection signals Rx(0) to Rx(p).

The touch control device 5 receives the detection signals Rx(0) to Rx(p), extracts the coordinates of the touched location, and outputs the coordinates from an external terminal To. In addition, the touch control device 5 outputs the control signal SW, and the touch control device 5 receives the synchronization signal TSHD and operates in synchronization with the control device 3.

The display region 2 has sides 2-U and 2-D parallel to the row of the pixel array, and sides 2-R and 2-L parallel to the column of the pixel array. Here, the side 2-U and the side 2-D face each other, and the plurality of drive electrodes and the plurality of scan lines in the pixel array are arranged between the two sides. In addition, the side 2-R and the side 2-L face each other, and the plurality of signal lines and the plurality of detection electrodes in the pixel array are arranged between the two sides.

The first scanner circuit pair SCL and the first selection drive circuit SDL are arranged along the side 2-L of the display region 2 such that the first scanner circuit pair SCL and the first selection drive circuit SDL are in proximity to first ends of the plurality of drive electrodes, and the first selection drive circuit SDL is connected to the first end of each of the drive electrodes TL(0) to TL(p) on the side 2-L. Similarly, the second scanner circuit pair SCR and the second selection drive circuit SDR are arranged along the side 2-R of the display region 2 such that the second scanner circuit pair SCR and the second selection drive circuit SDR are in proximity to second ends of the plurality of drive electrodes, and the second selection drive circuit SDR is connected to the second end of each of the drive electrodes TL(0) to TL(p) on the side 2-R.

The first scanner circuit pair SCL includes a pair of a first scanner circuit SCAL and a second scanner circuit SCBL, and the first selection drive circuit SDL includes a selection circuit SELL and a drive circuit DRVL. Similarly, the second scanner circuit pair SCR includes a pair of a third scanner circuit SCAR and a fourth scanner circuit SCBR, and the second selection drive circuit SDR includes a selection circuit SELR and a drive circuit DRVR.

Each of the drive circuit DRVL and the drive circuit DRVR includes a signal wire TPH and a signal wire TPL to which the drive signal TPH and the drive signal TPL are supplied from the control device 3.

In magnetic field touch detection, the first scanner circuit pair SCL, the second scanner circuit pair SCR, the first selection drive circuit SDL, and the second selection drive circuit SDR select a desired drive electrode from among the drive electrodes TL(0) to TL(p) and supply a magnetic field drive signal to the selected drive electrode. Also in electric field touch detection, the first scanner circuit pair SCL, the second scanner circuit pair SCR, the first selection drive circuit SDL, and the second selection drive circuit SDR select a desired drive electrode and supply an electric field drive signal to the selected drive electrode. Therefore, in magnetic field touch detection or electric field touch detection, it can be considered that a drive circuit driving a drive electrode is constituted by the first scanner circuit pair SCL, the second scanner circuit pair SCR, the first selection drive circuit SDL, and the second selection drive circuit SDR.

The first scanner circuit pair SCL, the second scanner circuit pair SCR, the first selection drive circuit SDL, and the second selection drive circuit SDR will be described in detail later with reference to the drawings. Therefore, a further description will not be given here.

Module Configuration of Display Device

Figure 5:
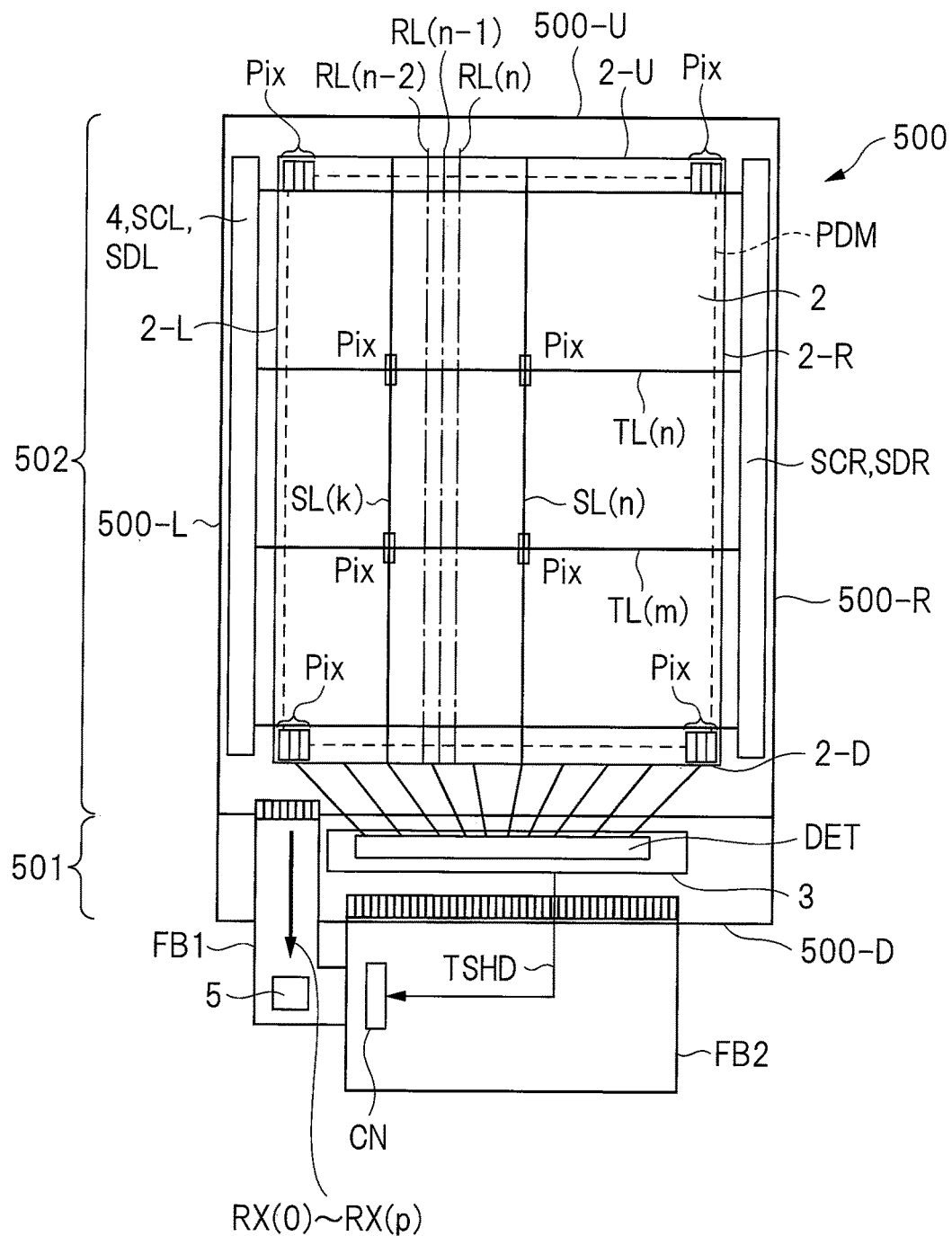
FIG. 5 is a plan view illustrating a configuration of a module according to the first embodiment.

FIG. 5 is a schematic plan view illustrating an entire configuration of a module 500 mounted with the display device 1 according to the first embodiment. FIG. 5 schematically depicts the actual arrangement. In FIG. 5, reference numeral 501 denotes a region of the first substrate TGB illustrated in FIGS. 1A and 1B, and reference numeral 502 denotes a region where the first substrate TGB and the second substrate CGB are layered. In the module 500, the first substrate TGB in the region 501 and the first substrate TGB in the region 502 are integrated. In addition, in the region 502, the second substrate CGB is mounted over the first substrate TGB such that the first main surface TSF1 of the first substrate TGB faces the second main surface CSF2 of the second substrate CGB. In addition, in FIG. 5, reference characters 500-U and 500-D denote short sides of the module 500, and reference characters 500-L and 500-R denote long sides of the module 500.

The gate driver 4, the first scanner circuit pair SCL, and the first selection drive circuit SDL illustrated in FIG. 4 are arranged in the frame region between the side 2-L of the display region 2 and the side 500-L of the module 500, in the region 502. The second scanner circuit pair SCR and the second selection drive circuit SDR illustrated in FIG. 4 are arranged in the frame region between the side 2-R of the display region 2 and the side 500-R of the module 500. The detection circuit DET and the control device 3 illustrated in FIG. 4 are arranged in the frame region between the side 2-D of the display region 2 and the side 500-D of the module 500. The detection circuit DET is constituted by a wire and a component formed on the first main surface TSF1 of the first substrate TGB in the region 501. The control device 3 is mounted on the first substrate TGB such that the control device 3 covers the detection circuit DET in plan view. In addition, wires and components constituting the first scanner circuit pair SCL, the second scanner circuit pair SCR, the first selection drive circuit SDL, and the second selection drive circuit SDR are also formed on the first main surface TSF1 of the first substrate TGB, in the region 502.

The detection signals Rx(0) to Rx(p) described with reference to FIG. 4 are supplied to the touch control device 5 via a wire in a flexible cable FB1. A flexible cable FB2 is connected to the region 501. The touch control device 5 transmits and receives a signal to and from the control device 3 via a connector CN provided at the flexible cable FB2. Arrangements of the detection circuit DET and the touch control device are not limited to this. For example, both the detection circuit DET and the touch control device may be arranged on at least one of the flexible cable FB1, the flexible cable FB2, or the region 501. The display device may use a flexible substrate, for example, FPC, instead of the flexible cable.

As described above, the display region 2 includes the pixel array where the plurality of pixels are arranged in a matrix. The display region 2 includes the plurality of drive electrodes TL(0) to TL(p) and the plurality of scan lines arranged along the row of the pixel array, and the plurality of signal lines SL(0) to SL(p) and the plurality of detection electrodes RL(0) to RL(p) arranged along the column of the array. FIG. 5 illustrates two drive electrodes TL(n) and TL(m), two signal lines SL(k) and SL(n), and three detection electrodes RL(n−2) to RL(n) by way of example. Note that the scan lines are omitted in FIG. 5; however, the scan lines extend in parallel to the drive electrodes TL(n) and TL(m) illustrated as examples.

In addition, in FIG. 5, the pixel array is depicted by a dashed line PDM. Reference character Pix denotes each of the pixels arranged at four corners of the display region 2 and the pixels arranged at the intersections of the drive electrodes and the signal lines illustrated as examples among the plurality of pixels arranged in the pixel array PDM.

Figure 6:
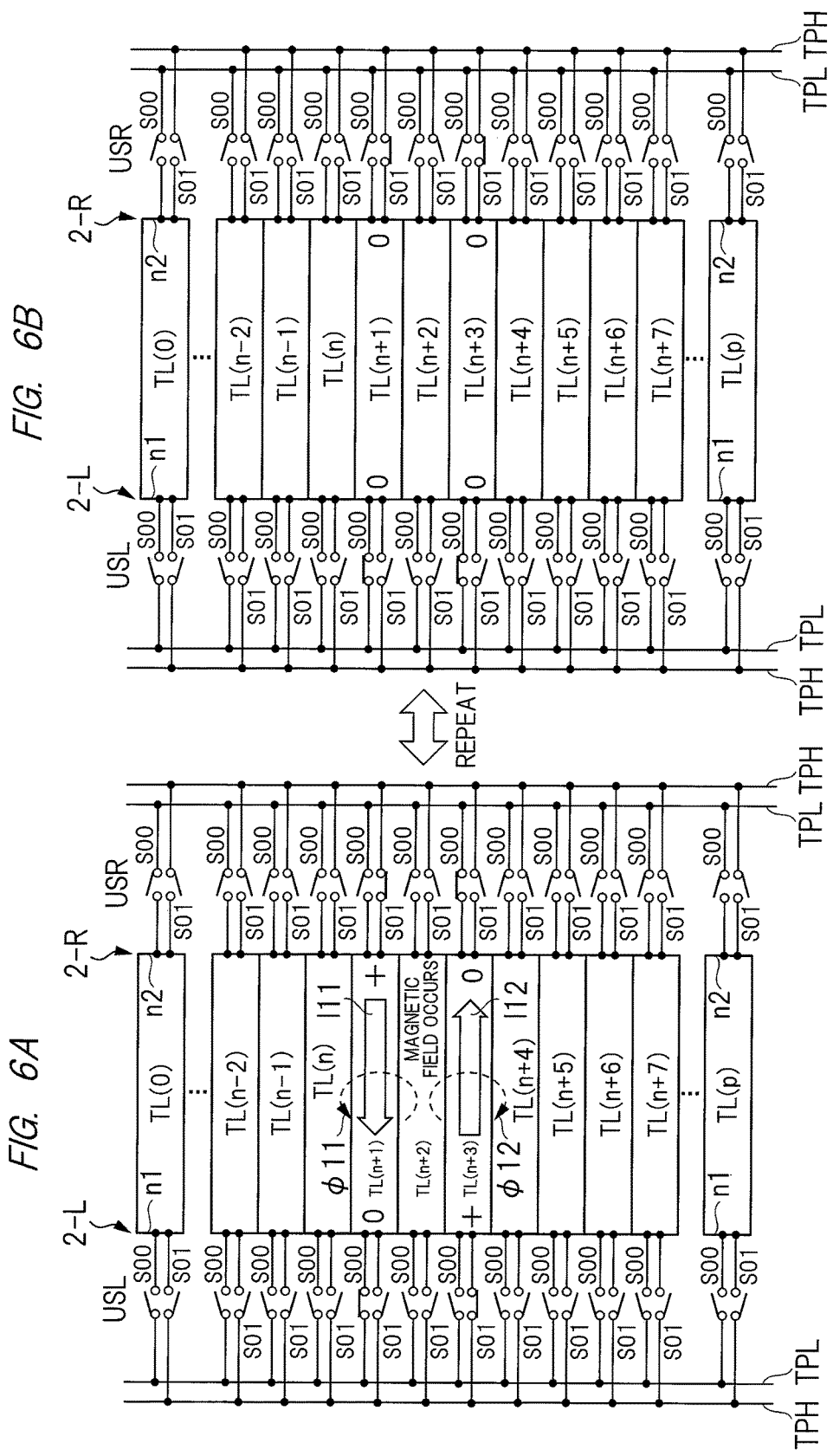
FIG. 6A is an explanatory diagram illustrating a driving method of the electromagnetic induction method according to the first embodiment.
FIG. 6B is an explanatory diagram illustrating the driving method of the electromagnetic induction method according to the first embodiment.
Figure 7:
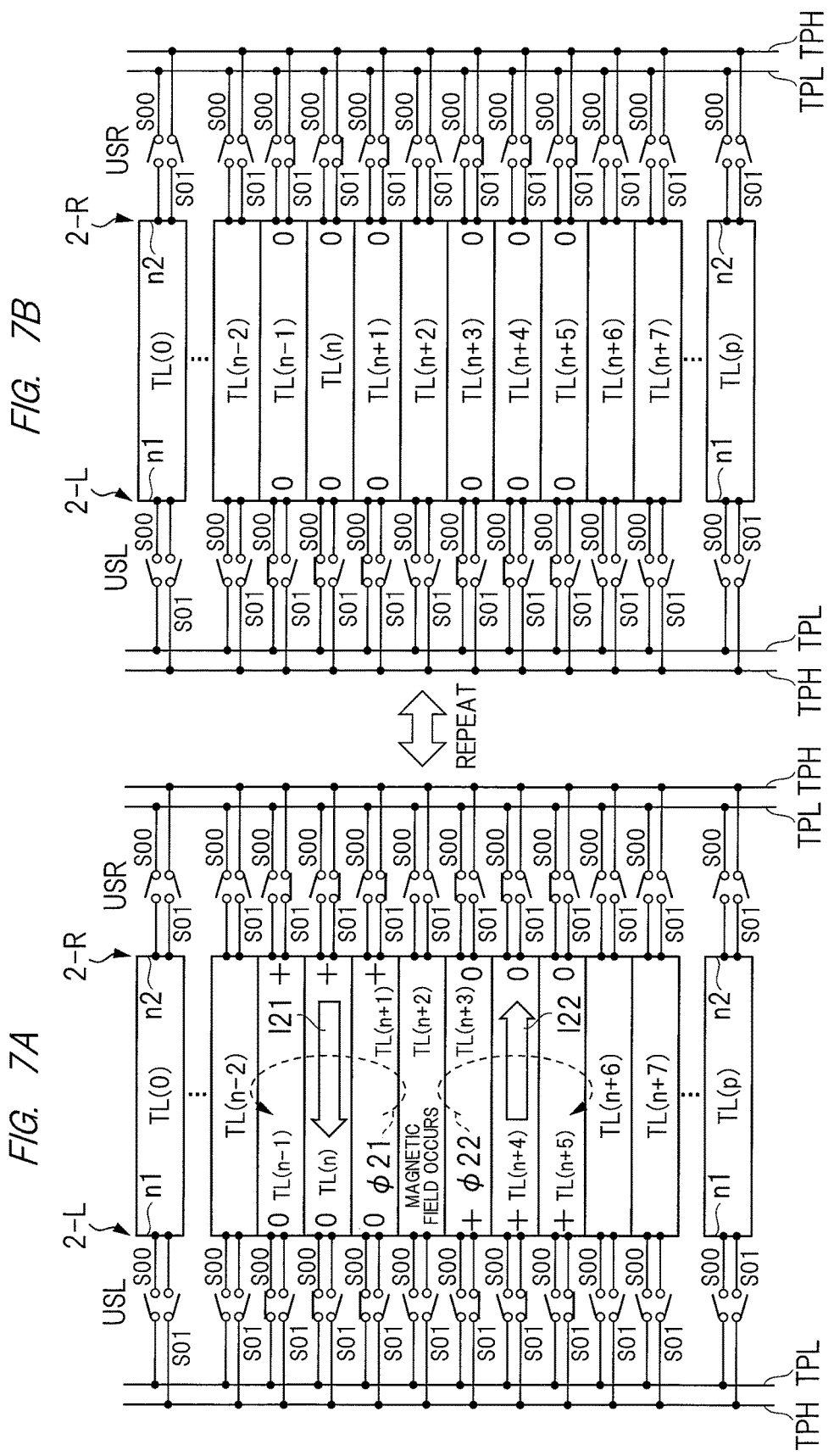
FIG. 7A is an explanatory diagram illustrating another driving method of the electromagnetic induction method according to the first embodiment.
FIG. 7B is an explanatory diagram illustrating the driving method of the electromagnetic induction method of FIG. 7A.
Figure 8:
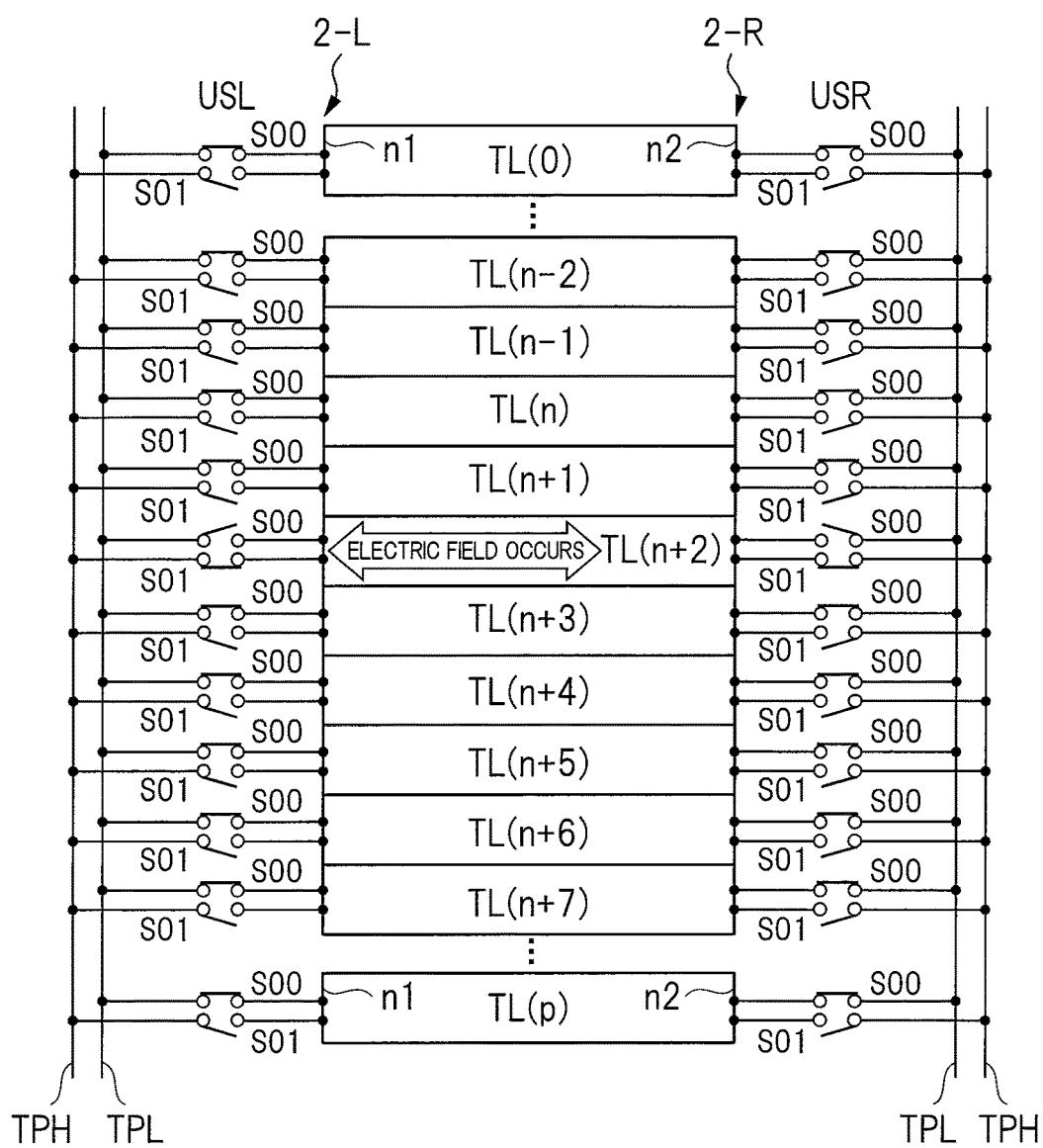
FIG. 8 is an explanatory diagram illustrating a driving method of the capacitive sensing method according to the first embodiment.

Driving Methods of Both Electromagnetic Induction Method and Capacitive Sensing Method FIGS. 6A and 6B are explanatory diagrams for describing a driving method of the electromagnetic induction method according to the first embodiment, FIGS. 7A and 7B are explanatory diagrams illustrating another driving method of the electromagnetic induction method according to the first embodiment, and FIG. 8 are an explanatory diagram for describing the driving method of the capacitive sensing method according to the first embodiment.

In the first embodiment, the display device will be described in which an input detection device capable of performing input detection by the electromagnetic induction method and performing input detection by the capacitive sensing method with one device configuration is incorporated. The display device according to the first embodiment can perform detection operation of the electromagnetic induction method, detection operation of the capacitive sensing method, and display operation in a time-division manner with one device configuration. However, the present invention is not limited to the first embodiment. For example, an input detection device performing input detection by the electromagnetic induction method, an input detection device by the capacitive sensing method, and a display device performing display operation can be overlapped with one another and used. Also, the display device can be formed of an input detection device performing input detection by the electromagnetic induction method and a device performing input detection by the capacitive sensing method and display operation.

FIG. 6A is an explanatory diagram illustrating the driving method of the electromagnetic induction method according to the first embodiment, and FIG. 6B is an explanatory diagram illustrating the driving method of the electromagnetic induction method according to the first embodiment. FIGS. 2A to 2C illustrate a principle of magnetic field touch detection with reference to an example in which ends of two drive electrodes arranged to be separated from each other are connected in series so as to configure the loop-shaped magnetic field generation coil. In the first embodiment, in magnetic field touch detection, two drive electrodes arranged to be separated from each other are simultaneously selected, and drive voltages are supplied such that currents flow through the drive electrodes in opposite directions.

In FIGS. 6A and 6B, a drive electrode TL(n+3) and a drive electrode TL(n+1) arranged to be separated from each other are simultaneously selected from among the drive electrodes TL(0) to TL(p) arrayed along the sides 2-L and 2-R of the display region 2.

The AC signal as the magnetic field drive signal is supplied to the signal wire TPH. The AC signal as the magnetic field drive signal fluctuates, for example, between the zero voltage and a positive voltage having higher voltage value than the zero voltage. The positive voltage may be any value as long as the voltage value is higher than the zero voltage.

Note that a phase and an amplitude of an AC signal supplied to the signal wire TPH along the side 2-L of the display region are identical to a phase and an amplitude of an AC signal supplied to the signal wire TPH along the side 2-R. The zero voltage as the ground voltage Vs is supplied to the signal wire TPL.

FIG. 6A illustrates a drive state when the positive voltage is supplied from the signal wire TPH to the selected drive electrodes.

An end n1 of the drive electrode TL(n+3) is connected to the signal wire TPH via a first switch S01 of a unit drive circuit USL, and the positive voltage denoted by + is supplied to the end n1. An end n2 of the drive electrode TL(n+3) is connected to the signal wire TPL via a second switch S00 of a unit drive circuit USR, and the zero voltage denoted by 0 is supplied to the end n2. Since the + voltage is higher than the 0 voltage, a current I12 flows in a direction from the end n1 toward the end n2 of the drive electrode TL(n+3), and a magnetic field φ12 is generated around the drive electrode TL(n+3).

In addition, an end n1 of the drive electrode TL(n+1) is connected to the signal wire TPL via a second switch S00 of the unit drive circuit USL, and the zero voltage denoted by − is supplied to the end n1. An end n2 of the drive electrode TL(n+1) is connected to the signal wire TPH via a first switch S01 of the unit drive circuit USR, and the positive voltage denoted by + is supplied to the end n2. Therefore, a current I11 flows in a direction from the end n2 toward the end n1 in the drive electrode TL(n+1), and a magnetic field φ11 is generated around the drive electrode TL(n+1).

At this time, since the directions of the current I12 flowing through the drive electrode TL(n+3) and the current I11 flowing through the drive electrode TL(n+1) are opposite to each other, it can be considered that the drive electrode TL(n+3) and the drive electrode TL(n+1) each constitute a loop-shaped magnetic field generation coil even though the ends of the drive electrodes are not connected in series. The magnetic field φ11 generated by the current I11 and the magnetic field φ12 generated by the current I12 have opposite directions and overlap in the region of a non-selected drive electrode TL(n+2) arranged between the drive electrode TL (n+3) and the drive electrode TL(n+1). Thus, a strong magnetic field can be generated in a region of the drive electrode TL(n+2) when the positive voltage is supplied from the signal wire TPH.

Here, the drive electrode TL(n+3) is referred to as one example of a first drive electrode according to the present invention, the drive electrode TL(n+1) is referred to as one example of a second drive electrode according to the present invention, the positive voltage is referred to as one example of a first drive voltage according to the present invention, and the zero voltage is referred to as one example of a second drive voltage according to the present invention. In the present embodiment, the first drive voltage is higher in voltage value than the second drive voltage. The second drive voltage is not limited to the zero voltage and may be any voltage as long as the voltage is different from the first drive voltage and is lower in voltage value than the first drive voltage. In addition, the end n1 of each of the drive electrodes TL(0) to TL(p) is referred to as a first end and the end n2 of each of the drive electrodes TL(0) to TL(p) is referred to as a second end.

In FIG. 6A, the drive electrodes are driven such that the current flows from the first end to the second end in the first drive electrode and the current flows from the second end to the first end in the second drive electrode. However, the drive electrodes may be driven such that the current flows from the second end to the first end in the first drive electrode and the current flows from the first end to the second end in the second drive electrode.

Each of the non-selected drive electrodes including the drive electrode TL(n+2) has a floating potential, which means that a drive voltage is not supplied to the drive electrode.

FIG. 6B illustrates a drive state when the zero voltage is supplied to the selected drive electrodes from the signal wire TPH. In the state illustrated in FIG. 6B, the zero voltage is supplied to both ends of the drive electrodes TL(n+1) and TL(n+3), and no current flows through the drive electrodes. Therefore, no magnetic field is generated in the region of the drive electrode TL(n+2). After that, when the drive voltage supplied from the signal wire TPH changes into the positive voltage, the state again turns into the drive state illustrated in FIG. 6A, and the magnetic fields are generated. In the magnetic field generation period in the magnetic field touch detection, the state illustrated in FIG. 6A and the state illustrated in FIG. 6B alternately occur according to the change in voltage of the magnetic field drive signal.

The magnetic field touch detection by the electromagnetic induction method illustrated in FIGS. 6A and 6B will be described in detail later with reference to FIGS. 9 to 14 and the like.

FIG. 7A is an explanatory diagram illustrating another driving method of the electromagnetic induction method, and FIG. 7B is an explanatory diagram illustrating the driving method of the electromagnetic induction method of FIG. 7A. A case where one first drive electrode and one second drive electrode are provided has been described with reference to FIGS. 6A and 6B; however, in FIGS. 7A and 7B, each of the first drive electrode and the second drive electrode includes a plurality of adjacent drive electrodes.

In FIG. 7A, in the magnetic field touch detection period, three adjacent drive electrodes (hereinafter also referred to as a drive electrode bundle) TL(n−1) to TL(n+1), and three adjacent drive electrodes TL(n+3) to TL(n+5) are simultaneously selected and are driven such that currents flow in opposite directions. The drive electrode bundle TL(n+3) to TL(n+5) corresponds to the first drive electrode, and the drive electrode bundle TL(n−1) to TL(n+1) corresponds to the second drive electrode. In a case where each of the first drive electrode and the second drive electrode is constituted by a bundle of a plurality of drive electrodes, generated magnetic fields φ21 and φ22 can be made stronger than the magnetic fields illustrated in FIG. 6A, and detection sensitivity of magnetic field touch detection improves. It is assumed that the number of drive electrodes bundled together as the first drive electrode is the same as the number of drive electrodes bundled together as the second drive electrode; however, the present invention is not limited to this. The number of drive electrodes bundled together is not limited to three and may be set to an optional number.

In FIG. 7A, the positive voltage denoted by + is supplied simultaneously to the first end n1 of each of the first drive electrodes TL(n+3) to TL(n+5) from the signal wire TPH, and the zero voltage denoted by 0 is simultaneously supplied to the second end n2 of each of the first drive electrodes TL(n+3) to TL(n+5) from the signal wire TPL. In addition, the positive voltage denoted by + is supplied simultaneously to the second end n2 of each of the second drive electrodes TL(n−1) to TL(n+1) from the signal wire TPH, and the zero voltage denoted by 0 is simultaneously supplied to the first end n1 of each of the second drive electrodes TL(n−1) to TL(n+1) from the signal wire TPL.

In FIG. 7A, a current I21 flows in the direction from the second end n2 to the first end n1 in the second drive electrodes TL(n−1) to TL(n+1), and a current I22 flows in the direction from the first end n1 to the second end n2 in the first drive electrodes TL(n+3) to TL(n+5).

In FIG. 7A, two drive electrode bundles TL(n−1) to TL(n+1) and TL(n+3) to TL(n+5) are arranged to be separated from each other across the non-selected drive electrode TL(n+2), and magnetic fields φ21 and φ22 generated by the two drive electrode bundles overlap in the region of the drive electrode TL(n+2). After that, when the voltage of the signal wire TPH changes into the zero voltage, the state turns into the drive state illustrated in FIG. 7B, and no magnetic field is generated between the two drive electrode bundles. In the magnetic field generation period, the state illustrated in FIG. 7A and the state illustrated in FIG. 7B alternately occur.

In an example of a method for setting the number of drive electrodes included in the drive electrode bundle, the bundle register C-REG depicted by the dashed line in FIG. 4 is provided in the control device 3 and information for determining the number of drive electrodes included in the drive electrode bundle, that is, the number of first drive electrodes and the number of second drive electrodes that are simultaneously selected, can be stored in the bundle register C-REG.

In addition, the control device 3 can store, in the separation quantity register S-REG illustrated in FIG. 4, information for determining the number of non-selected drive electrodes arranged between the first drive electrode and the second drive electrode, that is, the separation quantity between the first drive electrode and the second drive electrode.

When each of the number of first drive electrodes bundled together and the number of second drive electrodes bundled together is great, detection sensitivity improves. When the number of drive electrodes bundled together is small, detection resolution improves. In addition, detection resolution, detection sensitivity, and the like can be controlled also by the separation quantity. By changing information stored in the bundle register C-REG and the separation quantity register S-REG, the number of drive electrodes bundled together and the separation quantity can be optionally set.

FIG. 8 is an explanatory diagram illustrating a driving method of the capacitive sensing method. In electric field touch detection by the capacitive sensing method, a desired drive electrode is selected from among the drive electrodes TL(0) to TL(p), and an electric field drive signal is supplied to the selected drive electrode. In FIG. 8, the drive electrode TL(n+2) is selected, and an electric field is generated in the region of the drive electrode TL(n+2).

A first end n1 of the selected drive electrode TL(n+2) is connected to the signal wire TPH via the first switch S01 of the unit drive circuit USL, and a second end n2 of the selected drive electrode TL(n+2) is connected to the signal wire TPH via the first switch S01 of the unit drive circuit USR. In addition, the first end n1 of each of the non-selected drive electrodes TL(0) to TL(n+1) and TL(n+3) to TL(p) is connected to the signal wire TPL via the second switch S00 of the unit drive circuit USL, and the second end n2 of each of the non-selected drive electrodes is connected to the signal wire TPL via the second switch S00 of the unit drive circuit USR.

In electric field touch detection, a third voltage is supplied to the signal wire TPL. Examples of the third voltage include DC voltages such as the ground voltage Vs or a drive voltage VCOMDC for display. The AC drive signal as the electric field drive signal is supplied to the signal wire TPH. For example, a voltage value of the AC drive signal in electric field touch detection periodically changes between the ground voltage Vs and a voltage Vd which is higher than the ground voltage Vs.

The voltage supplied from the signal wire TPH in electric field touch detection is referred to as a third drive voltage. The third voltage supplied to the signal wire TPL is not particularly limited, and an optional voltage can be used. The same goes for the electric field drive signal supplied to the signal wire TPH.

In electric field touch detection, the electric field drive signal is supplied from both ends of the drive electrode. In accordance with this supplied signal, an electric field is generated, and a detection signal according to the electric field drive signal is output from the detection electrode which forms a capacitance together with the drive electrode.

Electric field touch detection by the capacitive sensing method illustrated in FIG. 8 will be described in detail later with reference to FIGS. 15 to 17, and the like.

Figure 9:
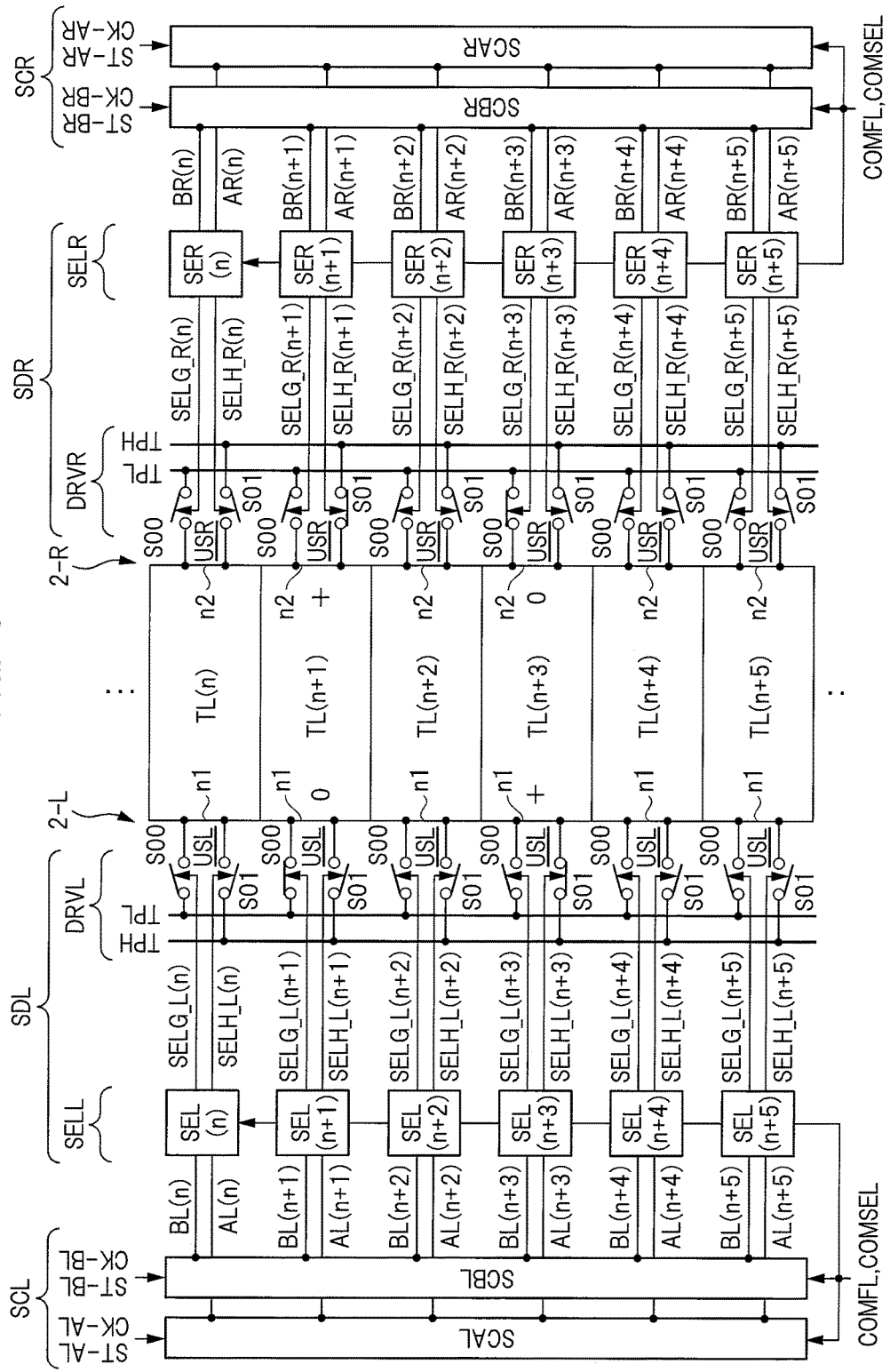
FIG. 9 is a block diagram illustrating each configuration of a first scanner circuit pair, a second scanner circuit pair, a first selection drive circuit, and a second selection drive circuit according to the first embodiment.

Configurations of First Scanner Circuit Pair, Second Scanner Circuit Pair, First Selection Drive Circuit, and Second Selection Drive Circuit FIG. 9 is a block diagram illustrating each configuration of the first scanner circuit pair SCL, the second scanner circuit pair SCR, the first selection drive circuit SDL, and the second selection drive circuit SDR according to the first embodiment. FIG. 9 illustrates a configuration corresponding to the driving method of the electromagnetic induction method illustrated in FIGS. 6A and 6B. In FIG. 9, in order to prevent the drawing from being complicated, only a portion of the first scanner circuit pair SCL, the second scanner circuit pair SCR, the first selection drive circuit SDL, and the second selection drive circuit SDR, the portion corresponding to the drive electrodes TL(n) to TL(n+5) from among the drive electrodes TL(0) to TL(p) arranged in the display region 2 is illustrated. The configurations corresponding to the drive electrodes TL(0) to TL(n−1) and the drive electrodes TL(n+6) to TL(p) not illustrated in FIG. 9 are similar. Here, the portion illustrated in FIG. 9 will be described as a representative.

The first selection drive circuit SDL includes the selection circuit SELL and the drive circuit DRVL and is arranged along the side 2-L of the display region 2. The drive circuit DRVL includes the plurality of unit drive circuits USL corresponding to the drive electrodes TL(n) to TL(n+5), respectively. In addition, the selection circuit SELL also includes unit selection circuits SEL(n) to SEL(n+5) corresponding to the drive electrodes TL(n) to TL(n+5), respectively. In addition, each of the drive electrodes TL(n) to TL(n+5) includes a pair of the first end n1 and the second end n2.

The unit drive circuits USL respectively correspond to the unit selection circuits SEL(n) to SEL(n+5) on a one-to-one basis. The unit drive circuit includes the first switch S01 and the second switch S00. The first switch S01 is connected between the first end n1 of the corresponding drive electrode and the signal wire TPH. The second switch S00 is connected between the first end n1 of the corresponding drive electrode and the signal wire TPL. Switching of the first switch S01 is controlled by a first unit selection signal from the corresponding unit selection circuit. Switching of the second switch S00 is also controlled by a second unit selection signal from the corresponding unit selection circuit.

The drive electrode TL(n) will be described as an example. The unit selection circuit SEL(n) and the unit drive circuit USL connected to the unit selection circuit SEL(n) correspond to the drive electrode TL(n). The first end n1 of the drive electrode TL(n) is connected to the signal wire TPH via the first switch S01 switching of which is controlled by a first unit selection signal SELH_L(n) from the unit selection circuit SEL(n). In addition, the first end n1 of the drive electrode TL(n) is connected to the signal wire TPL via the second switch S00 switching of which is controlled by a second unit selection signal SELG_L(n) from the unit selection circuit SEL(n).

The first end n1 of each of the remaining drive electrodes TL(n+1) to TL(n+5) is connected to the signal wire TPH via each of the first switches S01 switching of which is controlled by each of first unit selection signals SELH_L(n+1) to SELH_L(n+5) from corresponding one of the unit selection circuits SEL(n+1) to SEL(n+5). In addition, the first end n1 of each of the remaining drive electrodes TL(n+1) to TL(n+5) is connected to the signal wire TPL via each of the second switches S00 switching of which is controlled by each of second unit selection signals SELG_L(n+1) to SELG_L(n+5) from corresponding one of the unit selection circuits SEL(n+1) to SEL(n+5).

In magnetic field touch detection or electric field touch detection, a selection signal is supplied from the first scanner circuit pair SCL to each of the unit selection circuits SEL(n) to SEL(n+5) constituting the selection circuit SELL. That is, first selection signals AL(n) to AL(n+5) and second selection signals BL(n) to BL(n+5) are supplied from a pair of the first scanner circuit SCAL and the second scanner circuit SCBL constituting the first scanner circuit pair SCL. That is, the first scanner circuit SCAL and the second scanner circuit SCBL constituting the first scanner circuit pair SCL share the unit selection circuits SEL(n) to SEL(n+5) connected to the first ends n1 of the corresponding drive electrodes TL(n) to TL(n+5), respectively.

Each of the first scanner circuit SCAL and the second scanner circuit SCBL includes a shift register in which a plurality of shift stages are connected in series. The shift clock signals CK-AL and CK-BL and the start signals ST-AL and ST-BL are supplied from the control device 3 illustrated in FIG. 4 to the shift registers.

Figure 10A:
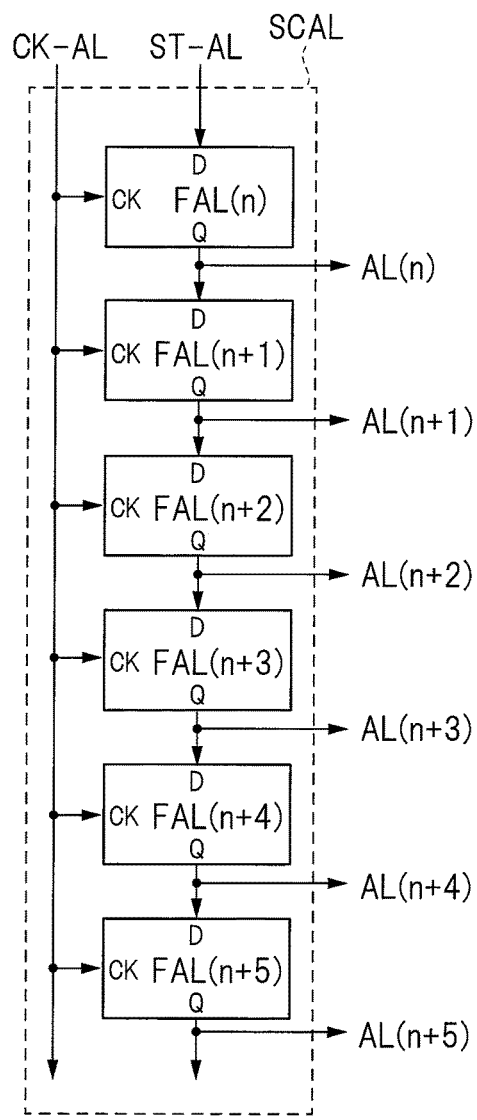
FIG. 10A is a block diagram schematically illustrating a configuration of a first scanner circuit according to the first embodiment.
Figure 10B:
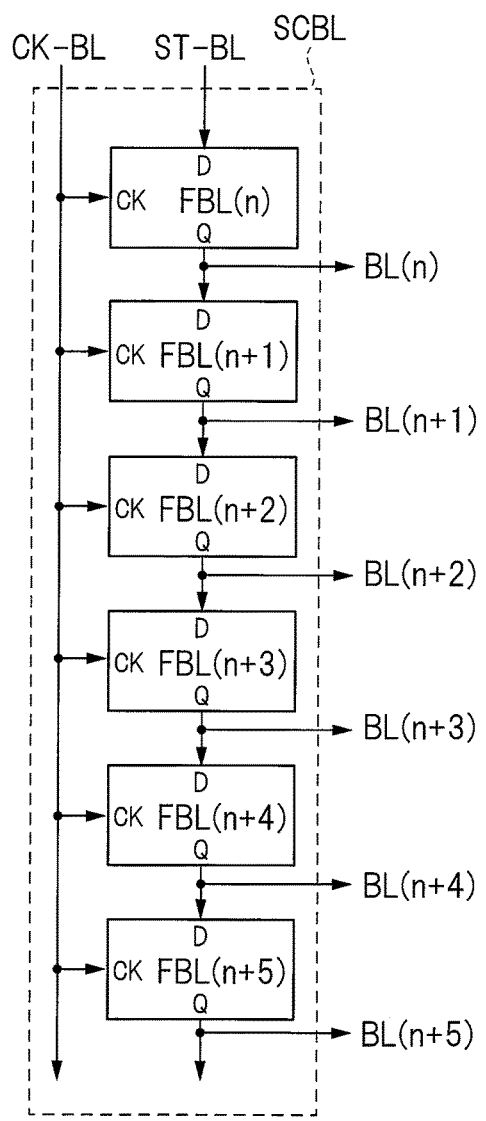
FIG. 10B is a block diagram schematically illustrating a configuration of a second scanner circuit according to the first embodiment.

FIG. 10A is a block diagram schematically illustrating a configuration of the first scanner circuit SCAL according to the first embodiment, and FIG. 10B is a block diagram schematically illustrating a configuration of the second scanner circuit SCBL according to the first embodiment. FIG. 10A illustrates the configuration of the first scanner circuit SCAL, and FIG. 10B illustrates the configuration of the second scanner circuit SCBL. Each of the first scanner circuit SCAL and the second scanner circuit SCBL includes shift stages each corresponding to the drive electrodes TL(0) to TL(p) arranged in the display region 2, and these shift stages are connected in series, whereby the shift register is configured, even though there is no particular limitation. In FIGS. 10A and 10B, only shift stages FAL(n) to FAL(n+5) and FBL(n) to FBL(n+5) corresponding to the drive electrodes TL(n) to TL(n+5) illustrated in FIG. 9 are illustrated.

Each of the shift stages FAL(n) to FAL(n+5) includes a clock terminal CK, a data input terminal D, and a data output terminal Q, fetches data (information) supplied to the data input terminal D in synchronization with the change in the shift clock signal CK-AL supplied to the clock terminal CK, and outputs the data (information) from the data output terminal Q. The data output terminal Q of the shift stage FAL(n) is connected to the data input terminal D of the next shift stage FAL(n+1), and the data output terminal Q of the shift stage FAL(n+1) is connected to the data input terminal D of the next shift stage FAL(n+2). Subsequently, the data output terminal Q of a shift stage is connected to the data input terminal D of the next shift stage. Thus, the shift stages are connected in series. The shift clock signal CK-AL is supplied to the clock terminal CK of each of the shift stages FAL(n) to FAL(n+5). In addition, the start signal ST-AL is supplied to the data input terminal D of the shift stage FAL(n), which is the first stage, in FIG. 10A.

In magnetic field touch detection or electric field touch detection, selection information indicating selection of the drive electrode is supplied as the start signal ST-AL to the shift stage FAL(n). In addition, in magnetic field touch detection or electric field touch detection, the shift clock signal CK-AL periodically changes. Therefore, for example, the start signal ST-AL, which is the selection information, is fetched in the shift stage FAL(n), and the start signal ST-AL, which is the selection information, sequentially moves from the shift stage FAL(n) toward the shift stage FAL(n+5) every time the shift clock signal CK-AL changes. In the first embodiment, the selection information indicating selection becomes a high level, even though there is no particular limitation. Therefore, in the first embodiment, the high level moves from the shift stage FAL(n) toward the shift stage FAL(n+5).

Signals output from the data output terminals Q of the shift stages FAL(n) to FAL(n+5) are the first selection signals output from the first scanner circuit SCAL. Since the shift stages FAL(n) to FAL(n+5) respectively correspond to the drive electrodes TL(n) to TL(n+5) on a one-to-one basis, a signal output from the data output terminal Q of the shift stage FAL(n) is the first selection signal AL(n). Similarly, signals output from the data output terminals Q of the shift stages FAL(n+1) to FAL(n+5) are the first selection signals AL(n+1) to AL(n+5), respectively. Therefore, in magnetic field touch detection or electric field touch detection, the first selection signals become the high level one by one in order from the first selection signal AL(n) to the first selection signal AL(n+5).

Although the shift stages FAL(n) to FAL(n+5) constituting the first scanner circuit SCAL have been described by way of example, the same goes for the shift stages FBL(n) to FBL(n+5) constituting the second scanner circuit SCBL. A shift clock signal CK-BL and a start signal ST-BL are supplied to each of the shift stages FBL(n) to FBL(n+5). The high-level start signal ST-BL indicating selection moves from the shift stage FBL(n) toward the shift stage FBL(n+5) in synchronization with the change in the shift clock signal CK-BL, and the second selection signals BL(n) to BL(n+5) are output.

In magnetic field touch detection or electric field touch detection, each of the unit selection circuits SEL(n) to SEL(n+5) constituting the selection circuit SELL generates the corresponding first unit selection signal among the first unit selection signals SELH_L(n) to SELH_L(n+5) or the corresponding second unit selection signal among the second unit selection signals SELG_L(n) to SELG_L(n+5) according to the detection timing signal COMSEL, the first unit selection signal and the second unit selection signal respectively causing the first switch S01 and the second switch S00 in the corresponding unit drive circuit USL to be turned on, when the corresponding first selection signal among the first selection signals AL(n) to AL(n+5) or the corresponding second selection signal among the second selection signals BL(n) to BL(n+5) indicates selection of the drive electrode.

The first scanner circuit pair SCL and the first selection drive circuit SDL have been described by way of example; however, the second scanner circuit pair SCR and the second selection drive circuit SDR also have similar circuit configurations. Therefore, the second scanner circuit pair SCR and the second selection drive circuit SDR will be briefly described.

Figure 11A:
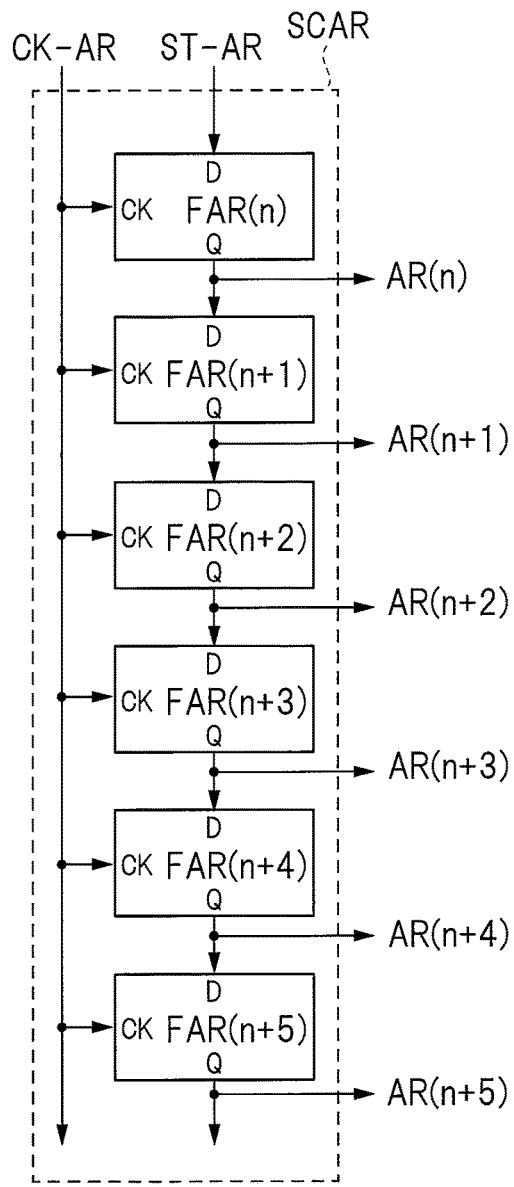
FIG. 11A is a block diagram schematically illustrating a configuration of a third scanner circuit according to the first embodiment.
Figure 11B:
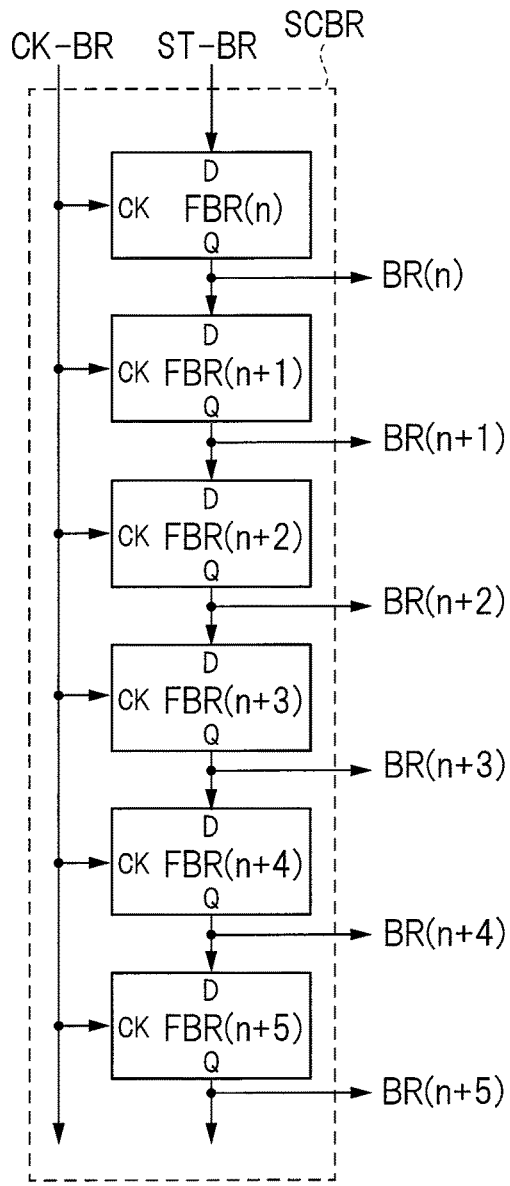
FIG. 11B is a block diagram schematically illustrating a configuration of a fourth scanner circuit according to the first embodiment.

FIG. 11A is a block diagram schematically illustrating a configuration of the third scanner circuit SCAR according to the first embodiment, and FIG. 11B is a block diagram schematically illustrating a configuration of the fourth scanner circuit SCBR according to the first embodiment. The second scanner circuit pair SCR also includes a pair of the third scanner circuit SCAR and the fourth scanner circuit SCBR. As illustrated in FIGS. 11A and 11B, the third scanner circuit SCAR includes a shift register having a plurality of shift stages FAR(n) to FAR(n+5), and the fourth scanner circuit SCBR includes a shift register having a plurality of shift stages FBR(n) to FBR(n+5). The high-level start signal ST-AR is supplied to the shift register of the third scanner circuit SCAR and sequentially moves in synchronization with the change in the shift clock signal CK-AR. In addition, the high-level start signal ST-BR is supplied to the shift register of the fourth scanner circuit SCBR and sequentially moves in synchronization with the change in the shift clock signal CK-BR. Here, moving directions of the high-level start signals ST-AR and ST-BR are the same as moving directions of the start signals ST-AL and ST-BL. In addition, the shift clock signals CK-AR and CK-BR have the same cycles as the cycles of the shift clock signals CK-AL and CK-BL.

Similarly to the first scanner circuit SCAL, the third scanner circuit SCAR outputs third selection signals AR(n) to AR(n+5) corresponding to the drive electrodes TL(n) to TL(n+5), respectively. Similarly to the second scanner circuit SCBL, the fourth scanner circuit SCBR outputs fourth selection signals BR(n) to BR(n+5) corresponding to the drive electrodes TL(n) to TL(n+5), respectively.

The selection circuit SELR includes unit selection circuits SER(n) to SER(n+5) corresponding to the drive electrodes TL(n) to TL(n+5), respectively. The unit selection circuits SER(n) to SER(n+5) receive the third selection signals AR(n) to AR(n+5), respectively, the fourth selection signals BR(n) to BR(n+5), respectively, and the detection timing signal COMSEL, and generate third unit selection signals SELH_R(n) to SELH_R(n+5), respectively, and fourth unit selection signals SELG_R(n) to SELG_R(n+5), respectively.

The drive circuit DRVR arranged along the side 2-R of the display region 2 includes the plurality of unit drive circuits USR. The unit drive circuit USR includes the first switch S01 connected between the second end n2 of the corresponding drive electrode among the drive electrodes TL(n) to TL(n+5) and the signal wire TPH, and the second switch S00 connected between the second end n2 and the signal wire TPL. Switching of the first switch S01 in the unit drive circuit USR is controlled by one of the third unit selection signals SELH_R(n) to SELH_R(n+5) from the corresponding unit selection circuit among the unit selection circuits SER(n) to SER(n+5). Switching of the second switch S00 in the unit drive circuit USR is controlled by one of the fourth unit selection signals SELG_R(n) to SELG_R(n+5) from the corresponding unit selection circuit among the unit selection circuits SER(n) to SER(n+5).

Similarly to the selection circuit SELL, in magnetic field touch detection or electric field touch detection, each of the unit selection circuits SER(n) to SER(n+5) constituting the selection circuit SELR generates the corresponding third unit selection signal among the third unit selection signals SELH_R(n) to SELH_R(n+5) or the corresponding fourth unit selection signal among the fourth unit selection signals SELG_R(n) to SELG_R(n+5) according to the detection timing signal COMSEL, the third unit selection signal and the fourth unit selection signal respectively causing the first switch S01 and the second switch S00 in the corresponding unit drive circuit USR to be turned on, when the corresponding third selection signal or the corresponding fourth selection signal indicates selection of the drive electrode.

In magnetic field touch detection, a magnetic field drive signal is supplied to the signal wire TPH. For example, the magnetic field drive signal is an AC voltage fluctuating between the first drive voltage and the second drive voltage smaller in voltage value than the first drive voltage. The second drive voltage is supplied as the drive signal TPL to the signal wire TPL. For example, the second drive voltage is the ground voltage Vs, and the first drive voltage is the voltage Vd.

Configurations of First Selection Drive Circuit and Second Selection Drive Circuit Next, the configurations and the operations of the first selection drive circuit SDL and the second selection drive circuit SDR according to the first embodiment will be described in detail.

The first selection drive circuit SDL includes the selection circuit SELL, the drive circuit DRVL, and the plurality of unit drive circuits USL. Similarly, the second selection drive circuit SDR includes the selection circuit SELR, the drive circuit DRVR, and the plurality of unit drive circuits USR. In the present embodiment, the circuit configuration and the operation of the first selection drive circuit SDL are identical to the circuit configuration and the operation of the second selection drive circuit SDR.

The selection circuit SELL includes the plurality of unit selection circuits SEL(0) to SEL(p) corresponding to the drive electrodes TL(0) to TL(p), respectively. The drive circuit DRVL also includes the plurality of unit drive circuits USL corresponding to the drive electrodes. The unit selection circuits SEL(0) to SEL(p) have the same configurations, and the unit drive circuits USL have the same configurations. The same goes for the selection circuit SELR and the drive circuit DRVR constituting the second selection drive circuit SDR.

Therefore, the first selection drive circuit SDL will be described here taking the unit selection circuit SEL(n) and the unit drive circuit USL corresponding to the drive electrode TL(n) as an example.

Figure 12A:
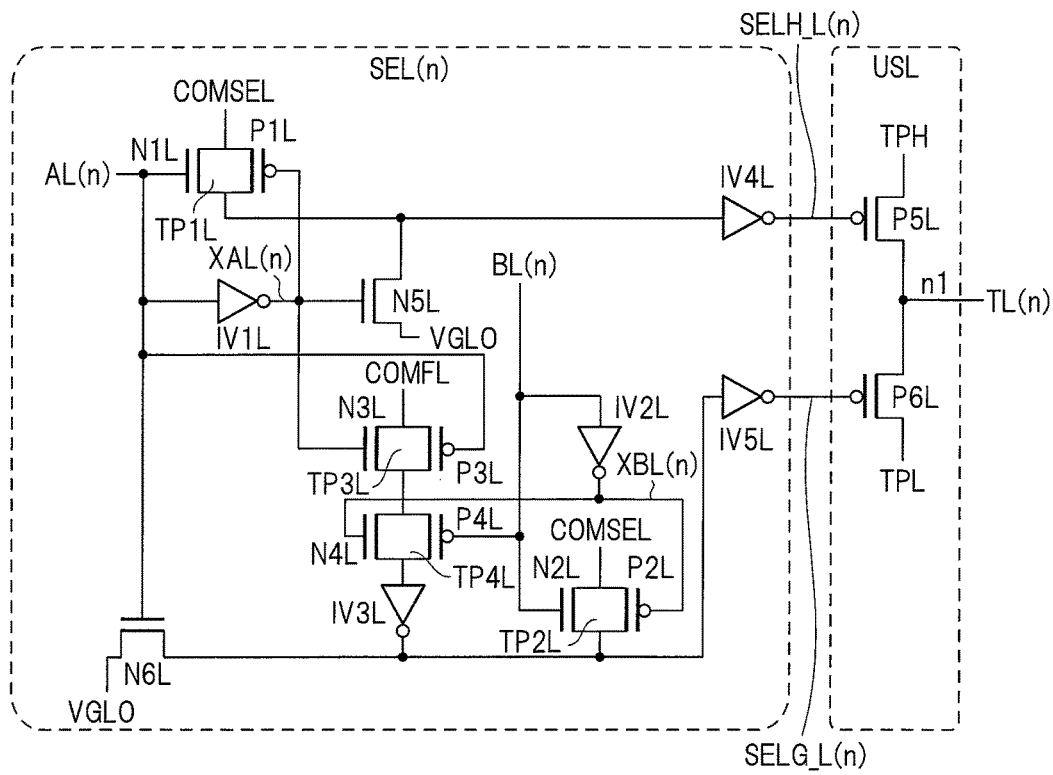
FIG. 12A is a circuit diagram illustrating a configuration of a first selection drive circuit according to the first embodiment.

FIG. 12A illustrates the unit selection circuit SEL(n) and the unit drive circuit USL constituting the first selection drive circuit SDL.

The unit selection circuit SEL(n) includes N-type field effect transistors (hereinafter also referred to as N transistors) N1L to N6L, P-type field effect transistors (hereinafter also referred to as P transistors) P1L to P6L, and inverter circuits IV1L to IV5L. In the present specification, in order to discriminate the P transistor from the N transistor, a gate of the P transistor is depicted as a circle.

The sources and the drains of the N transistor N1L and the P transistor P1L are connected to each other such that source-drain paths of the N transistor and the P transistor are connected in parallel to each other. In addition, the first selection signal AL(n) is supplied to a gate of the N transistor N1L, and a first inverted selection signal XAL(n) obtained by inverting the first selection signal AL(n) by the inverter circuit IV1L is supplied to a gate of the P transistor P1L. Thus, a first transfer switch TP1L switching of which is controlled by the first selection signal AL(n) is constituted by the N transistor N1L and the P transistor P1L.

Also, source-drain paths of the N transistor N2L and the P transistor P2L are connected in parallel to each other. The second selection signal BL(n) is supplied to a gate of the N transistor N2L, and a second inverted selection signal XBL(n) obtained by inverting the second selection signal BL(n) by the inverter circuit IV2L is supplied to a gate of the P transistor P2L. Thus, a second transfer switch TP2L switching of which is controlled by the second selection signal BL(n) is constituted by the N transistor N2L and the P transistor P2L.

The detection timing signal COMSEL is supplied to one of the terminals of each of the first transfer switch TP1L and the second transfer switch TP2L. Also, the other terminal of the first transfer switch TP1L is connected to an input of the inverter circuit IV4L, and the other terminal of the second transfer switch TP2L is connected to an input of the inverter circuit IV5L.

An output of the inverter circuit IV4L is supplied as the first unit selection signal SELH_L(n) to the corresponding unit drive circuit USL. An output of the inverter circuit IV5L is supplied as the second unit selection signal SELG_L(n) to the unit drive circuit USL. The unit drive circuit USL includes the P transistor P5L connected between the first end n1 of the drive electrode TL(n) and the signal wire TPH, and the P transistor P6L connected between the first end n1 of the drive electrode TL(n) and the signal wire TPL. The P transistor P5L is equivalent to the first switch S01 illustrated in FIG. 9, and the P transistor P6L is equivalent to the second switch S00 illustrated in FIG. 9. The first unit selection signal SELH_L(n) is supplied from the inverter circuit IV4L to a gate of the P transistor P5L, and switching of the P transistor P5L is controlled by the first unit selection signal SELH_L(n). In addition, the second unit selection signal SELG_L(n) is supplied from the inverter circuit IV5L to a gate of the P transistor P6L, and switching of the P transistor P6L is controlled by the second unit selection signal SELG_L(n).

Hereinafter, an operation performed when the selection signals from the first scanner circuit SCAL and the second scanner circuit SCBL are output to the unit selection circuit SEL(n) in the magnetic field touch detection period will be described.

Note that, as described above, since the first scanner circuit SCAL and the second scanner circuit SCBL share the unit selection circuit SEL and the unit drive circuit USL in each drive electrode, the first scanner circuit SCAL and the second scanner circuit SCBL do not simultaneously select the first end n1 of the identical drive electrode. More specifically, for example, in the case of the drive electrode TL(n), there are three patterns: the first scanner circuit SCAL selects the drive electrode TL(n), the second scanner circuit SCBL selects the drive electrode TL(n), and neither of the scanner circuits selects the drive electrode TL(n).

When First Scanner Circuit SCAL and Second Scanner Circuit SCBL do not Select Drive Electrode TL(n)

When neither the first scanner circuit SCAL nor the second scanner circuit SCBL selects the first drive electrode TL(n), the first selection signal AL(n) and the second selection signal BL(n) supplied to the unit selection circuit SEL(n) are at a low level not indicating selection of the drive electrode. When the first selection signal AL(n) is at the low level, the N transistor N1L and the N transistor N6L are turned off.

A source-drain path of the N transistor N5L is connected between the input of the inverter circuit IV4L and a predetermined voltage VGLO. When the high-level first inverted selection signal XAL(n) inverted in phase from the low-level signal is supplied to a gate of the N transistor N5L, the N transistor N5L is turned on, and the predetermined voltage VGLO is supplied to the input of the inverter circuit IV4L. For example, the predetermined voltage VGLO is the ground voltage equivalent to the low level. Therefore, when the drive electrode TL(n) is not selected, the high-level first unit selection signal SELH_L(n) is supplied from the inverter circuit IV4L to the P transistor P5L, and the P transistor P5L is turned off.

Source-drain paths of the N transistor N3L and the P transistor P3L are connected in parallel to each other. The first inverted selection signal XAL(n) is supplied to a gate of the N transistor N3L, and the first selection signal AL(n) is supplied to a gate of the P transistor P3L. Thus, a third transfer switch TP3L switching of which is controlled by the first inverted selection signal XAL(n) is constituted by the N transistor N3L and the P transistor P3L. In addition, source-drain paths of the N transistor N4L and the P transistor P4L are connected in parallel to each other. The second inverted selection signal XBL(n) is supplied to a gate of the N transistor N4L, and the second selection signal BL(n) is supplied to a gate of the P transistor P4L. Thus, a fourth transfer switch TP4L switching of which is controlled by the second inverted selection signal XBL(n) is constituted by the N transistor N4L and the P transistor P4L.

The third transfer switch TP3L and the fourth transfer switch TP4L are connected in series, and the control signal COMFL is supplied to an input of the inverter circuit IV3L via the third transfer switch TP3L and the fourth transfer switch TP4L connected in series. An output of the inverter circuit IV3L is connected to the input of the inverter circuit IV5L. When the first selection signal AL(n) and the second selection signal BL(n) are at the low level, the first inverted selection signal XAL(n) and the second inverted selection signal XBL(n) are at the high level. Therefore, both the third transfer switch TP3L and the fourth transfer switch TP4L are turned on. At this time, a phase-inverted signal of the control signal COMFL is supplied to the inverter circuit IV5L via the inverter circuit IV3L. The control signal COMFL becomes the high level in the magnetic field generation period of the magnetic field touch detection period, which will be described later. Therefore, the second unit selection signal SELG_L(n) becomes the high level and the P transistor P6L is turned off.

Thus, when neither the first scanner circuit SCAL nor the second scanner circuit SCBL selects the drive electrode TL(n), the first end n1 of the drive electrode TL(n) is connected to neither the signal wire TPH nor the signal wire TPL.

When First Scanner Circuit SCAL Selects Drive Electrode TL(n)

When the first scanner circuit SCAL selects the drive electrode TL(n), the second scanner circuit SCBL does not select the drive electrode TL(n). Therefore, the first selection signal AL(n) becomes the high level and the second selection signal BL(n) becomes the low level.

In a case where the first selection signal AL(n) becomes the high level, the first transfer switch TP1L is turned on. Thus, the phase-inverted detection timing signal COMSEL is supplied as the first unit selection signal SELH_L(n) from the inverter circuit IV4L to the gate of the P transistor P5L.

Since the detection timing signal COMSEL indicates the high level in the magnetic field generation period, the low-level first unit selection signal SELH_L(n) causes the gate of the P transistor 5L to be turned on, and the first end n1 of the drive electrode TL(n) is connected to the signal wire TPH.

In addition, when the first selection signal AL(n) becomes the high level, the N transistor N6L is turned on and the predetermined voltage VGLO is supplied to the input of the inverter circuit IV5L. For example, the predetermined voltage VGLO is the ground voltage equivalent to the low level. Therefore, the high-level second unit selection signal SELG_L(n) is supplied from the inverter circuit IV5L to the P transistor P6L, and the P transistor P6L is turned off.

Since the second selection signal BL(n) is at the low level, the second transfer switch TP2L is turned off. Since the first inverted selection signal XAL(n) is at the low level, the third transfer switch TP3L is turned off. The second transfer switch TP2L and the third transfer switch TP3L do not operate. That is, when the first scanner circuit SCAL selects the drive electrode TL(n), the signal wire TPH is connected to the first end n1 of the drive electrode TL(n), and the magnetic field drive signal fluctuating between the first drive voltage and the second drive voltage is supplied to the first end n1 as the drive signal TPH.

When Second Scanner Circuit SCBL Selects Drive Electrode TL(n)

When the second scanner circuit SCBL selects the drive electrode TL(n), the first scanner circuit SCAL does not select the drive electrode TL(n). Therefore, the second selection signal BL(n) becomes the high level, and the first selection signal AL(n) becomes the low level.

In a case where the second selection signal BL(n) becomes the high level, the second transfer switch TP2L is turned on. Thus, the phase-inverted detection timing signal COMSEL is supplied as the second unit selection signal SELG_L(n) from the inverter circuit IV5L to the gate of the P transistor P6L.

Since the detection timing signal COMSEL is at the high level, the low-level second unit selection signal SELG_L(n) causes the gate of the P transistor P6L to be turned on, and the first end n1 of the drive electrode TL(n) is connected to the signal wire TPL.

At this time, the first selection signal AL(n) becomes the low level. Therefore, the high-level voltage inverted in phase from the low-level ground voltage VGLO is supplied from the inverter circuit IV4L to the P transistor P5L via the N transistor N5L, and the P transistor P5L is turned off. That is, when the second scanner circuit SCBL selects the drive electrode TL(n), the signal wire TPL is connected to the first end n1 of the drive electrode TL(n), and the second drive voltage as the drive signal TPL is supplied to the first end n1.

That is, whether the signal wire TPH is connected to the first end n1 of the drive electrode TL(n), the signal wire TPL is connected to the first end n1, or neither the signal wire TPH nor the signal wire TPL is connected to the first end n1 is determined depending on whether the first scanner circuit SCAL selects the drive electrode TL(n), the second scanner circuit SCBL selects the drive electrode TL(n), or neither the first scanner circuit SCAL nor the second scanner circuit SCBL selects the drive electrode TL(n).

Although the unit selection circuit SEL(n) corresponding to the drive electrode TL(n) and the unit drive circuit USL corresponding to the unit selection circuit SEL(n) have been described by way of example, the same goes for the remaining unit selection circuits in the selection circuit SELL and the remaining unit drive circuits in the drive circuit DRVL.

Figure 12B:
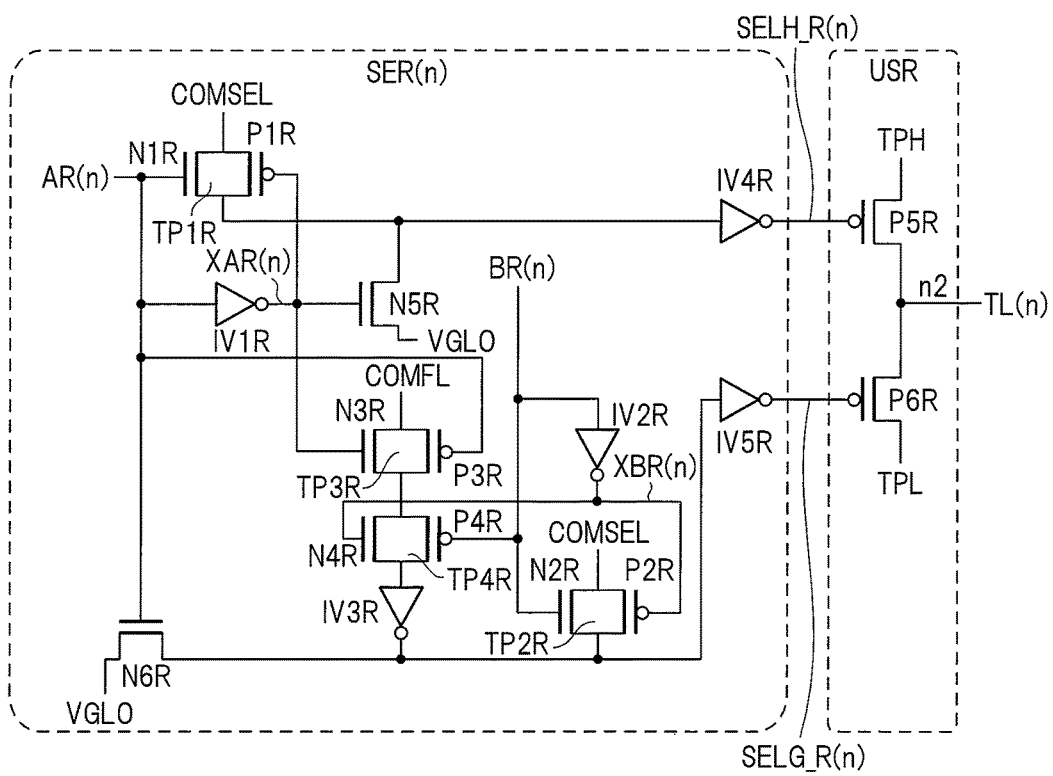
FIG. 12B is a circuit diagram illustrating a configuration of a second selection drive circuit according to the first embodiment.

In addition, even though the unit selection circuit SEL(n) and the unit drive circuit USL corresponding to the unit selection circuit SEL(n) have been described by way of example, circuit configurations and operations of the unit selection circuit SER(n) and the unit drive circuit USR corresponding to the unit selection circuit SER(n) are similar to the circuit configurations and operations of the unit selection circuit SEL(n) and the unit drive circuit USL. FIG. 12B illustrates the unit selection circuit SER(n) and the unit drive circuit USR constituting the second selection drive circuit SDR.

The unit selection circuit SER(n) has the same configuration as the unit selection circuit SEL(n) illustrated in FIG. 12A. The unit drive circuit USR has the same configuration as the unit drive circuit USL illustrated in FIG. 12A. In addition, the operation of the unit selection circuit SER(n) and the operation of the unit drive circuit USR are the same as the operation of the unit selection circuit SEL(n) and the operation of the unit drive circuit USL, respectively. Therefore, only the correspondence relations with the unit selection circuit SEL(n) and the unit drive circuit USL will be described, and the configurations and the operation of the unit selection circuit SER(n) and the unit drive circuit USR will not be described in detail.

The unit selection circuit SER(n) includes N transistors N1R to N6R, P transistors P1R to P6R, and inverter circuits IV1R to IV5R. Here, the N transistors N1R to N6R correspond to the N transistors N1L to N6L described with reference to FIG. 12A, respectively. The P transistors P1R to P6R correspond to the P transistors P1L to P6L described with reference to FIG. 12A, respectively. The inverter circuits IV1R to IV5R correspond to the inverter circuits IV1L to IV5L described with reference to FIG. 12A, respectively. In addition, reference characters TP1R to TP4R denote first to fourth transfer switches and correspond to the first to the fourth transfer switches TP1L to TP4L described with reference to FIG. 12A, respectively. Moreover, the unit drive circuit USR includes P transistors P5R and P6R corresponding to the P transistors P5L and P6L described with reference to FIG. 12A, respectively.

The third selection signal AR(n) is supplied to the unit selection circuit SER(n) from the third scanner circuit SCAR in the second scanner circuit pair SCR arranged along the side 2-R of the display region 2. Further, the fourth selection signal BR(n) is supplied to the unit selection circuit SER(n) from the fourth scanner circuit SCBR in the second scanner circuit pair SCR. In addition, the detection timing signal COMSEL, the control signal COMFL, and the predetermined voltage VGLO are supplied to the unit selection circuit SER(n). Similarly to the unit selection circuit SEL(n) described with reference to FIG. 12A, the unit selection circuit SER(n) generates the third unit selection signal SELH_R(n) and the fourth unit selection signal SELG_R(n).

The unit selection circuit SER(n) and the unit drive circuit USR have the same circuit configurations as those of the unit selection circuit SEL(n) and the unit drive circuit USL, respectively, and operate in the same manner as the unit selection circuit SEL(n) and the unit drive circuit USL, respectively.

Therefore, when the third scanner circuit SCAR selects the second end n2 of the drive electrode TL(n), that is, when the third selection signal AR(n) is at the high level, the low-level third unit selection signal SELH_R(n) causes the P transistor P5R in the unit drive circuit USR to be turned on, and the end n2 is connected to the signal wire TPH.

When the fourth scanner circuit SCBR selects the drive electrode TL(n), that is, when the fourth selection signal BR(n) is at the high level, the low-level fourth unit selection signal SELG_R(n) causes the P transistor P6R in the unit drive circuit USR to be turned on, and the second end n2 of the drive electrode TL(n) is connected to the signal wire TPL.

In addition, when neither the third scanner circuit SCAR nor the fourth scanner circuit SCBR selects the drive electrode TL(n), both the third unit selection signal SELH_R(n) and the fourth unit selection signal SELG_R(n) become the high level, and the end n2 is disconnected from the signal wires TPH and TPL.

Basic Operation of Magnetic Field Touch Detection

As described above, the display device 1 according to the first embodiment includes the first scanner circuit SCAL and the second scanner circuit SCBL which select the first ends n1 of the drive electrodes TL to be selected. In addition, the display device 1 further includes the third scanner circuit SCAR and the fourth scanner circuit SCBR which select the second ends n2 of the drive electrode to be selected.

As described with reference to FIGS. 6A and 6B, in magnetic field touch detection, since it is necessary to simultaneously select the ends n1 and n2 of the first drive electrode and the ends n1 and n2 of the second drive electrode, the first drive electrode and the second drive electrode being arranged so as to be separated from each other, the control device 3 causes the first scanner circuit SCAL and the second scanner circuit SCBL to select the end n1 of the first drive electrode and the end n1 of the second drive electrode, respectively, and causes the third scanner circuit SCAR and the fourth scanner circuit SCBR to select the end n2 of the second drive electrode and the end n2 of the first drive electrode, respectively.

More specifically, the first scanner circuit SCAL and the second scanner circuit SCBL are shifted from each other in timing so as to simultaneously select two drive electrodes separated from each other, and the third scanner circuit SCAR and the fourth scanner circuit SCBR are shifted from each other in timing so as to simultaneously select two drive electrodes separated from each other. At this time, in the scanner circuits, the timings to select a drive electrode are shifted from each other by the separation quantity and the number corresponding to the number of drive electrodes included in each of the first drive electrode and the second drive electrode.

In addition, in order to supply different drive voltages to both ends of one drive electrode, it is necessary to simultaneously connect both ends of the drive electrode to the signal wires TPH and TPL different from each other. More specifically, for example, in a case where the first scanner circuit SCAL selects the end n1 of the first drive electrode, since the end n1 is connected to the signal wire TPH, it is necessary that the fourth scanner circuit SCBR select the end n2, the fourth scanner circuit SCBR enabling the end n2 to be connected to the signal wire TPL.

At this time, the second scanner circuit SCBL and the third scanner circuit SCAR simultaneously select the second drive electrode, and both ends of the second drive electrode are connected to different signal wires. In addition, at this time, currents flow through the first drive electrode and the second drive electrode in opposite directions. In order to achieve this, it is necessary that the timing shift direction between the first scanner circuit SCAL and the second scanner circuit SCBL be set opposite to the timing shift direction between the third scanner circuit SCAR and the fourth scanner circuit SCBR.

Hereinafter, an outline of such an operation will be described. The outline of an operation of timing control of the scanner circuits according to the first embodiment will be described with reference to FIGS. 4 and 9 to 12B.

In FIG. 9, the first drive electrode TL(n+3) and the second drive electrode TL(n+1) are arranged to be separated from each other across the drive electrode TL(n+2) and are simultaneously selected and driven.

A first selection signal AL(n+3) from the first scanner circuit SCAL causes the first end n1 of the first drive electrode TL(n+3) to be connected to the signal wire TPH. A second selection signal BL(n+1) from the second scanner circuit SCBL causes the first end n1 of the second drive electrode TL(n+1) to be connected to the signal wire TPL.

In addition, a fourth selection signal BR(n+3) from the fourth scanner circuit SCBR causes the second end n2 of the first drive electrode TL(n+3) to be connected to the signal wire TPL. A third selection signal AR(n+1) from the third scanner circuit SCAR causes the second end n2 of the second drive electrode TL(n+1) to be connected to the signal wire TPH.

In the case of the drive state illustrated in FIG. 9, since each of the first drive electrode and the second drive electrode is constituted by one drive electrode, a quantity m of bundled drive electrodes stored in the bundle register C-REG is 1. Since the number of non-selected drive electrodes arranged between the first drive electrode and the second drive electrode is one, the separation quantity n stored in the separation quantity register S-REG is 1.

At this time, since the shift stage corresponding to the first drive electrode TL(n+3) in the scanner circuit is ahead of the shift stage corresponding to the second drive electrode TL(n+1) in the scanner circuit by m+n (m denotes the quantity of bundled drive electrodes and n denotes the separation quantity), the control device 3 causes the first scanner circuit SCAL and the fourth scanner circuit SCBR to select the drive electrode ahead by m+n drive electrodes from the drive electrode selected by the second scanner circuit SCBL and the third scanner circuit SCAR.

Therefore, the control device 3 changes the shift clock signal CK-AL twice (m+n times) before changing the shift clock signal CK-BL. Also, when the control device 3 changes the shift clock signal CK-AL once (n times) for the first time, the control device 3 sets the start signal ST-AL at the high level indicating selection of a drive electrode and then sets the signal at the low level. In addition, the control device 3 changes the shift clock signal CK-BR m+n (two) times before changing the shift clock signal CK-AR. Also at this time, when the control device 3 changes the shift clock signal CK-BR once (n times) for the first time, the control device 3 sets the start signal ST-BR at the high-level indicating selection of a drive electrode and then sets the signal at the low level. That is, before the shift clock signals CK-BL and CK-AR change, the shift clock signals CK-AL and CK-BR simultaneously change m+n times.

In addition, at this time, m (one) high-level start signal (m denotes the quantity of bundled drive electrodes) and n (one) low-level start signal (n denotes the separation quantity) are stored in the shift registers of the first scanner circuit SCAL and the fourth scanner circuit SCBR.

The control device 3 changes the shift clock signals CK-AL and CK-BR m+n times and then periodically changes the shift clock signals CK-AL, CK-BL, CK-AR, and CK-BR. When the control device 3 periodically changes the shift clock signals CK-AL, CK-BL, CK-AR, and CK-BR, the control device 3 periodically changes the shift clock signals CK-AL, CK-BL, CK-AR, and CK-BR such that the shift clock signals have the same cycles. In addition, when the control device 3 changes the shift clock signals CK-BL and CK-AR for the first time, the control device 3 sets the start signals ST-BL and ST-AR at the high level indicating selection of a drive electrode.

Therefore, in the shift register of the first scanner circuit SCAL, the high-level start signal moves further ahead by two shift stages than the high-level start signal in the shift register of the second scanner circuit SCBL. Similarly, in the shift register of the fourth scanner circuit SCBR, the high-level start signal moves further ahead by two shift stages than the high-level start signal in the shift register of the third scanner circuit SCAR.

For example, when the shift stage FBL(n) of the second scanner circuit SCBL illustrated in FIG. 10B holds the high-level start signal, the shift stage FAL(n+2) holds the high-level start signal in the first scanner circuit SCAL illustrated in FIG. 10A. At this time, the shift stage FAR(n) holds the high-level start signal in the third scanner circuit SCAR illustrated in FIG. 11A, and the shift stage FBR(n+2) holds the high-level start signal in the fourth scanner circuit SCBR illustrated in FIG. 11B.

In addition, when the shift clock signals CK-AL, CK-BL, CK-AR, and CK-BR change in this state, the high-level start signals stored in the shift registers move, and the state changes into a state where the shift stages FAL(n+3), FBL(n+1), FAR(n+1), and FBR(n+3) hold the high-level start signals.

When the state has been changed into this state, the first scanner circuit SCAL sets the first selection signal AL(n+3) at the high level and sets the first selection signals AL(n) to AL(n+2) and AL(n+4) to AL(n+5) at the low level. Similarly, the second scanner circuit SCBL sets the second selection signal BL(n+1) at the high level and sets the second selection signals BL(n) and BL(n+2) to BL(n+5) at the low level. In addition, the third scanner circuit SCAR sets the third selection signal AR(n+1) at the high level and sets the third selection signals AR(n) and AR(n+2) to AR(n+5) at the low level. Similarly, the fourth scanner circuit SCBR sets the fourth selection signal BR(n+3) at the high level and sets the fourth selection signals BR(n) to BR(n+2) and BR(n+4) to BR(n+5) at the low level.

Therefore, the high-level first selection signal AL(n+3) and the low-level second selection signal BL(n+3) are supplied to the unit selection circuit SEL(n+3). In addition, the high-level fourth selection signal BR(n+3) and the low-level third selection signal AR(n+3) are supplied to the unit selection circuit SER(n+3). In addition, the high-level second selection signal BL(n+1) and the low-level first selection signal AL(n+1) are supplied to the unit selection circuit SEL(n+1). In addition, the high-level third selection signal AR(n+1) and the low-level fourth selection signal BR(n+1) are supplied to the unit selection circuit SER(n+1). In addition, none of the other unit selection circuits SEL(n), SEL(n+2), SEL(n+4), and SEL(n+5) is selected, and the low-level first to fourth selection signals are supplied to the other unit selection circuits.

At this time, according to the operation illustrated in FIGS. 12A and 12B, the first end n1 of the drive electrode TL(n+3) is connected to the signal wire TPH, and the second end n2 of the drive electrode TL(n+3) is connected to the signal wire TPL. The first end n1 of the drive electrode TL(n+1) is connected to the signal wire TPL, and the second end n2 of the drive electrode TL(n+1) is connected to the signal wire TPH. The first end n1 and the second end n2 of each of the non-selected drive electrodes other than the drive electrode TL(n+1) and the drive electrode TL(n+3) have floating potentials separated from the signal wires. At this time, the voltage value supplied from the signal wire TPH fluctuates, the first drive voltage is supplied to the end of the selected drive electrode, and a magnetic field is generated.

FIG. 9 illustrates a drive state where the drive signal TPH supplies the first drive voltage Vd to the first end n1 of the first drive electrode TL(n+3) and to the second end n2 of the second drive electrode TL(n+1).

In the display device 1 according to the first embodiment, it is sufficient if currents flow through the first drive electrode and the second drive electrode in opposite directions. Therefore, currents may flow such that the drive state illustrated in FIG. 9 becomes opposite. That is, the signal wire TPL may be connected to the first end n1 of the first drive electrode TL(n+3) and the signal wire TPH may be connected to the second end n2 of the first drive electrode TL(n+3). At this time, the signal wire TPH is connected to the first end n1 of the second drive electrode TL(n+1), and the signal wire TPL is connected to the second end n2 of the second drive electrode TL(n+1).

In this case, timings of the scanner circuits may be adjusted such that the second scanner circuit SCBL selects the first end n1 of the first drive electrode, the third scanner circuit SCAR selects the second end n2 of the first drive electrode, the first scanner circuit SCAL selects the first end n1 of the second drive electrode, and the fourth scanner circuit SCBR selects the second end n2 of the second drive electrode. That is, the timings of the second scanner circuit SCBL and the third scanner circuit SCAR may be advanced by m+n drive electrodes.

In this case, the ground voltage Vs serves as the first drive voltage, and the voltage Vd serves as the second drive voltage. The first drive voltage and the second drive voltage may be any as long as the voltage values differ from each other so that a current flows through the first drive electrode and a magnetic field is generated. The first drive voltage and the second drive voltage are not limited to which is a higher voltage and which is a lower voltage.

In addition, in the present specification, the description has been given by referring to the drive electrode TL(n+3) the shift stage corresponding to which is ahead as the first drive electrode, and referring to the drive electrode TL(n+1) as the second drive electrode. However, the drive electrode TL(n+3) may be referred to as the second drive electrode and the drive electrode TL(n+1) may be referred to as the first drive electrode.

As described above, the display device 1 according to the first embodiment includes the first scanner circuit SCAL and the second scanner circuit SCBL which select the first end n1 of the first drive electrode or the first end n1 of the second drive electrode. In addition, the display device 1 includes the third scanner circuit SCAR and the fourth scanner circuit SCBR which select the second end n2 of the first drive electrode or the second end n2 of the second drive electrode. In addition, the control device 3 supplies the first drive voltage to the first end n1 of the first drive electrode and to the second end n2 of the second drive electrode and supplies the second drive voltage to the second end n2 of the first drive electrode and to the first end n1 of the second drive electrode such that currents simultaneously flow through the first drive electrode and the second drive electrode in opposite directions. At this time, as described above, the control device 3 supplies selection signals selecting the respective ends n1 and n2 of the first drive electrode and the second drive electrode via the first scanner circuit SCAL, the second scanner circuit SCBL, the third scanner circuit SCAR, and the fourth scanner circuit SCBR.

The display device 1 includes the first selection drive circuit SDL connected between the first ends n1 of the drive electrodes and the first and second scanner circuits SCAL and SCBL. The first selection drive circuit SDL supplies the first drive voltage to the first end n1 of the first drive electrode and the second drive voltage to the first end n1 of the second drive electrode, the first ends respectively selected according to the selection signals from the first scanner circuit SCAL and the second scanner circuit SCBL. In addition, the display device 1 includes the second selection drive circuit SDR connected between the second ends n2 of the drive electrodes and the third and fourth scanner circuits SCAR and SCBR. The second selection drive circuit SDR supplies the second drive voltage to the second end n2 of the first drive electrode and the first drive voltage to the second end n2 of the second drive electrode, the second ends respectively selected according to the selection signals from the third scanner circuit SCAR and the fourth scanner circuit SCBR.

The first scanner circuit SCAL and the second scanner circuit SCBL are arranged along the side 2-L of the display region 2 and simultaneously select the first end n1 of the first drive electrode and the first end n1 of the second drive electrode such that the first scanner circuit and the second scanner circuit do not select the same electrode. The third scanner circuit SCAR and the fourth scanner circuit SCBR are arranged along the side 2-R of the display region 2 and simultaneously select the second end n2 of the first drive electrode and the second end n2 of the second drive electrode such that the third scanner circuit and the fourth scanner circuit do not select the same electrode.

Entire Operation of Magnetic Field Touch Detection

Figure 13:
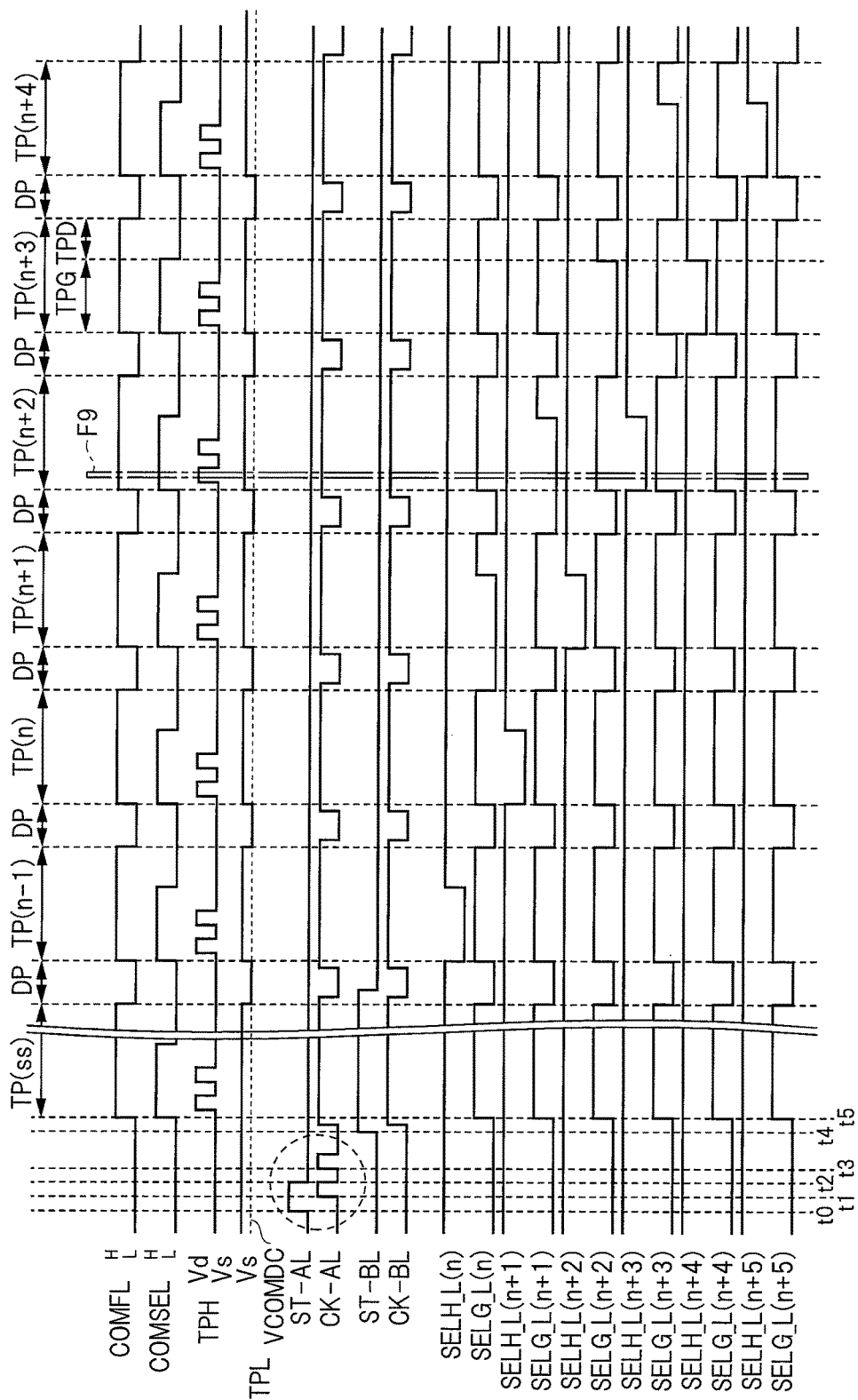
FIG. 13 is a waveform diagram illustrating an entire operation of magnetic field tough detection according to the first embodiment.
Figure 14:
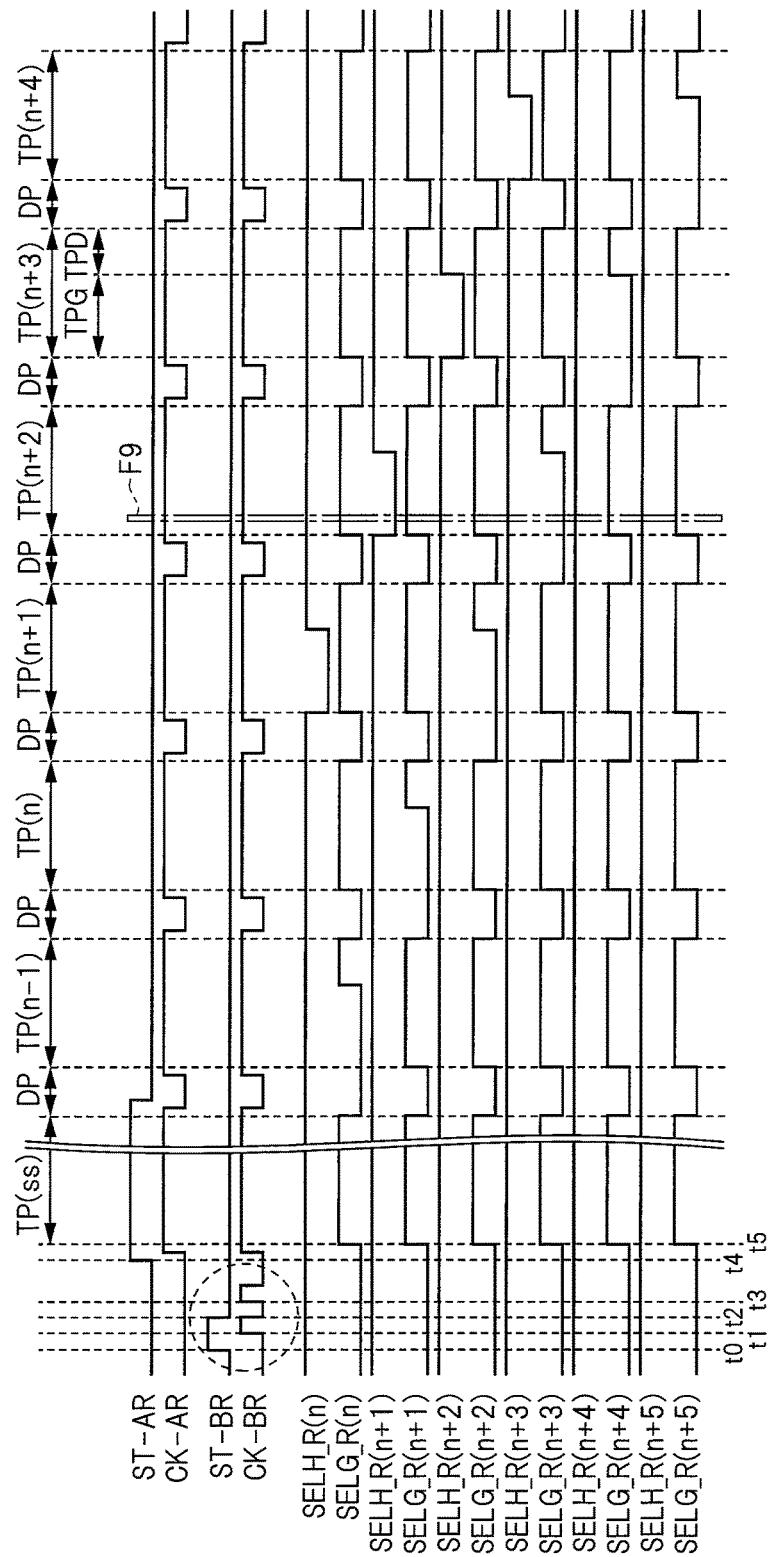
FIG. 14 is a waveform diagram illustrating the entire operation of the magnetic field tough detection according to the first embodiment.

Next, an entire operation of magnetic field touch detection in the display device 1 according to the first embodiment will be described with reference to a waveform diagram. FIG. 13 is a waveform diagram illustrating the operation of magnetic field tough detection, and FIG. 14 is a waveform diagram illustrating the operation of the magnetic field tough detection. In order to prevent a drawing from being complicated, the waveform diagram is divided into FIGS. 13 and 14.

FIG. 13 illustrates the waveforms of the control signal COMFL, the detection timing signal COMSEL, and the drive signals TPH and TPL supplied in common to the first scanner circuit pair SCL, the second scanner circuit pair SCR, the first selection drive circuit SDL, and the second selection drive circuit SDR illustrated in FIG. 4, and the waveforms of the shift clock signals CK-AL and CK-BL and the start signals ST-AL and ST-BL supplied to the first scanner circuit pair SCL. In addition, FIG. 13 illustrates the waveforms of the first unit selection signals SELH_L(n) to SELH_L(n+5) and the second unit selection signals SELG_L(n) to SELG_L(n+5) respectively output from the unit selection circuits SEL(n) to SEL(n+5) illustrated in FIG. 9.

In contrast, FIG. 14 illustrates the waveforms of the shift clock signals CK-AR and CK-BR and the start signals ST-AR and ST-BR supplied to the second scanner circuit pair SCR, and the waveforms of the third unit selection signals SELH_R(n) to SELH_R(n+5) and the fourth unit selection signals SELG_R(n) to SELG_R(n+5) respectively output from the unit selection circuits SER(n) to SER(n+5) illustrated in FIG. 9. The waveform diagram illustrating an operation of the display device 1 is completed by arranging FIG. 14 on the lower side of FIG. 13.

In FIGS. 13 and 14, reference character DP denotes the display period in which an image is displayed in the display region 2. In addition, each of reference characters TP(n−1) to TP(n+4) denotes the magnetic field detection period (hereinafter also referred to as the magnetic field touch detection period). In addition, reference character TP(ss) denotes a start period in which magnetic field touch detection is started. In the first embodiment, as described with reference to FIGS. 2A to 2C, each of the magnetic field touch detection periods TP(n−1) to TP(n+4) is constituted by the magnetic field generation period and the magnetic field detection period. In FIG. 13, the magnetic field generation period constituting the magnetic field touch detection period TP(n+3) is denoted by reference character TPG, and the magnetic field detection period constituting the magnetic field touch detection period TP(n+3) is denoted by reference character TPD by way of example. Similarly, each of the other magnetic field touch detection periods is constituted by the magnetic field generation period TPG and the magnetic field detection period TPD subsequent to the magnetic field generation period TPG.

In the first embodiment, the control device 3 causes the magnetic field touch detection period and the display period DP to alternately occur after the start period TP(ss), even though the present invention is not limited to this. In addition, the control device 3 causes a magnetic field to be generated in a region of one drive electrode in one magnetic field touch detection period. In the first embodiment, the control device 3 causes a magnetic field to be sequentially generated in the regions of the drive electrodes TL(0) to TL(p). In the magnetic field generation period in the magnetic field touch detection period TP(n−1) illustrated in FIGS. 13 and 14, the control device 3 causes a magnetic field to be generated in the region of the drive electrode TL(n−1). Similarly, in the magnetic field generation periods in the magnetic field touch detection periods TP(n) to TP(n+4), the control device 3 causes a magnetic field to be generated in the regions of the drive electrodes TL(n) to TL(n+4), respectively.

In the first embodiment, the control device 3 causes the first scanner circuit pair SCL, the second scanner circuit pair SCR, and the like to discriminate the magnetic field touch detection period TP from the display period DP by using the control signal COMFL. In addition, the control device 3 causes the first scanner circuit pair SCL, the second scanner circuit pair SCR, and the like to grasp the magnetic field generation period TPG by using the detection timing signal COMSEL. That is, the control device 3 sets the control signal COMFL at the high level in the magnetic field touch detection period TP and sets the detection timing signal COMSEL at the high level in the magnetic field generation period TPG. In addition, the detection circuit DET illustrated in FIG. 4 operates in the magnetic field detection period TPD in which the control signal COMFL is at the high level and the detection timing signal COMSEL is at the low level. The control device 3 supplies image signals to the signal lines SL(0) to SL(p) and performs display in the display period DP in which the control signal COMFL and the detection timing signal COMSEL are at the low level.

The control device 3 supplies to the signal wire TPH the AC magnetic field drive signal whose voltage value periodically changes between the voltage Vd higher in voltage value than the ground voltage Vs and the ground voltage Vs in each magnetic field generation period TPG. In addition, the control device 3 supplies the ground voltage Vs to the signal wire TPH in the magnetic field detection period TPD and the display period DP. The control device 3 supplies the ground voltage Vs to the signal wire TPL in the magnetic field touch detection period TP and supplies a display drive voltage VCOMDC to the signal wire TPL in the display period DP.

In this embodiment, the display drive voltage VCOMDC is a negative DC voltage lower in potential than the ground voltage Vs. The display drive voltage VCOMDC is a value set according to information of a video to be displayed, for example, and the display drive voltage VCOMDC is not limited to the value in the present embodiment and may be set to a voltage of an optional value. The display drive voltage VCOMDC may be a positive DC voltage.

The control device 3 starts to change the shift clock signals CK-BL and CK-AR when the start period TP(ss) is initiated at time t5. The control device 3 changes the shift clock signals CK-AL and CK-BR before time t5 by the number of times corresponding to the sum of the separation quantity n stored in the separation quantity register S-REG and the quantity m of drive electrodes bundled together, the quantity being stored in the bundle register C-REG. FIGS. 13 and 14 illustrate a case where 1 is stored as the separation quantity in the separation quantity register S-REG, and 1 is stored as the quantity of drive electrodes bundled together, the quantity being stored in the bundle register C-REG. Therefore, the control device 3 changes the shift clock signals CK-AL and CK-BR at time t1 and time t3 before time t5, twice in total. In addition, in the period from time t0 to time t2, the control device 3 sets the start signals ST-AL and ST-BR at the high level indicating selection of a drive electrode.

Then, at time t4, the control device 3 sets the start signals ST-BL and ST-AR at the high level indicating selection of a drive electrode. At time t5, the control device 3 changes the shift clock signals CK-AL, CK-BL, CK-AR, and CK-BR, and subsequently changes the shift clock signals CK-AL, CK-BL, CK-AR, and CK-BR in each of the magnetic field touch detection period. At this time, the control device 3 changes the shift clock signals CK-AL, CK-BL, CK-AR, and CK-BR such that the shift clock signals have the same cycle.

Thus, the shift stage in which the high-level start signal ST-AL indicating selection of a drive electrode is stored in the shift register of the first scanner circuit SCAL is two stages ahead of the shift stage in which the high-level start signal ST-BL is stored in the shift register of the second scanner circuit SCBL. Similarly, the shift stage in which the high-level start signal ST-BR indicating selection of a drive electrode is stored in the shift register of the fourth scanner circuit SCBR is two stages ahead of the shift stage in which the high-level start signal ST-AR is stored in the shift register of the third scanner circuit SCAR. That is, each of the first scanner circuit SCAL and the fourth scanner circuit SCBR select the drive electrode which is ahead of the drive electrode selected by each of the second scanner circuit SCBL and the third scanner circuit SCAR by two, which corresponds to the sum of the separation quantity stored in the separation quantity register S-REG and the quantity of drive electrodes bundled together, the quantity being stored in the bundle register C-REG.

When the shift clock signals CK-AL, CK-BL, CK-AR, and CK-BR periodically change and the magnetic field touch detection period TP(n−1) has been reached, the shift stage FAL(n) (see FIG. 10A) of the first scanner circuit SCAL holds the high-level start signal and outputs the high-level first selection signal AL(n). In the magnetic field generation period TPG of the magnetic field touch detection period TP(n−1), the detection timing signal COMSEL is at the high level, and as illustrated in FIG. 13, the low-level first unit selection signal SELH_L(n) and the high-level second unit selection signal SELG_L(n) are output from the unit selection circuit SEL(n) corresponding to the shift stage FAL(n).

At this time, since the high-level start signal is also held in the shift stage FBR(n) (see FIG. 11B) of the fourth scanner circuit SCBR, the shift stage FBR(n) outputs the high-level fourth selection signal BR(n). Therefore, as illustrated in FIG. 14, in the magnetic field generation period TPG of the magnetic field touch detection period TP(n−1), the low-level fourth unit selection signal SELG_R(n) and the high-level third unit selection signal SELH_R(n) are output from the corresponding unit selection circuit SER(n).

As a result, in the magnetic field generation period TPG of the magnetic field touch detection period TP(n−1), the first end n1 of the drive electrode TL(n) is connected to the signal wire TPH and the second end n2 of the drive electrode TL(n) is connected to the signal wire TPL.

Therefore, in the magnetic field generation period TPG of the magnetic field touch detection period TP(n−1), the first drive voltage is supplied to the drive electrode TL(n) through the first end n1 according to fluctuation of the drive signal TPH, and the second drive voltage is supplied to the drive electrode TL(n) through the second end n2, whereby a magnetic field is generated.

Note that the drive electrode TL(n−2) separated from the drive electrode TL(n) across one drive electrode TL(n−1) is omitted in this waveform diagram.

In a case where there is no drive electrode corresponding to the drive electrode TL(n−2), that is, in a case where the drive electrode TL(n) is a drive electrode located at the end or is a second drive electrode from the end in the display region 2, only the drive electrode TL(n) may be driven. In addition, the first scanner circuit SCAL and the fourth scanner circuit SCBR may be driven such that the first and the fourth scanner circuits select drive electrodes in order starting from a third drive electrode from the end. In addition, an auxiliary electrode which functions in the same manner as the drive electrode TL(n−2) may be arranged in the frame region outside the display region.

When the shift clock signals CK-AL, CK-BL, CK-AR, and CK-BR change and the magnetic field touch detection period TP(n+1) has been reached, the high-level start signal moves from the shift stage FAL(n+1) to the shift stage FAL(n+2) and is stored in the shift stage FAL(n+2). Similarly, the high-level start signal moves from the shift stage FBR(n+1) to the shift stage FBR(n+2) and is stored in the shift stage FBR(n+2).

At this time, the high-level start signal fetched in the shift register of the second scanner circuit SCBL at time t5 moves from the previous shift stage to the shift stage FBL(n) (see FIG. 10B) of the shift register of the second scanner circuit SCBL and is stored in the shift stage FBL(n). Similarly, the high-level start signal fetched in the shift register of the third scanner circuit SCAR at time t5 moves from the previous shift stage to the shift stage FAR(n) (see FIG. 11A) of the shift register of the third scanner circuit SCAR and is stored in the shift stage FAR(n).

Therefore, in the magnetic field generation period TPG of the magnetic field touch detection period TP(n+1), the first unit selection signal, the second unit selection signal, the third unit selection signal, and the fourth unit selection signal in synchronization with the detection timing signal COMSEL are output not only from the unit selection circuits SEL(n+2) and SER(n+2) corresponding to the shift stages FAL(n+2) and FBR(n+2), respectively, but also from the unit selection circuits SEL(n) and SER(n) corresponding to the shift stages FAL(n) and FBR(n), respectively.

As a result, as illustrated in FIG. 13, in the magnetic field generation period TPG of the magnetic field touch detection period TP(n+1), the low-level first unit selection signal SELH_L(n+2) is output from the unit selection circuit SEL(n+2), and the first end n1 of the drive electrode TL(n+2) is connected to the signal wire TPH. The low level second unit selection signal SELG_L(n) is output from the unit selection circuit SEL(n), and the first end n1 of the drive electrode TL(n) is connected to the signal wire TPL.

In addition, at this time, as illustrated in FIG. 14, the low-level fourth unit selection signal SELG_R(n+2) is output from the unit selection circuit SER(n+2), and the second end n2 of the drive electrode TL(n+2) is connected to the signal wire TPL. In addition, the low level third unit selection signal SELH_R(n) is output from the unit selection circuit SER(n), and the second end n2 of the drive electrode TL(n) is connected to the signal wire TPH.

At this time, the first drive voltage is supplied to the first end n1 of the drive electrode TL(n+2) and the second end n2 of the drive electrode TL(n) according to fluctuation of the magnetic field drive signal, and the second drive voltage is supplied to the second end n2 of the drive electrode TL(n+2) and the first end n1 of the drive electrode TL(n). Magnetic fields generated at the drive electrode TL(n+2) and at the drive electrode TL(n) in opposite directions overlap in the region of the drive electrode TL(n+1) arranged between the drive electrode TL(n+2) and the drive electrode TL(n).

Each operation in the magnetic field touch detection periods TP(n+2) to TP(n+4) is identical to the operation in the magnetic field touch detection period TP(n+1) except that the high-level start signal moves and therefore the first selection signal, the second selection signal, the third selection signal, and the fourth selection signal sequentially move in synchronization with the detection timing signal COMSEL. Therefore, the operation in each of the magnetic field touch detection periods TP(n+2) to TP(n+4) will not be described.

Note that the connection state illustrated in FIG. 9 corresponds to the state at the timing encircled by an alternate long and short dash line F9 in FIGS. 13 and 14.

In the first embodiment, the shift registers of the first scanner circuit SCAL and the fourth scanner circuit SCBR fetch the high-level start signals at time t1 illustrated in FIGS. 13 and 14 and then fetch the low-level indicating non-selection of the drive electrode in synchronization with the changes in the shift clock signals CK-AL and CK-BR. Similarly, the shift registers of the second scanner circuit SCBL and the third scanner circuit SCAR fetch the high-level start signals at time t5 illustrated in FIGS. 13 and 14 and then fetch the low-level indicating non-selection of the drive electrode in synchronization with the changes in the shift clock signals CK-BL and CK-AR.

Thus, the shift stages excluding the shift stages holding the high-level start signals each output the low-level first selection signal, the low-level second selection signal, the low-level third selection signal, and the low-level fourth selection signal in the magnetic field touch detection period. For example, in the magnetic field touch detection period TP(n+1) illustrated in FIGS. 13 and 14, the shift stages FAL(n) to FAL(n+1), FAL(n+3) to FAL(n+5), FBL(n+1) to FBL(n+5), FAR(n+1) to FAR(n+5), FBR(n) to FBR(n+1), and FBR(n+3) to FBR (n+5) hold the low level indicating non-selection. Therefore, the first selection signals, the second selection signals, the third selection signals, and the fourth selection signals output from these shift stages become the low level.

At this time, with respect to each of the drive electrodes TL(n+1), and TL(n+3) to TL(n+5) the first selection signal, the second selection signal, the third selection signal, and the fourth selection signal corresponding to which become the low level, according to the operation illustrated in FIGS. 12A and 12B, output of each of the first unit selection signal SELH_L, the second unit selection signal SELG_L, the third unit selection signal SELH_R, and the fourth unit selection signal SELG_R becomes the high level, and the first end n1 and the second end n2 are disconnected from the signal wire TPH and the signal wire TPL.

As a result, in the magnetic field touch detection period, the non-selected drive electrode is connected to neither the signal wire TPL nor the signal wire TPH and becomes a floating state. Thus, when the voltage of the selected drive electrode is changed, it is possible to reduce charging and discharging of the parasitic capacitance between the selected drive electrode and the non-selected drive electrode, and it is possible to increase the speed of changing the voltage of the selected drive electrode.

In addition, in the first embodiment, the control device 3 controls the gate driver 4 illustrated in FIG. 4 such that the gate driver 4 causes all the scan lines to be in a floating state in the magnetic field touch detection period. Furthermore, in the magnetic field touch detection period, the control device 3 causes all the signal lines SL(0) to SL(p) to be in a floating state. Therefore, when the voltage of the selected drive electrode is changed, it is possible to reduce charging and discharging of the parasitic capacitance between the scan line or the signal line and the selected drive electrode, and it is possible to increase the speed of changing the voltage of the selected drive electrode.

In the magnetic field touch detection period, in the magnetic field detection period TPD subsequent to the magnetic field generation period TPG, a magnetic field from the pen is detected. The operation in the magnetic field detection period TPD is the same as the operation described with reference to in FIG. 2B. That is, magnetic field detection coils such as DY(n−2) to DY(n+1) are constituted by the detection electrodes RL(0) to RL(p) formed on the second substrate CGB, and the magnetic field from the pen is detected. Since the operation in the magnetic field detection period TPD is the same as the operation described with reference to FIG. 2B, the operation in the magnetic field detection period TPD will not be described.

Operation of Electric Field Touch Detection

The display device 1 according to the first embodiment can perform both magnetic field touch detection and electric field touch detection. Next, the operation performed in the case of electric field touch detection will be described. FIG. 15 is a block diagram illustrating a configuration of the electric field touch detection. The block diagram illustrated in FIG. 15 is the same as the block diagram illustrated in FIG. 9 except connection of the first switch S01 and connection of the second switch S00. Therefore, the block diagram illustrated in FIG. 15 will not be described. FIG. 16 is a waveform diagram illustrating an operation of the electric field touch detection. FIG. 17 is a waveform diagram illustrating the operation of the electric field touch detection.

Figure 15:
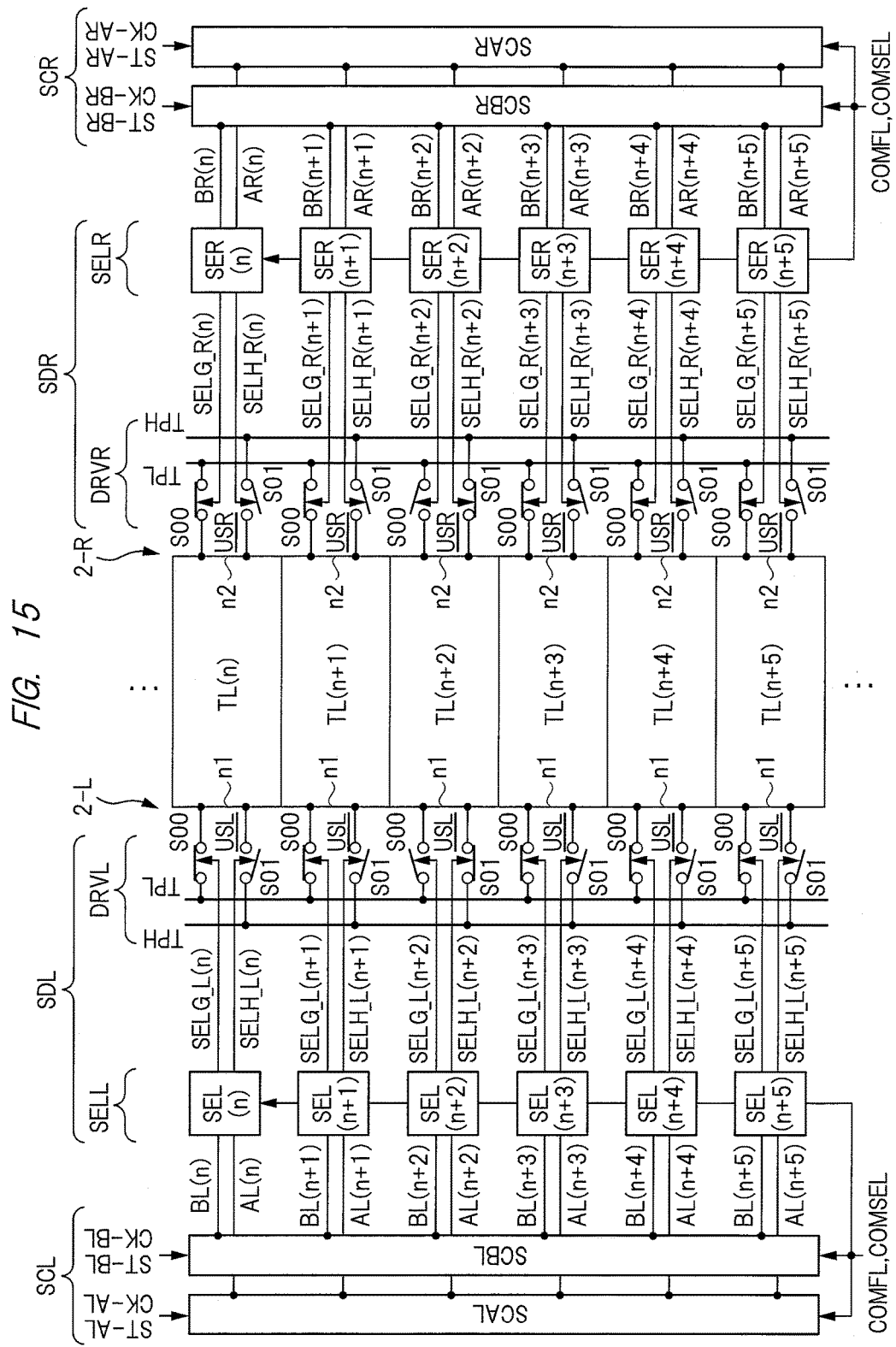
FIG. 15 is a block diagram illustrating a configuration of electric field touch detection according to the first embodiment.

The configuration of the display device 1 is the same also in the case of electric field touch detection as illustrated in FIG. 15. The waveforms of signals generated by the control device 3 differ from the waveforms in the case of magnetic field touch detection. The operation in electric field touch detection will be described with reference to a waveform diagram. In order to prevent a drawing from being complicated, the waveform diagram is divided into FIG. 16 and FIG. 17. The waveform diagram is completed by arranging FIG. 17 on the lower side of FIG. 16. Since the FIGS. 16 and 17 are similar to FIGS. 13 and 14, points of difference will be mainly described here.

As described above, in magnetic field touch detection, the detection timing signal COMSEL is used in order to discriminate the magnetic field generation period and the magnetic field detection period. In contrast, in electric field touch detection, as described with reference to FIGS. 3A to 3C, an electric field is generated by the drive electrode, the change in electric field at this time is detected by the detection electrode, and thus, touch is detected. Therefore, it is not required to discriminate a period in which an electric field is generated from a period in which the electric field is detected.

In the first embodiment, similarly to magnetic field touch detection, the control device 3 causes a display period and an electric field touch detection period to alternately occur. In FIGS. 16 and 17, reference character DP denotes the display period, and reference characters TC(n) to TC(n+5) denote electric field touch detection periods in which electric field touch detection is performed in the regions of the drive electrodes TL(n) to TL(n+5), respectively. In addition, reference character TC(ss) denotes a start period in which electric field touch detection is started.

Figure 16:
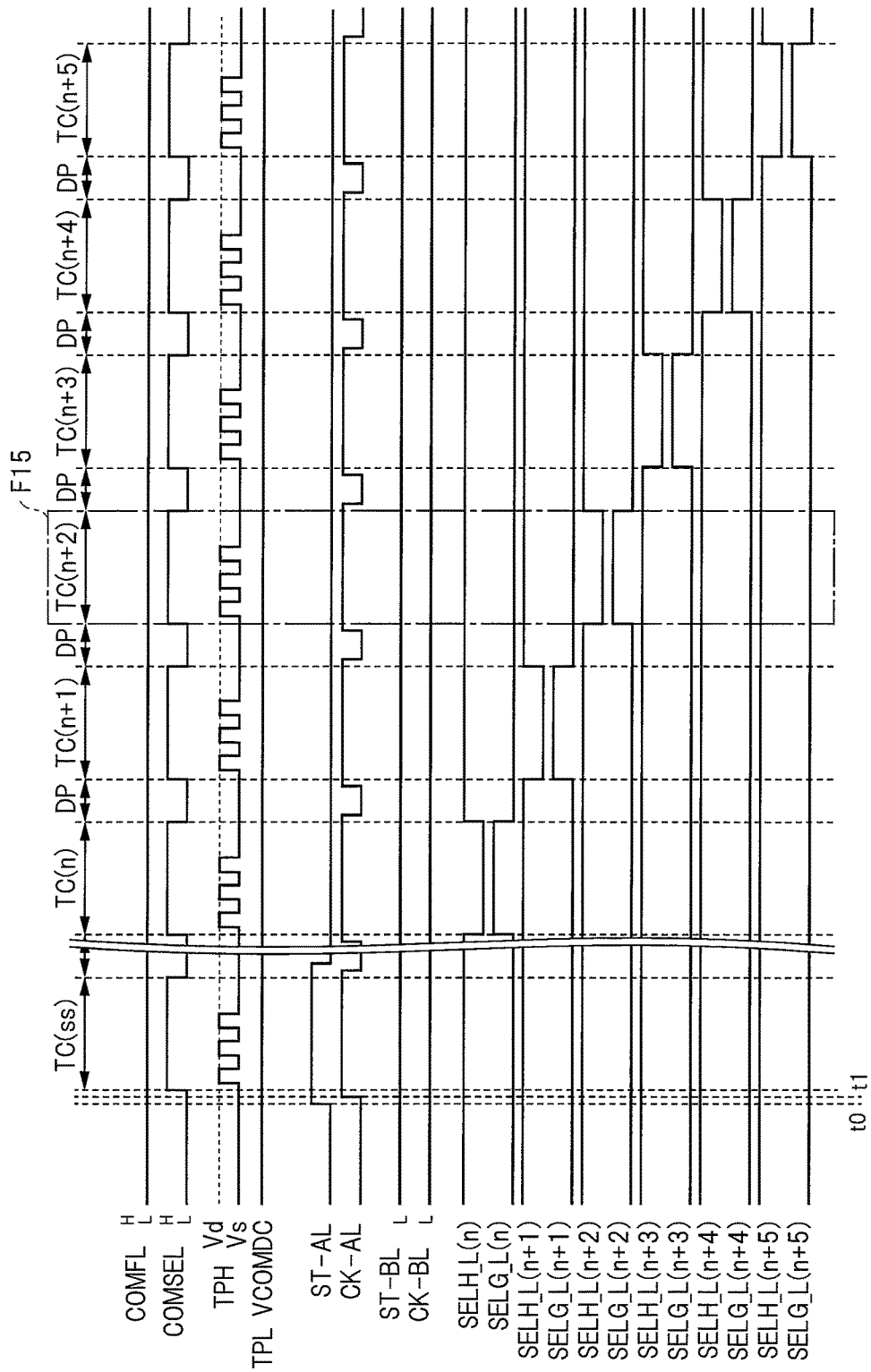
FIG. 16 is a waveform diagram illustrating an operation of the electric field touch detection according to the first embodiment.

As illustrated in FIG. 16, differently from the case of magnetic field touch detection, the control device 3 maintains the control signal COMFL at the low level in electric field touch detection.

In the start period TC(ss) and the electric field touch detection periods, the control device 3 sets the detection timing signal COMSEL at the high level and sets the detection timing signal COMSEL at the low level in the display period DP.

The control device 3 supplies to the signal wire TPH the AC drive signal, as the electric field drive signal, whose voltage periodically changes between the voltage Vd and the ground voltage Vs a plurality of times in the start period TC(ss) and the electric field touch detection periods TC(n) to TC(n+5). The control device 3 supplies to the signal wire TPH the ground voltage Vs in the display period DP.

The control device 3 supplies the display drive voltage VCOMDC to the signal wire TPL in the start period TC(ss), the electric field touch detection periods TC(n) to TC(n+5), and the display period DP.

In electric field touch detection, the high-level start signals are supplied only to the first scanner circuit SCAL and the third scanner circuit SCAR which each supply the drive signal TPH to the selected drive electrode, and the second scanner circuit SCBL and the fourth scanner circuit SCBR do not operate. Therefore, it is not necessary to shift timings of the scanner circuits, and the separation quantity register S-REG and the bundle register C-REG are not used.

Figure 17:
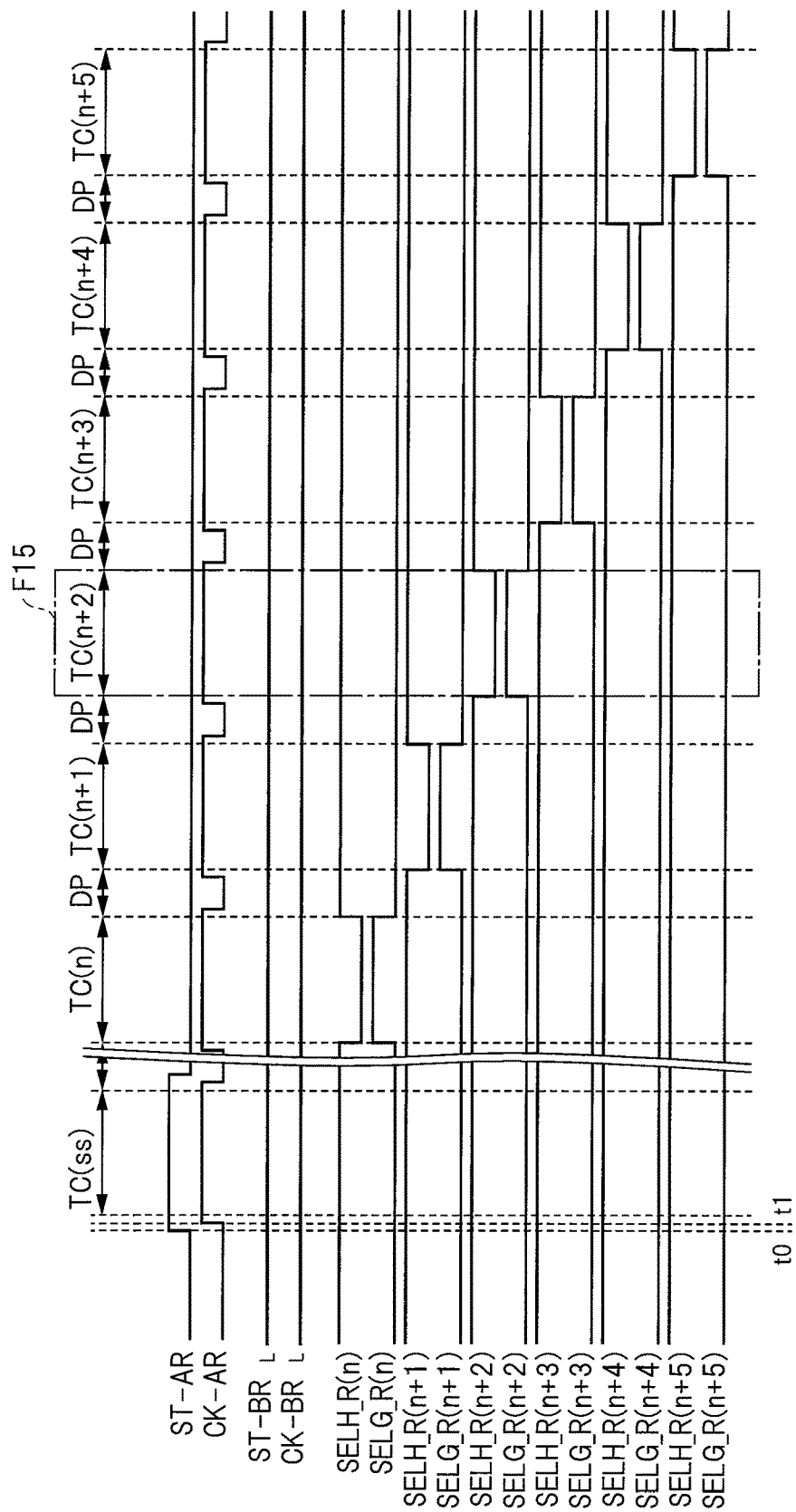
FIG. 17 is a waveform diagram illustrating the operation of the electric field touch detection according to the first embodiment.

In the case of electric field touch detection, as illustrated in FIGS. 16 and 17, at time t0, the control device 3 changes the start signals ST-AL and ST-AR from the low level to the high level indicating selection of a drive electrode. In addition, the control device 3 changes the shift clock signals CK-AL and CK-AR from the low level to the high level in each of the start period TC(ss) and the electric field touch detection periods. That is, the shift clock signals CK-AL and CK-AR are periodically changed. Meanwhile, in electric field touch detection, as illustrated in FIGS. 16 and 17, the control device 3 maintains the start signals ST-BL and ST-BR at the low level L and maintains the shift clock signals CK-BL and CK-BR at the low level L. That is, in the electric field touch detection, the shift clock signals CK-BL and CK-BR are not changed.

At time t1, the shift clock signals CK-AL and CK-AR change, and accordingly, the shift registers of the first scanner circuit SCAL and the third scanner circuit SCAR fetch the high-level start signals ST-AL and ST-AR indicating selection of a drive electrode. In contrast, since the shift clock signals CK-BL and CK-BR do not change, the shift registers of the second scanner circuit SCBL and the fourth scanner circuit SCBR do not fetch the start signals ST-BL and ST-BR and output the previous states. The shift registers of the second scanner circuit SCBL and the fourth scanner circuit SCBR are reset before time t0, and all the second selection signals and the fourth selection signals output from the second scanner circuit SCBL and the fourth scanner circuit SCBR become the low level, even though the present invention is not limited to this.

Every time the electric field touch detection period is repeated, the shift clock signals CK-AL and CK-AR change. When the electric field touch detection period TC(n) has been reached, the shift stages FAL(n) and FAR(n) illustrated in FIGS. 10A and 11A fetch and hold the high-level start signals ST-AL and ST-AR respectively output from previous shift stages, the high-level start signals indicating selection, in synchronization with the changes in the shift clock signals CK-AL and CK-AR. As a result, the first selection signal AL(n) and the third selection signal AR(n) respectively output from the shift stages FAL(n) and FAR(n) change from the low level to the high level. Thus, the first transfer switches TP1L and TP1R are turned on in the unit selection circuits SEL(n) and SER(n) illustrated in FIGS. 12A and 12B, respectively.

At this time, since the detection timing signal COMSEL becomes the high level H, as illustrated in FIGS. 16 and 17, the second unit selection signal SELG_L(n) and the fourth unit selection signal SELG_R(n) become the high level, and the first unit selection signal SELH_L(n) and the third unit selection signal SELH_R(n) become the low level. Thus, the P transistors P5L and P5R are turned on and the P transistors P6L and P6R are turned off in the unit drive circuits USL and USR corresponding to the unit selection circuits SEL(n) and SER(n), respectively. As a result, the first end n1 of the drive electrode TL(n) corresponding to the shift stages FAL(n) and FAR(n) is connected to the signal wire TPH via the P transistor P5L, and the second end n2 of the drive electrode TL(n) is connected to the signal wire TPH via the P transistor P5R.

In the electric field touch detection period TC(n), an AC voltage periodically changing is supplied as the third drive voltage to both ends n1 and n2 of the drive electrode TL(n), and an electric field according to the change in the third drive voltage is generated.

Note that, since the second scanner circuit SCBL and the fourth scanner circuit SCBR continuously output the low-level second selection signal and the low-level fourth selection signal in electric field touch detection, the second transfer switches TP2L and TP2R in the unit selection circuits SEL(n) and SER(n) are turned off.

In addition, in the electric field touch detection period TC(n), in the shift registers of the first scanner circuit SCAL and the third scanner circuit SCAR, all the shift stages except the shift stages FAL(n) and FAR(n) hold the low level indicating non-selection of a drive electrode, whereby the first selection signals become the low level. In the example illustrated in FIGS. 10A and 10B and FIGS. 11A and 11B, the shift stages FAL(n+1) to FAL(n+5) and FAR(n+1) to FAR(n+5) output the low-level first selection signals AL(n+1) to AL(n+5) and the low-level third selection signals AR(n+1) to AR(n+5), respectively.

At this time, since the N transistors N5L and N5R are turned on in each of the unit selection circuits SEL(n+1) to SEL(n+5) and SER(n+1) to SER(n+5), the low-level voltage VGLO is supplied to the inverter circuits IV4L and IV4R. As a result, the high-level first unit selection signals SELH_L(n+1) to SELH_L(n+5) and the high-level third unit selection signals SELH_R(n+1) to SELH_R(n+5) are output.

In addition, at this time, the N transistors N3L and N4L, and N transistors N3R and N4R are turned on. However, differently from the control signal COMFL in the magnetic field touch detection period, the control signal COMFL is at the low level in the electric field touch detection period. Therefore, signals output from the inverter circuits IV3L and IV3R become the high level, and the low-level second unit selection signals SELG_L(n+1) to SELG_L(n+5) and the low-level fourth unit selection signals SELG_R(n+1) to SELG_R(n+5) are output. As a result, the ends n1 and n2 of the non-selected drive electrodes TL(n+1) to TL(n+5) are connected to the signal wires TPL. That is, the magnetic field generation period in which the control signal COMFL is at the high level and the electric field touch detection period in which the control signal COMFL is at the low level differ from each other in that the non-selected drive electrode is not connected to or is connected to the signal wire TPL.

By supplying the display drive voltage VCOMDC, which is a predetermined DC voltage, via the signal wire TPL to both ends n1 and n2 of each of the non-selected drive electrodes (TL(n+1) to TL(n+5)), it is possible to suppress mixture of noise from the non-selected drive electrode to the detection electrode RL.

The electric field touch detection period TC(n) has been described by way of example. Similarly, in the electric field touch detection periods TC(n+1) to TC(n+5), the high level indicating selection of the drive electrode moves from one stage to another stage in each of the first scanner circuit SCAL and the third scanner circuit SCAR, and thus, an electric field is generated at the selected drive electrodes TL(n+1) to TL(n+5), respectively. For example, in FIGS. 16 and 17, at the timing (timing encircled by an alternate long and short dash line F15, which corresponds to the connection state illustrated in FIG. 15) which is the electric field touch detection period TC(n+2), the shift stages FAL(n+2) and FAR(n+2) hold the high level indicating selection of the drive electrode TL(n+2). Thus, the second unit selection signals SELG_L(n) to SELG_L(n+5), the fourth unit selection signals SELG_R(n) to SELG_R(n+5), the first unit selection signals SELH_L(n) to SELH_L(n+5), and the third unit selection signals SELH_R(n) to SELH_R(n+5), which are illustrated in FIGS. 16 and 17, are output, and the first switches S01 (P5L and P5R) and the second switches S00(P6L and P6R) are brought into the state illustrated in FIG. 15. In this state, the drive electrode TL(n+2) is selected, the periodically changing third drive voltage is supplied from the signal wire TPH to both ends n1 and n2 of the drive electrode TL(n+2), and an electric field according to the third drive voltage is generated at the drive electrode TL(n+2).

In each of the electric field touch detection periods TC(n) to TC(n+5), a change in electric field is detected as described with reference to FIGS. 3A to 3C by using the detection electrodes RL(0) to RL(p) formed on the second substrate. Detection of the change in electric field performed by using the detection electrodes is the same as the detection described with reference to FIGS. 3A to 3C and therefore will not be described.

As described above, in the electric field touch detection period, only the first scanner circuit SCAL and the third scanner circuit SCAR indicating selection of the drive electrode are driven, and the second scanner circuit SCBL and the fourth scanner circuit SCBR bring all the drive electrodes into a non-selection state at all times. Differently from the control signal COMFL in the magnetic field detection period, the control signal COMFL becomes the low level in the electric field touch detection period. Therefore, the end of the drive electrode selected by no scanner circuits is connected to the signal wire TPL and is fixed at a predetermined voltage such as the ground voltage. Thus, magnetic field touch detection and electric field touch detection can be performed with the identical device configuration in a time-division manner.

In addition, in the display period DP, since the control signal COMFL and the detection timing signal COMSEL are at the low level and no scanner circuits select any drive electrode, according to the operation of the circuits illustrated in FIGS. 12A and 12B, the high-level first unit selection signals SELH_L and the low-level second unit selection signals SELG_L are output to all the unit selection circuits SEL, the high-level third unit selection signals SELH_R and the low-level fourth unit selection signals SELG_R are output to all the unit selection circuits SER, all the drive electrodes are connected to the signal wires TPL, and the display drive signal VCOMDC is supplied to the drive electrodes.

At this time, the drive electrodes TL function as a common electrode of the display device.

The display device 1 described above uses the same drive electrodes, drive circuits, signal wires, detection electrodes, substrates on which the above items are arranged, and the like both in magnetic field touch detection and electric field touch detection. Therefore, a thickness and a weight of the display device 1 can be reduced.

In addition, in magnetic field touch detection, since one drive electrode cannot generate a magnetic field having sufficient intensity, the magnetic field intensity can be improved by simultaneously selecting a pair of drive electrodes and driving the drive electrodes such that currents flow through the drive electrodes in opposite directions.

Note that, although a case where each of the first drive electrode and the second drive electrode includes only one drive electrode has been described with reference to FIGS. 13 to 17, in a case where each of the first drive electrode and the second drive electrode includes a plurality of drive electrodes, during a period in which each of the shift clock signals changes m times (m is the quantity of bundled drive electrodes) when the shift clock signal is changed for the first time, the corresponding start signal may become the high level. Thus, m high-level start signals are fetched in adjacent shift stages.

Figure 18:
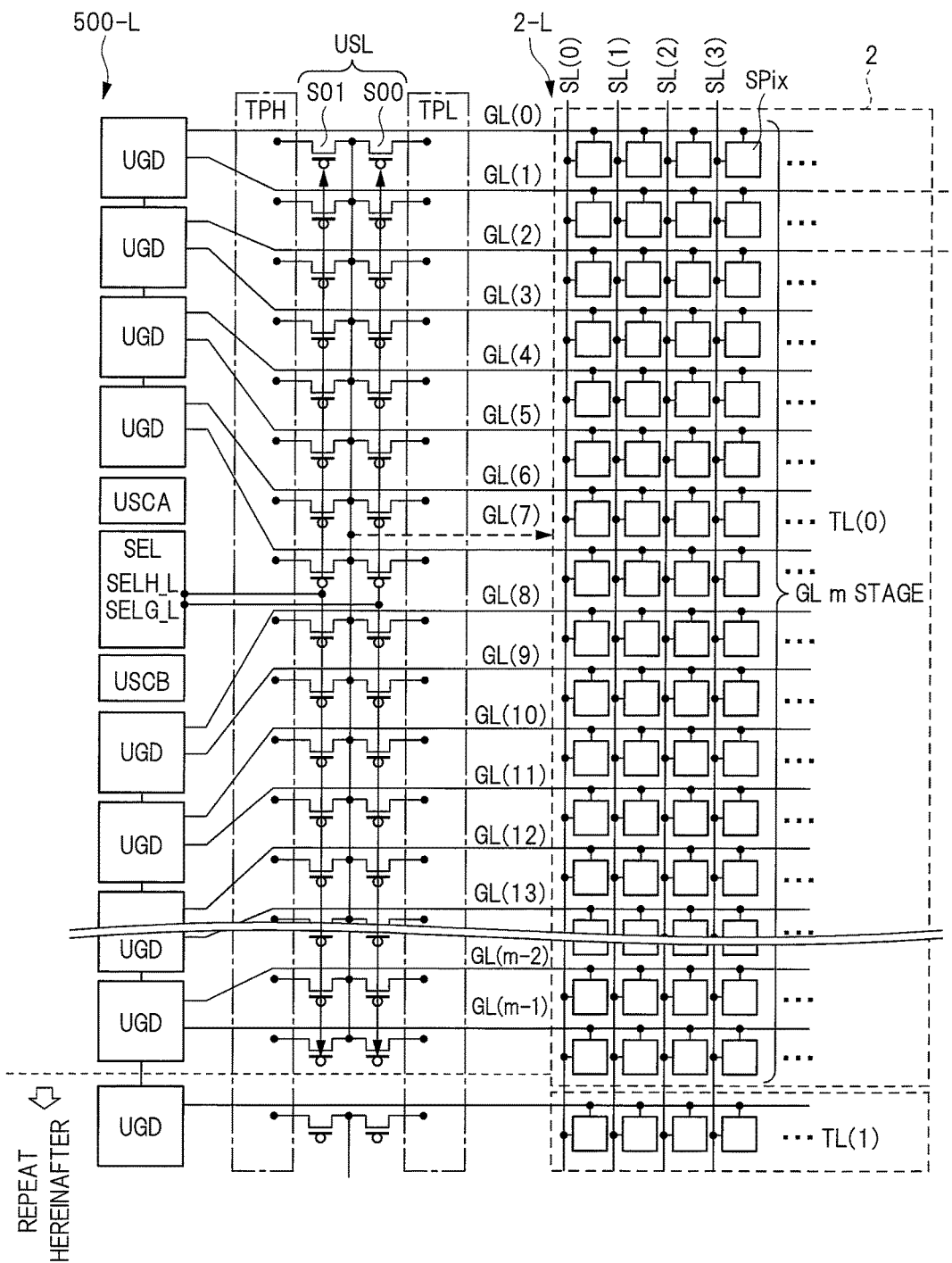
FIG. 18 is a plan view illustrating arrangement of a gate driver, the first scanner circuit pair, and the first selection drive circuit according to the first embodiment.

Arrangement of Gate Driver, First Scanner Circuit Pair, and First Selection Drive Circuit FIG. 18 is a plan view illustrating arrangement of the gate driver 4, the first scanner circuit pair SCL, and the first selection drive circuit SDL according to the first embodiment. As illustrated in FIG. 5, in the frame region between the side 2-L of the display region 2 and the side 500-L of the module 500, the gate driver 4, the first scanner circuit pair SCL, and the first selection drive circuit SDL are arranged. The first scanner circuit pair SCL includes the first scanner circuit SCAL and the second scanner circuit SCBL. The first selection drive circuit SDL includes the selection circuit SELL and the drive circuit DRVL.

FIG. 18 representatively illustrates a portion of the frame region between the side 2-L of the display region 2 and the side 500-L of the module 500 illustrated in FIG. 5, the portion corresponding to the drive electrode TL(0) among the drive electrodes TL(0) to TL(p). As illustrated in FIG. 18, the region of the drive electrode TL(0) corresponds to the region equivalent to an m stage of the scan lines GL(0) to GL(m−1). Similarly, portions corresponding to the other drive electrodes TL(1) to TL(p) except the drive electrode TL(0) are also arranged such that the configuration similar to the configuration of the portion corresponding to the drive electrode TL(0) is repeated.

In the display region 2, a subpixel SPix constituting the pixel Pix is arranged in the region where each of the plurality of scan lines GL and each of the plurality of signal lines SL cross. In the frame region between the side 2-L of the display region 2 and the side 500-L of the module 500, the signal wire TPL, the first switch S01, the second switch S00, and the signal wire TPH are arranged in this order from a side of the side 2-L of the display region 2 toward the side 500-L of the module 500. In the region closest to the side 500-L of the module 500, the gate driver 4, the first scanner circuit SCAL, the second scanner circuit SCBL, and the selection circuit SELL are arranged. The gate driver 4 includes a plurality of unit gate drivers UGD. The first scanner circuit SCAL and the second scanner circuit SCBL also include a plurality of unit scanner circuits USCA and USCB, respectively. The selection circuit SELL also includes the plurality of unit selection circuits SEL.

The gate driver 4, the first scanner circuit SCAL, the second scanner circuit SCBL, and the selection circuit SELL are arranged along the side 500-L of the module 500. When the first scanner circuit SCAL and the second scanner circuit SCBL are viewed, the unit scanner circuit USCA of the first scanner circuit SCAL and the unit scanner circuit USCB of the second scanner circuit SCBL are alternately arranged along the side 500-L of the module 500. The unit selection circuit SEL of the selection circuit SELL is arranged between the unit scanner circuit USCA of the first scanner circuit SCAL and the unit scanner circuit USCB of the second scanner circuit SCBL. In addition, when the first scanner circuit SCAL, the second scanner circuit SCBL, and the gate driver 4 are viewed, the unit scanner circuit USCA of the first scanner circuit SCAL, the unit scanner circuit USCB of the second scanner circuit SCBL, and the unit gate driver UGD of the gate driver 4 are alternately arranged along the side 500-L of the module 500.

In the first embodiment, in the frame region between the side 2-L of the display region 2 and the side 500-L of the module 500, the unit scanner circuit USCA of the first scanner circuit SCAL, the unit scanner circuit USCB of the second scanner circuit SCBL, and the unit gate driver UGD of the gate driver 4 are alternately arranged in line. Therefore, it is not necessary to increase a size of the frame region.

In the present embodiment, one drive electrode is arranged across several to several tens pixels, and the number of unit scanner circuits of each scanner circuit is far less than the number of arrayed pixels Pix. Therefore, the unit scanner circuits and the unit selection circuit SEL can be arranged in an empty region between the unit gate drivers UGD.

In addition, since magnetic field touch drive is performed by using four types of scanner circuits corresponding to ends of a pair of drive electrodes, respectively, the circuit configuration of the unit selection circuit SEL can be simplified, and a small circuit area is required. Therefore, the unit selection circuit SEL can be easily arranged between the unit gate drivers UGD.

The gate driver 4 may also be arranged along the side 2-R of the display region 2. Similarly, the unit scanner circuit USCA of the third scanner circuit and the unit scanner circuit USCB of the fourth scanner circuit, and the unit selection circuit SER may be alternately arranged between the unit gate drivers UGD.

Second Embodiment

A display device 1 according to a second embodiment will be described. In the second embodiment, points of difference from the above-described first embodiment will be mainly described.

Figure 19:
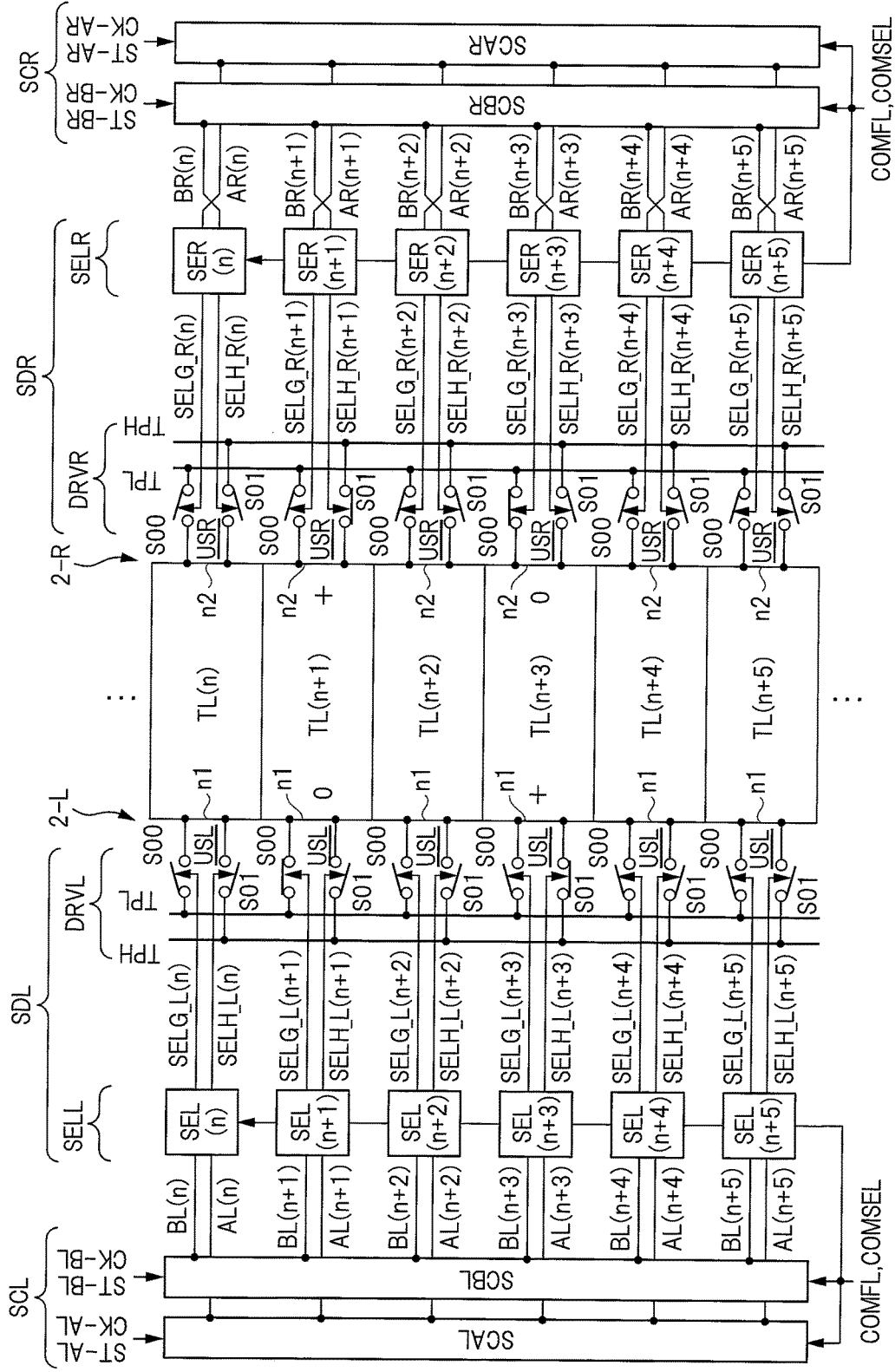
FIG. 19 is a block diagram illustrating each configuration of a first scanner circuit pair, a second scanner circuit pair, a first selection drive circuit, and a second selection drive circuit according to a second embodiment.

FIG. 19 is a block diagram illustrating each configuration of the first scanner circuit pair SCL, the second scanner circuit pair SCR, the first selection drive circuit SDL, and the second selection drive circuit SDR according to the second embodiment. FIG. 19 is similar to FIG. 9 described above, and therefore, a point of difference will be mainly described.

The point of difference from the first embodiment illustrated in FIG. 9 is that connection destinations of the third selection signals AR(n) to AR(n+5) and connection destinations of the fourth selection signals BR(n) to BR(n+5) output from the second scanner circuit pair SCR, the connection destinations being in the second selection drive circuit SDR, are opposite.

Figure 20:
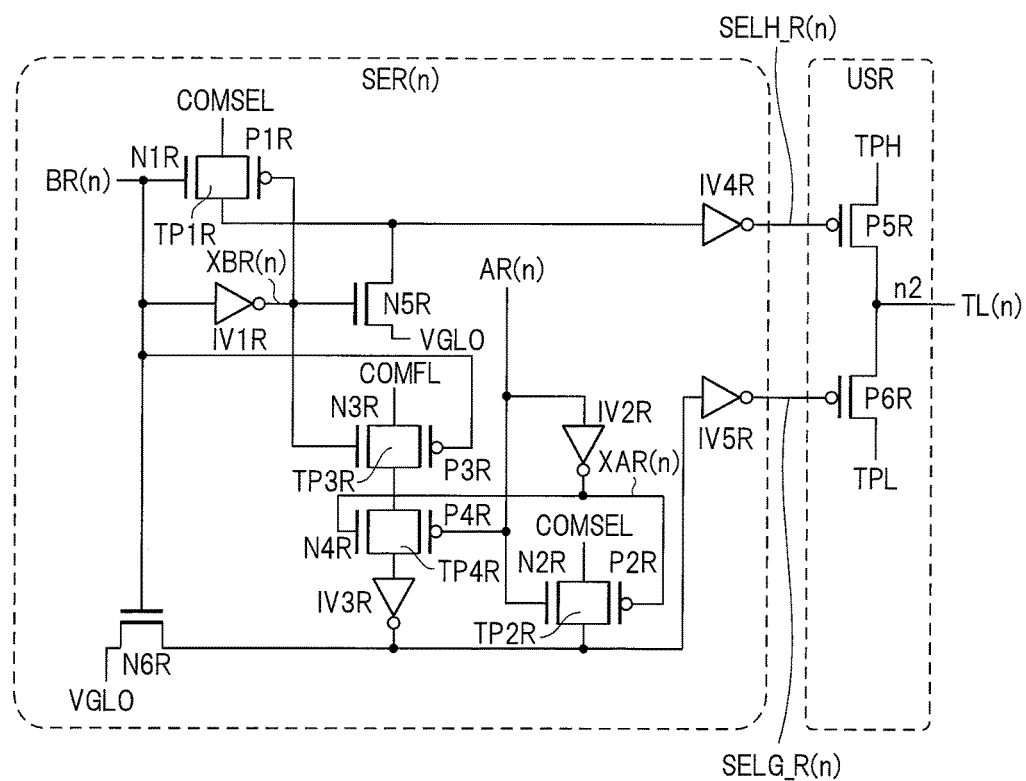
FIG. 20 is a circuit diagram illustrating a configuration of the second selection drive circuit according to the second embodiment.

FIG. 20 is a block diagram illustrating a configuration of the second selection drive circuit SDR according to the second embodiment. FIG. 20 illustrates only the configurations of the unit selection circuit SER(n) and the unit drive circuit USR corresponding to the unit selection circuit SER(n) among the plurality of unit selection circuits which constitute the second selection drive circuit SDR. However, the unit selection circuits SER(n+1) to SER(n+5) each have similar configurations to those of the unit selection circuit SER(n) and the unit drive circuit USR corresponding to the unit selection circuit SER(n). Since configurations of the unit selection circuits SEL(n) to SEL(n+5) which constitute the first selection drive circuit SDL and the unit drive circuit USL according to the second embodiment are the same as those in the first embodiment illustrated in FIG. 12A, the configurations of the unit selection circuits SEL(n) to SEL(n+5) and the unit drive circuit USL will not be described.

The second embodiment differs from the first embodiment illustrated in FIG. 12B in that the fourth selection signals BR(n) to BR(n+5) are each connected to a gate of the N transistor N1R, a gate of the N transistor N6R, and the inverter circuit IV1R. Therefore, switching of the N transistors N5R and N3R connected to the inverter circuit IV1R are controlled by fourth inverted selection signals XBR(n) to XBR(n+5) inverted in phase from the fourth selection signals BR(n) to BR(n+5).

In addition, the second embodiment differs from the first embodiment illustrated in FIG. 12B in that the third selection signals AR(n) to AR(n+5) are each connected to the inverter circuit IV2R and a gate of the N transistor N2R. Therefore, switching of an N transistor N4R connected to the inverter circuit IV2R is controlled by third inverted selection signals XAR(n) to XAR(n+5).

That is, the connection destinations of the third selection signals AR(n) to AR(n+5) and the connection destinations of the fourth selection signals BR(n) to BR(n+5) in the unit selection circuit SER(n) in the second embodiment are opposite to the first embodiment. That is, the operation performed when the third selection signals AR(n) to AR(n+5) are at the high level and the operation performed when the fourth selection signals BR(n) to BR(n+5) are at the high level, described with reference to FIG. 12B, are switched.

The first embodiment and the second embodiment are the same except the points described above.

Therefore, the second embodiment differs from the first embodiment in that, in the unit selection circuit SER(n) according to the second embodiment, when the fourth selection signals BR(n) to BR(n+5) are at a high level indicating selection of a drive electrode, the third unit selection signal SELH_R(n) output to the unit drive circuit USL becomes a low level and the fourth unit selection signal SELG_R(n) becomes a high level. Therefore, the second end n2 of the drive electrode TL(n) is connected to the signal wire TPH. At this time, it is assumed that the detection timing signal COMSEL is at a high level indicating the magnetic field generation period.

In addition, when the third selection signals AR(n) to AR(n+5) are at the high level indicating selection of a drive electrode, the fourth selection signals BR(n) to BR(n+5) become the low level. Therefore, the third unit selection signal SELH_R(n) becomes the high-level inverted in phase from a low-level ground voltage VGLO, and the fourth unit selection signal SELG_R(n) is output at a low level inverted in phase from a high-level detection timing signal COMSEL, and the second end n2 of the drive electrode TL(n) is connected to the signal wire TPL.

In addition, when both the fourth selection signals BR(n) to BR(n+5) and the third selection signals AR(n) to AR(n+5) are at the low level, that is, when the drive electrode is not selected, the second end n2 of the drive electrode TL(n) is disconnected from the signal wires TPH and TPL.

Each circuit operation is the same as the operation illustrated in FIG. 12B and therefore will not be described in detail.

That is, which of the signal wire TPH and the signal wire TPL is connected to the second end n2 of the drive electrode TL(n) when the third scanner circuit SCAR selects the drive electrode TL(n) and when the fourth scanner circuit SCBR selects the drive electrode TL(n) are opposite to the first embodiment.

That is, in the first embodiment, the first scanner circuit SCAL and the fourth scanner circuit SCBR simultaneously select the first drive electrode. However, in the second embodiment, the first scanner circuit SCAL and the third scanner circuit SCAR are controlled to simultaneously select the first drive electrode.

Entire Operation of Magnetic Field Touch Detection

Next, an entire operation of magnetic field touch detection in the display device 1 according to the second embodiment will be described with reference to a waveform diagram.

Figure 21:
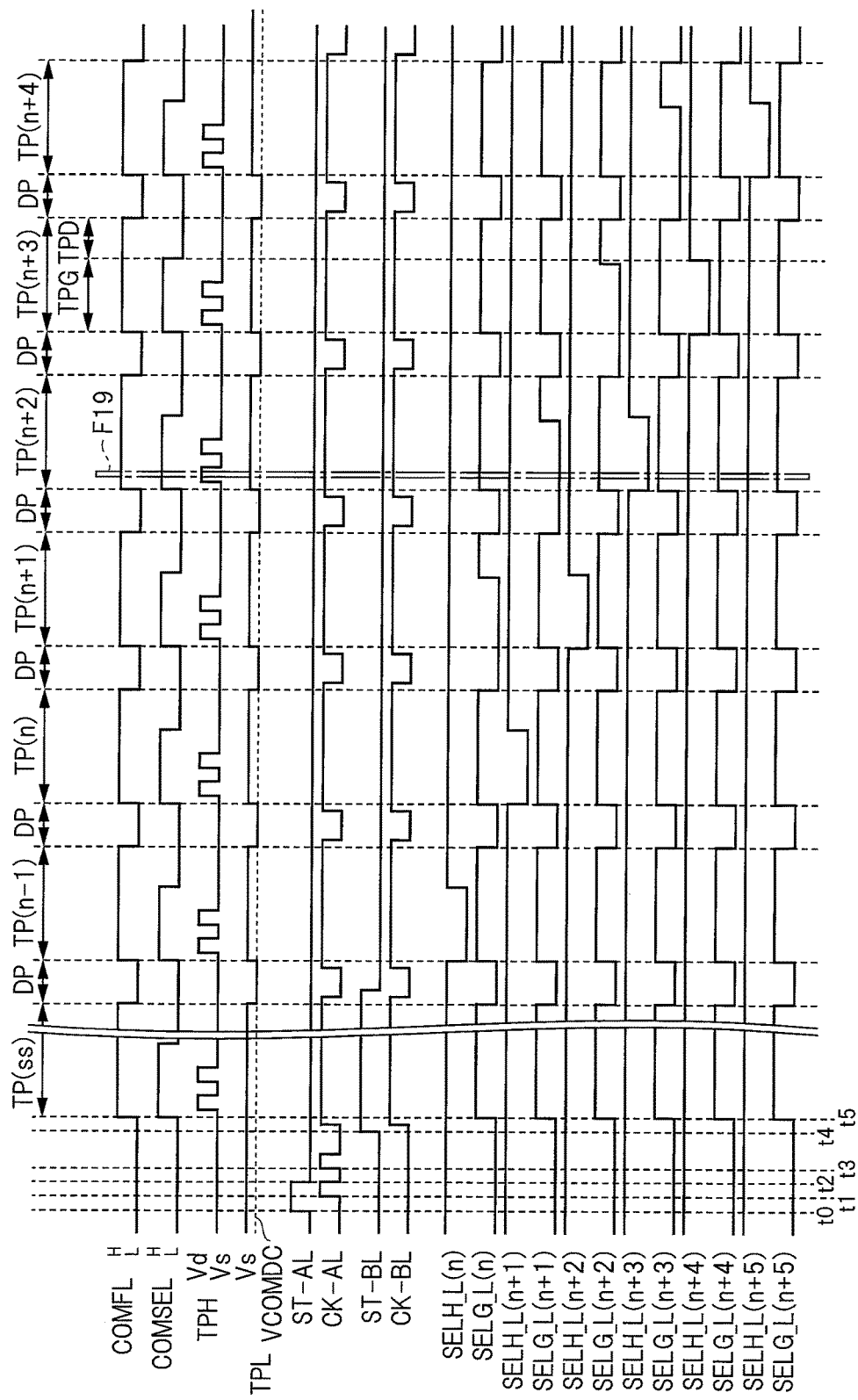
FIG. 21 is a waveform diagram illustrating an entire operation of magnetic field touch detection according to the second embodiment.
Figure 22:
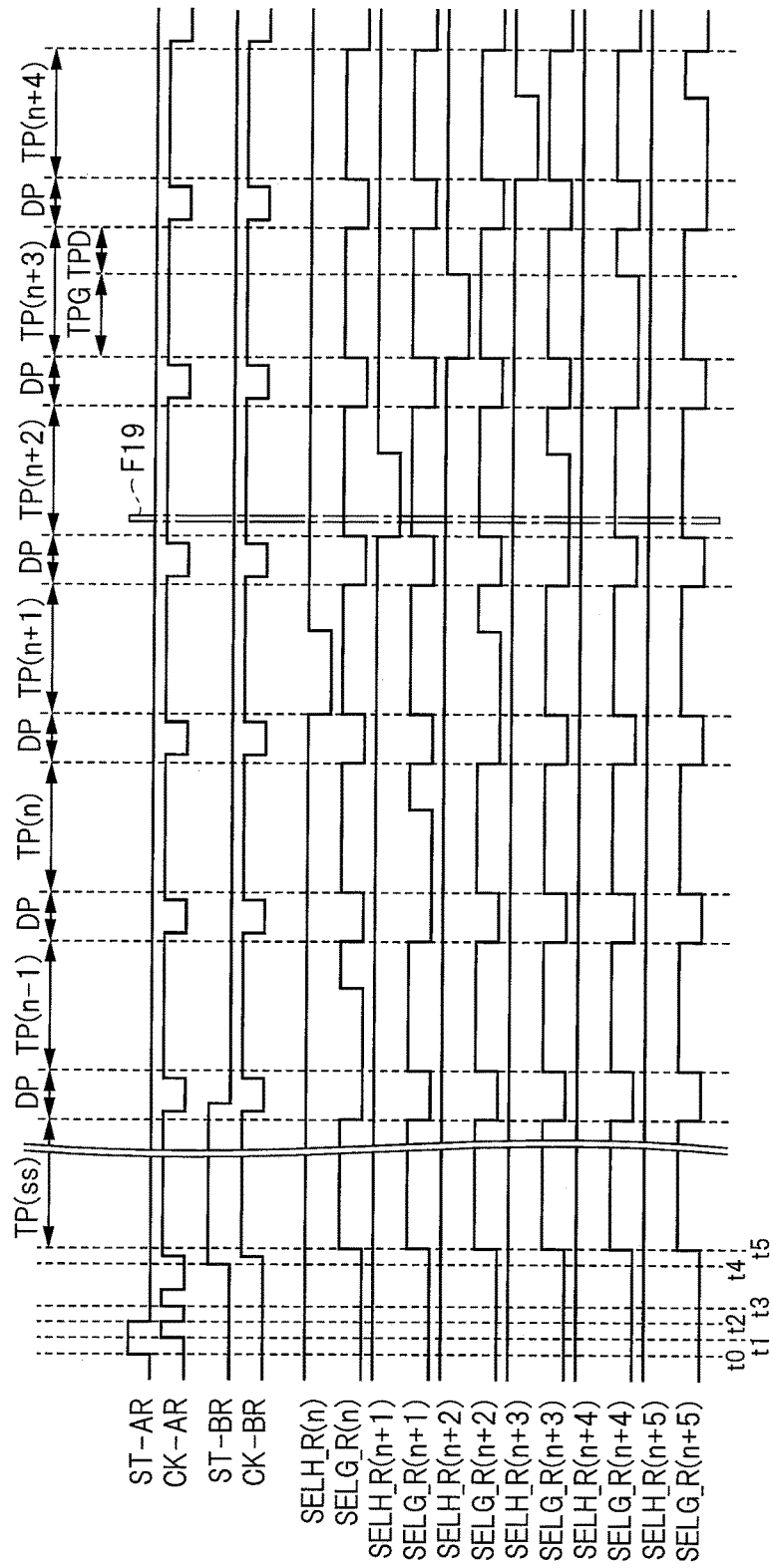
FIG. 22 is a waveform diagram illustrating the entire operation of the magnetic field touch detection according to the second embodiment.

FIG. 21 is a waveform diagram illustrating the entire operation of the magnetic field touch detection. FIG. 22 is a waveform diagram illustrating the entire operation of the magnetic field touch detection. Also here, in order to prevent a drawing from being complicated, the waveform diagram is divided into FIG. 21 and FIG. 22. The waveform diagram illustrating operation of the display device 1 is completed by arranging FIG. 22 on the lower side of FIG. 21. Since FIGS. 21 and 22 are similar to FIGS. 13 and 14, points of difference will be mainly described here.

Similarly to the first embodiment, also in the second embodiment, the control device 3 generates the start signals ST-AR, ST-BR, ST-AL, and ST-BL, and the shift clock signals CK-AL, CK-BL, CK-AR, and CK-BR, based on information of a separation quantity stored in the separation quantity register S-REG and the number of drive electrodes bundled together, the number being stored in the bundle register C-REG. In the first embodiment, the control device 3 changes the shift clock signals CK-AL and CK-BR the number of times based on the separation quantity and the quantity of drive electrodes bundled together, before the start period TP(ss), and supplies the high-level start signals ST-AL and ST-BR indicating selection of the drive electrode to the first scanner circuit SCAL and to the fourth scanner circuit SCBR, respectively, when the shift clock signals CK-AL and CK-BR are changed for the first time. In contrast, in the second embodiment, the control device 3 changes the shift clock signals CK-AL and CK-AR supplied to the first scanner circuit SCAL and the third scanner circuit SCAR, respectively, the number of times based on the separation quantity and the number of drive electrodes bundled together before the start period TP(ss), and supplies the high-level start signals ST-AL and ST-AR indicating selection of the drive electrode to the first scanner circuit SCAL and to the third scanner circuit SCAR, respectively, when the shift clock signals CK-AL and CK-AR are changed for the first time.

That is, in FIGS. 21 and 22, the control device 3 changes the shift clock signals CK-AL and CK-AR at time t1 before time t5 when the start period TP(ss) starts. Also in the second embodiment, the number based on the separation quantity and the quantity of drive electrodes bundled together is twice, which is the same as the number in the first embodiment. Therefore, the control device 3 changes the shift clock signals CK-AL and CK-AR at time t1 and time t3 before time t5. In addition, from time t0 to time t2, the control device 3 sets the start signals ST-AL and ST-AR at the high level indicating selection of a drive electrode. Then, at time t4, the control device 3 sets the start signals ST-BL and ST-BR at the high-level indicating selection of a drive electrode. Subsequently, the control device 3 changes the shift clock signals CK-AL, CK-BL, CK-AR, and CK-BR in each of the magnetic field touch detection periods (for example, TP(n) to TP(n+5)). At this time, the control device 3 changes the shift clock signals such that the shift clock signals CK-AL, CK-BL, CK-AR, and CK-BR have the same cycles.

Thus, the first scanner circuit SCAL and the third scanner circuit SCAR output the first selection signal and the third selection signal, respectively, the first selection signal and the third selection signal specifying the drive electrode closer to the drive electrode TL(p) by two drive electrodes than the drive electrode specified by the second selection signal and the fourth selection signal output from the second scanner circuit SCBL and the fourth scanner circuit SCBR, respectively.

When the shift clock signals CK-AL, CK-BL, CK-AR, and CK-BR change, and for example, the magnetic field touch detection period TP(n−1) has been reached, the shift stages FAL(n) and FAR(n) (see FIGS. 10A and 10B and FIGS. 11A and 11B) fetch and hold the high-level start signals ST-AL and ST-AR from previous shift stages in the first scanner circuit SCAL and the third scanner circuit SCAR, respectively. As a result, the first selection signal AL(n) and the third selection signal AR(n) become the high-level. Since the first selection signal AL(n) becomes the high-level, the first transfer switch TP1L is turned on in the unit selection circuit SEL(n) illustrated in FIG. 12A. As illustrated in FIG. 21, the unit selection circuit SEL(n) outputs the first unit selection signal SELH_L(n) and the second unit selection signal SELG_L(n). In contrast, since the third selection signal AR(n) becomes the high-level, the second transfer switch TP2R is turned on in the unit selection circuit SER(n) illustrated in FIG. 20. As a result, as illustrated in FIG. 22, the unit selection circuit SER(n) outputs the third unit selection signal SELH_R(n) and the fourth unit selection signal SELG_R(n).

Thus, the magnetic field drive signal periodically changing between the second drive voltage and the first drive voltage is supplied to the first end n1 of the drive electrode TL(n) via the P transistor P5L in the unit drive circuit USL, and the second drive voltage is supplied to the second end n2 of the drive electrode TL(n) via the P transistor P6R in the unit drive circuit USR. As a result, the drive electrode TL(n) is brought into a drive state and generates a magnetic field according to fluctuation of the magnetic field drive signal.

Next, when the shift clock signals CK-AL, CK-BL, CK-AR, and CK-BR change and for example, a magnetic field touch detection period TP(n+1) has been reached, the high-level start signals move in the shift registers of the first scanner circuit SCAL, the second scanner circuit SCBL, the third scanner circuit SCAR, and the fourth scanner circuit SCBR and reach the shift stages FAL(n+2), FAR(n+2), FBL(n), and FBR(n). Therefore, the first scanner circuit SCAL and the third scanner circuit SCAR set the first selection signal AL(n+2) and the third selection signal AR(n+2) to the high level such that the drive electrode TL(n+2) is selected, and the second scanner circuit SCBL and the fourth scanner circuit SCBR set the second selection signal BL(n) and the fourth selection signal BR(n) to the high level such that the drive electrode TL(n) is selected.

Since the first selection signal AL(n+2) and the third selection signal AR(n+2) become the high level, a second unit selection signal SELG_L(n+2), a fourth unit selection signal SELG_R(n+2), a first unit selection signal SELH_L(n+2), and a third unit selection signal SELH_R(n+2) change as illustrated in FIGS. 21 and 22. As a result, the magnetic field drive signal changing between the first drive voltage and the second drive voltage is supplied from the signal wire TPH to the first end n1 of the drive electrode TL(n+2), and the voltage Vs is supplied as the second drive voltage from the signal wire TPL to the second end n2 of the drive electrode TL(n+2).

Also, since the second selection signal BL(n) and the fourth selection signal BR(n) become the high level, the second transfer switch TP2L illustrated in FIG. 12A is turned on and a first transfer switch TP1R illustrated in FIG. 20 is turned on. Therefore, the second unit selection signal SELG_L(n), the fourth unit selection signal SELG_R(n), the first unit selection signal SELH_L(n), and the third unit selection signal SELH_R(n) change as illustrated in FIGS. 21 and 22. As a result, the second drive voltage is supplied from the signal wire TPL to the first end n1 of the drive electrode TL(n), and the magnetic field drive signal changing between the first drive voltage and the second drive voltage is supplied from the signal wire TPH to the second end n2 of the drive electrode TL(n).

The magnetic field generated by the drive electrode TL(n) and the magnetic field generated by the drive electrode TL(n+2) overlap in the region of the drive electrode TL(n+1).

Subsequently, in each of the magnetic field touch detection periods TP(n+2) to TP(n+5), magnetic fields generate similarly. Note that the connection state illustrated in FIG. 19 corresponds to the state at the timing encircled by an alternate long and short dash line F19 in FIGS. 21 and 22.

In addition, similarly to the first embodiment, the control signal COMFL becomes the high level in the magnetic field touch detection period. Therefore, the non-selected drive electrodes are in a floating state. Thus, similarly to the first embodiment, it is possible to reduce a parasitic capacitance to be charged or discharged when the voltage of the selected drive electrode is changed. In addition, similarly to the first embodiment, the control device 3 causes the scan lines and the signal lines to be in a floating state in the magnetic field touch detection period, which also enables reduction of the parasitic capacitance to be charged or discharged when the voltage of the selected drive electrode is changed.

Operation of Electric Field Touch Detection

Figure 23:
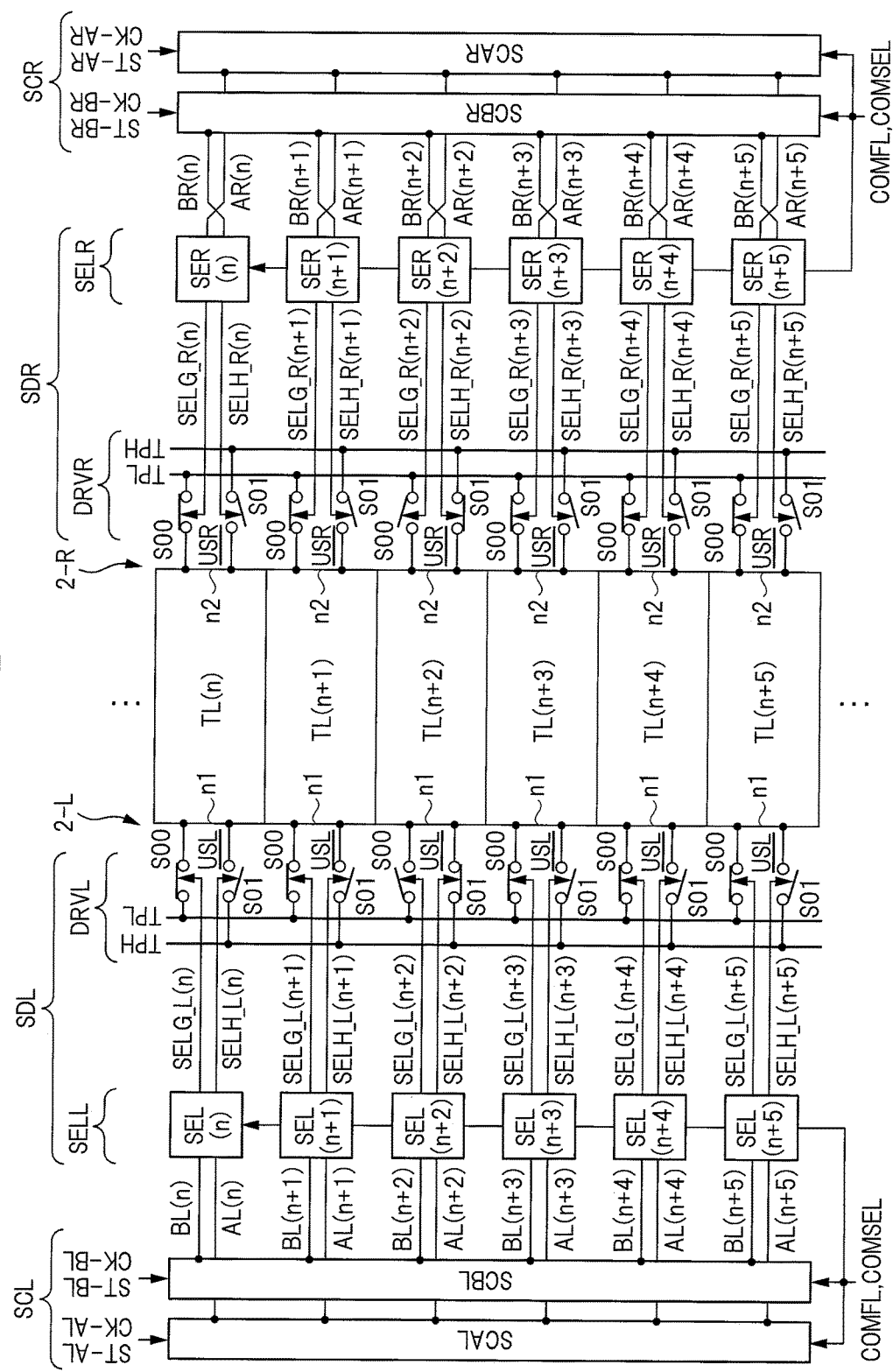
FIG. 23 is a block diagram illustrating a configuration of electric field touch detection according to the second embodiment.

Similarly to the first embodiment, electric field touch detection is enabled also in the second embodiment. FIG. 23 is a block diagram illustrating a configuration of electric field touch detection. Similarly to FIG. 19, in FIG. 23, the third selection signals AR(n) to AR(n+5) and the fourth selection signals BR(n) to BR(n+5) supplied to the unit selection circuits SER(n) to SER(n+5) constituting the second selection drive circuit SDR are switched.

Figure 24:
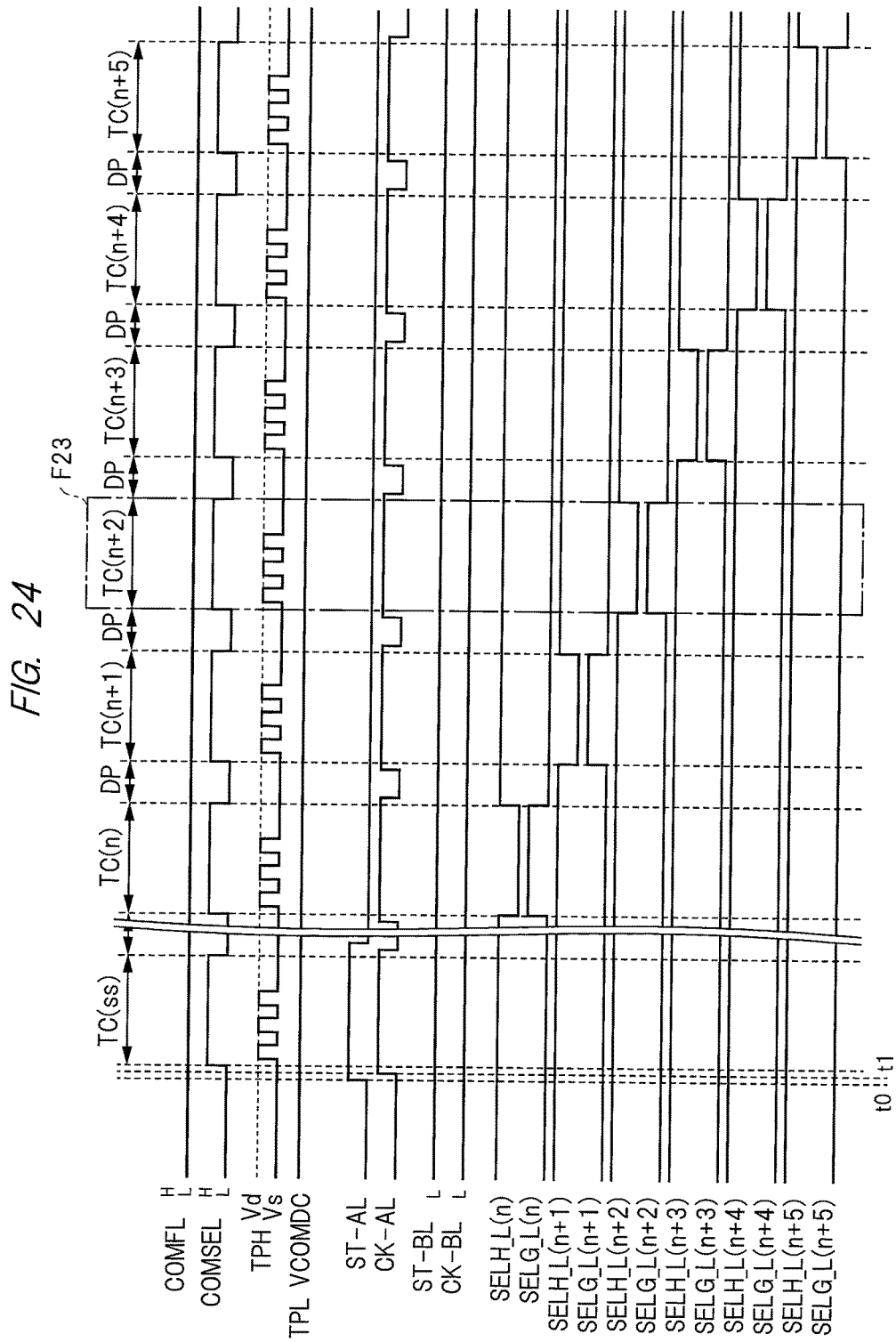
FIG. 24 is a waveform diagram illustrating an operation of the electric field touch detection according to the second embodiment.
Figure 25:
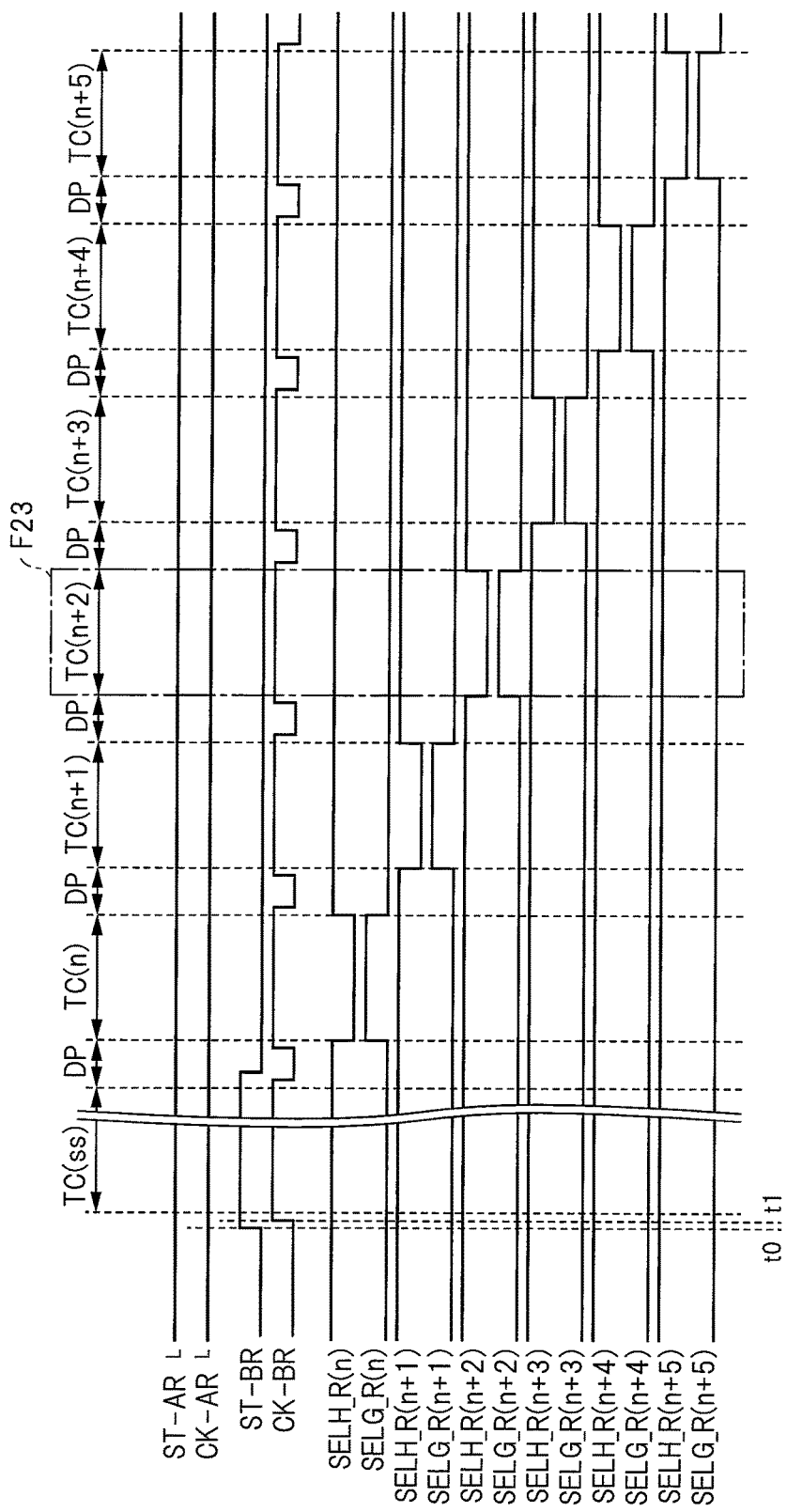
FIG. 25 is a waveform diagram illustrating the operation of the electric field touch detection according to the second embodiment.

FIG. 24 is a waveform diagram illustrating an operation of the electric field touch detection. FIG. 25 is a waveform diagram illustrating an operation of the electric field touch detection. The operation in electric field touch detection will be described with reference to a waveform diagram. In order to prevent a drawing from being complicated, the waveform diagram is divided into FIG. 24 and FIG. 25. The waveform diagram is completed by arranging FIG. 25 on the lower side of FIG. 24. Since the FIGS. 24 and 25 are similar to FIGS. 16 and 17, points of difference will be mainly described.

Similarly to the first embodiment, also in the second embodiment, in electric field touch detection, the control device 3 generates the shift clock signals and the start signals without using the separation quantity and the number of drive electrodes bundled together. However, the second embodiment differs from the first embodiment in that, as illustrated in FIGS. 24 and 25, the control device 3 changes the start signal ST-BR from the low-level to the high-level indicating selection at time t0 instead of the start signal ST-AR. In addition, the control device 3 changes the shift clock signals CK-AL and CK-BR from the low-level to the high-level in each of the start period TC(ss) and the electric field touch detection periods. That is, the control device 3 periodically changes the shift clock signals CK-AL and CK-BR. In addition, as illustrated in FIGS. 24 and 25, the control device 3 maintains the start signals ST-BL and ST-AR at the low level L and maintains the shift clock signals CK-BL and CK-AR at the low level L. That is, in electric field touch detection, the shift clock signals CK-BL and CK-AR do not change.

When the shift clock signals CK-AL and CK-BR change and the high-level start signals ST-AL and ST-BR indicating selection of a drive electrode are held in the shift stages FAL(n) and FBR(n) (see FIGS. 10A and 10B and FIGS. 11A and 11B), the electric field touch detection period TC(n) has been reached. Since the shift stages FAL(n) and FBR(n) store the high-level start signals ST-AL and ST-BL, the first selection signal AL(n) and the fourth selection signal BR(n) become the high level. Thus, the first transfer switch TP1L illustrated in FIG. 12A and the first transfer switch TP1R illustrated in FIG. 20 are turned on. In the electric field touch detection period TC(n), as illustrated in FIGS. 24 and 25, the second unit selection signal SELG_L(n) and the fourth unit selection signal SELG_R(n) become the high level, and the first unit selection signal SELH_L(n) and the third unit selection signal SELH_R(n) become the low level.

As a result, the first end n1 of the drive electrode TL(n) is connected to the signal wire TPH via the P transistor P5L in the unit drive circuit USL, and the second end n2 is connected to the signal wire TPH via the P transistor P5R in the unit drive circuit USR. Thus, in the electric field touch detection period TC(n), the periodically changing electric field drive signal supplied to the signal wire TPH is supplied through both ends of the drive electrode TL(n), and the drive electrode TL(n) generates an electric field.

Although the electric field touch detection period TC(n) has been described by way of example, the same goes for the other electric field touch detection periods. Note that the connection state illustrated in FIG. 23 corresponds to the state at the timing encircled by an alternate long and short dash line F23 in FIGS. 24 and 25.

In addition, also in the second embodiment, since the control signal COMFL becomes the low level in the electric field touch detection period, the display drive voltage VCOMDC is supplied to the non-selected drive electrodes from the signal wire TPL. Therefore, noise can be reduced.

In addition, in the display period, no drive electrodes are selected, and the display drive voltage VCOMDC is supplied from the signal wire TPL to all the non-selected drive electrodes.

In the magnetic field touch detection period, as described with reference to FIGS. 2A to 2C, a magnetic field from the pen is detected by detection electrodes RL(0) to RL(p) formed on a second substrate. In the electric field touch detection period, as described with reference to FIGS. 3A to 3C, a change in electric field is also detected by the detection electrodes RL(0) to RL(p).

In the present embodiment, only the configuration of the unit selection circuit SER(n) is changed; however, only the configuration of the unit selection circuit SEL(n) may be changed without changing the configuration of the unit selection circuit SER(n). That is, for example, the first scanner circuit SCAL or the second scanner circuit SCBL may select the first end n1 of the first drive electrode, and the third scanner circuit SCAR or the fourth scanner circuit SCBR may select the second end n2 of the first drive electrode; however, the four scanner circuits are controlled such that the four scanner circuits simultaneously select both ends of the first drive electrode and both ends of the second drive electrode. Also in this embodiment, the control device 3 supplies the first drive voltage to the first end n1 of the first drive electrode and to the second end n2 of the second drive electrode, and supplies the second drive voltage to the second end n2 of the first drive electrode and to the first end n1 of the second drive electrode.

Electronic Device

Figure 26:
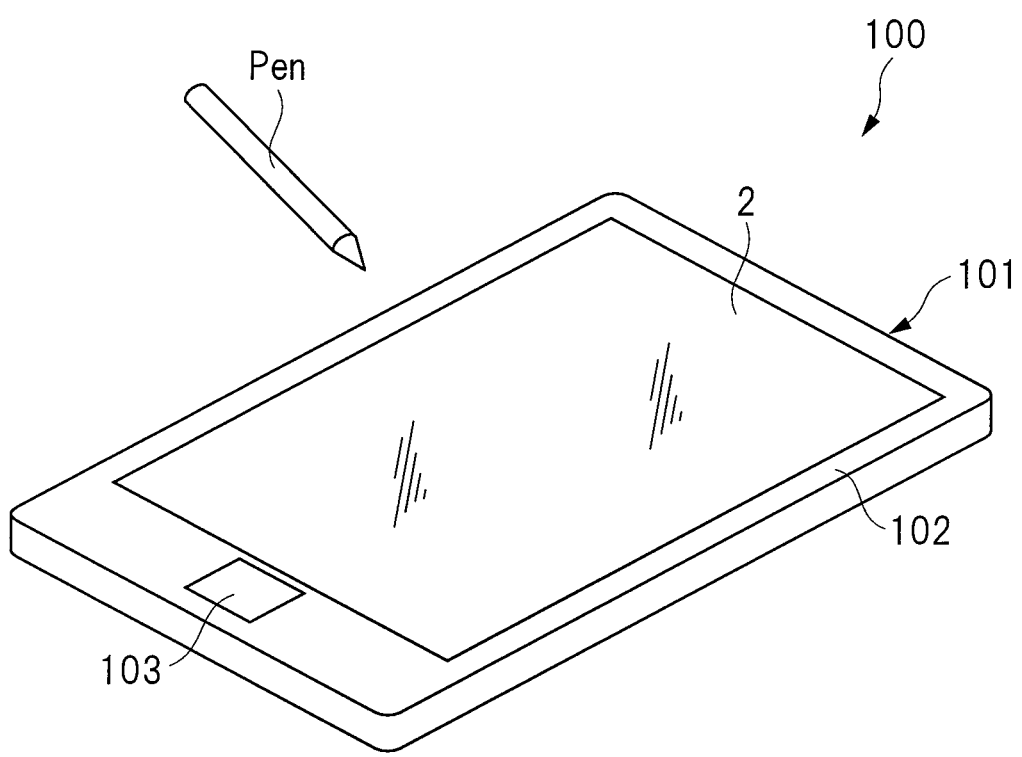
FIG. 26 is a perspective view illustrating an electronic device according to the first and the second embodiments.

FIG. 26 is a perspective view illustrating a configuration of an electronic device 100 provided with the display device 1 described in the first and the second embodiments. The electronic device 100 includes a tablet computer 101 including the display device 1, and the pen. As illustrated in FIGS. 2A to 2C, the pen is an indicator including a coil and a capacitive element. In FIG. 26, reference numeral 2 denotes the above-described display region, and reference numeral 102 denotes the frame region arranged to surround the display region 2. In addition, reference numeral 103 denotes a button of the computer 101.

In the above-described display period DP, an image is displayed on the display region 2. In the magnetic field touch detection periods TP(n) to TP(n+5) and the like, whether or not the pen is in proximity to the display region 2 and the coordinates of the pen are detected. According to the detection results, the computer 101 performs processing.

The pen and the tablet computer 101 are not necessarily connected directly and electrically. The electronic device 100 may not include the pen. In a case where the electronic device 100 does not include the pen, the tablet computer 101 itself is equivalent to the electronic device 100. As the display device included in the electronic device 100, a laptop or a desktop personal computer may be used instead of the tablet computer.

Various modifications and alterations can be conceived by those skilled in the art within the spirit of the present invention, and it is understood that such modifications and alterations are also encompassed within the scope of the present invention.

For example, those skilled in the art can suitably modify the above-described embodiments by addition, deletion, or design change of components, or by addition, omission, or condition change of steps. Such modifications are also encompassed within the scope of the present invention as long as they include the gist of the present invention.

For example, in the above-described embodiments, the case has been described where the drive electrodes TL(0) to TL(p) extend in the row direction and are arranged in parallel to each other in the column direction. However, the row direction and the column direction change depending on the view direction. A case where the drive electrodes TL(0) to TL(p) extend in the column direction and are arranged in parallel to each other in the row direction when viewed from a different direction is also included within the scope of the present invention. In addition, the term "parallel" used in the present specification means a state where two objects extend without crossing each other from one ends to the other ends. Therefore, a state where two lines (or electrodes) are provided such that part of or the whole of one line (or electrode) is inclined with respect the other line (or electrode) is also referred to as "parallel" in the present specification as long as these lines (or electrodes) do not cross each other from the one ends to the other ends.

In the present embodiment, each of the magnetic field drive signal and the electric field drive signal is an AC signal which periodically changes in voltage between the ground voltage Vs and the voltage Vd. However, each of the magnetic field drive signal and the electric field drive signal is not limited to this. The magnetic field drive signal may be different from the electric field drive signal. For example, the magnetic field drive signal is an AC signal which periodically changes between a first magnetic field drive voltage and a second magnetic field drive voltage, and the electric field drive signal is an AC signal which periodically changes between a first electric field drive voltage and a second electric field drive voltage. The first magnetic field drive voltage may be different from the first electric field drive voltage, or the second magnetic field drive voltage may be different from the second electric field drive voltage.

What is claimed is:

1. An input detection device comprising:
a plurality of drive electrodes each having a first end and a second end, the plurality of drive electrodes including a first drive electrode and a second drive electrode;
a first scanner circuit configured to select a first end of the second drive electrode among the drive electrodes;
a second scanner circuit configured to select a first end of the first drive electrode among the drive electrodes;
a third scanner circuit configured to select a second end of the first drive electrode;
a fourth scanner circuit configured to select a second end of the second drive electrode; and
a controller configured to control to
supply a first drive voltage to the first end of the first drive electrode and to the second end of the second drive electrode, and
supply a second drive voltage different from the first drive voltage to the second end of the first drive electrode and to the first end of the second drive electrode.

2. The input detection device according to claim 1, further comprising:
a substrate on which the plurality of drive electrodes is arranged,
wherein the first scanner circuit and the second scanner circuit are arranged along a first side of a frame region of the substrate, and the third scanner circuit and the fourth scanner circuit are arranged along a second side of the frame region, the second side facing the first side.

3. The input detection device according to claim 1, further comprising:
a first selection drive circuit being arranged between the first end of each of the drive electrodes, and each of the first scanner circuit and the second scanner circuit; and
a second selection drive circuit being arranged between the second end of each of the drive electrodes, and each of the third scanner circuit and the fourth scanner circuit.

4. The input detection device according to claim 1,
wherein, the controller configured to control to, at the same time,
supply the first drive voltage to the first end of the first drive electrode and to the second end of the second drive electrode, and
supply the second drive voltage to the second end of the first drive electrode and to the first end of the second drive electrode.

5. The input detection device according to claim 1,
wherein the first drive electrode and the second drive electrode are simultaneously selected, and input detection by an electromagnetic induction method is performed by using a magnetic field generated by a current flowing through the first drive electrode and a magnetic field generated by a current flowing through the second drive electrode.

6. The input detection device according to claim 1, further comprising:
an indicator including a coil and a capacitive element.

7. The input detection device according to claim 1,
wherein the plurality of drive electrodes further include a third drive electrode arranged between the first drive electrode and the second drive electrode, and
the third drive electrode is not selected when the first drive electrode and the second drive electrode are selected simultaneously.

8. The input detection device according to claim 1,
wherein each of the first drive electrode and the second drive electrode includes a plurality of adjacent drive electrodes.

9. The input detection device according to claim 1,
wherein the first scanner circuit and the second scanner circuit are identical to each other,
wherein each of the first drive electrode and the second drive electrode includes a first number of drive electrodes,
wherein a second number of the drive electrodes is arranged between the first drive electrode and the second drive electrode, and
wherein, when the second scanner circuit selects a second one of the drive electrodes as the second drive electrode and the first scanner circuit selects a first one of the drive electrodes as the first drive electrode, the first one of the drive electrodes and the second one of the drive electrodes are shifted from each other by the first number of the drive electrodes and the second number of the drive electrodes.

10. The input detection device according to claim 9,
wherein the third scanner circuit and the fourth scanner circuit are identical to each other, and
wherein when the fourth scanner circuit selects the second one of the drive electrodes as the second drive electrode, the third scanner circuit selects the first one of the drive electrodes as the first drive electrode.

11. The input detection device according to claim 1,
wherein the first scanner circuit and the third scanner circuit simultaneously select the first drive electrode, and the second scanner circuit and the fourth scanner circuit simultaneously select the second drive electrode.

12. The input detection device according to claim 1,
wherein the controller is configured to set first number of drive electrodes to each of the first drive electrode and the second drive electrode in a first mode, and to set second number of drive electrodes to each of the first drive electrode and the second drive electrode in a second mode,
wherein the first number is different from the second number.

13. The input detection device according to claim 2,
wherein a unit scanner circuit included in the first scanner circuit and a unit scanner circuit included in the second scanner circuit are arranged along the first side of the frame region of the substrate.

14. The input detection device according to claim 2, further comprising:
a gate driver,
wherein a unit scanner circuit included in the first scanner circuit, a unit scanner circuit included in the second scanner circuit, and a unit gate driver included in the gate driver are alternately arranged along the first side of the frame region of the substrate.

15. The input detection device according to claim 1,
wherein the plurality of drive electrodes is also used as drive electrodes which perform input detection by a capacitive sensing method.

16. The input detection device according to claim 1,
wherein, in an input detection period by an electromagnetic induction method, the controller is configured to control to
supply the first drive voltage to the first end of the first drive electrode and to the second end of the second drive electrode, and supply the second drive voltage to the second end of the first drive electrode and to the first end of the second drive electrode, and wherein, in an input detection period by a capacitive sensing method, the first scanner circuit is configured to select a first end of a third drive electrode among the drive electrodes;

the third scanner circuit is configured to select a second end of the third drive electrode; and the controller is configured to supply a third drive voltage to the first end and the second end of the third drive electrode.

17. An electronic device comprising:
an input detection device including:
a plurality of drive electrodes each having a first end and a second end, the plurality of drive electrodes including a first drive electrode and a second drive electrode;
a first scanner circuit configured to select a first end of the second drive electrode among the drive electrodes;
a second scanner circuit configured to select a first end of the first drive electrode among the drive electrodes;
a third scanner circuit configured to select a second end of the first drive electrode;
a fourth scanner circuit configured to select a second end of the second drive electrode; and
a controller configured to control to
supply a first drive voltage to the first end of a the first drive electrode and to the second end of a the second drive electrode, and
supply a second drive voltage different from the first drive voltage to the second end of the first drive electrode and to the first end of the second drive electrode.

18. The input detection device according to claim 1, wherein the controller is configured to set a first number of drive electrodes included between the first drive electrode and the second drive electrode in a first mode, and to set a second number of drive electrodes included between the first drive electrode and the second drive electrode in a second mode, wherein the first number is different from the second number.

19. The input detection device according to claim 3, wherein the first selection drive circuit includes a plurality of unit selection drive circuits including a first unit selection drive circuit, wherein the first unit selection drive circuit includes a first switch and a second switch, the first switch coupled to one of the first drive electrodes and the first scanner circuit, and the second switch coupled to the one of the first drive electrodes and the second scanner circuit.

20. The input detection device according to claim 3, wherein the first selection drive circuit includes first unit selection circuits and first unit drive circuits corresponding to the drive electrodes, and the second selection drive circuit includes second unit selection circuits and second unit drive circuits corresponding to the drive electrodes, wherein the first unit drive circuits are coupled to first ends of the drive electrodes, to the first scanner circuit, to the second scanner circuit, to a first line supplied with the first drive voltage and to a second line supplied with the second drive voltage, and the first unit selection circuits control the first unit drive circuits so as to connect between the first ends of the drive electrodes and the first and the second lines in accordance with the selections of the first scanner circuit and the second scanner circuit, and wherein the second unit drive circuits are coupled to second ends of the drive electrodes, to the third scanner circuit, to the fourth scanner circuit, to the first line and to the second line, and the second unit selection circuits control the second unit drive circuits so as to connect between the second ends of the drive electrodes and the first and second lines in accordance with the selections of the third scanner circuit and the fourth scanner circuit.

* * * * *